US012497623B2

(12) United States Patent
Riley et al.

(10) Patent No.: US 12,497,623 B2
(45) Date of Patent: Dec. 16, 2025

(54) NON-SIGNALING HIV FUSION INHIBITORS AND METHODS OF USE THEREOF

(71) Applicant: THE TRUSTEES OF THE UNIVERSITY OF PENNSYLVANIA, Philadelphia, PA (US)

(72) Inventors: James L Riley, Downingtown, PA (US); James A. Hoxie, Berwyn, PA (US); George J. Leslie, Philadelphia, PA (US); Max W. Richardson, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 898 days.

(21) Appl. No.: 17/306,613

(22) Filed: May 3, 2021

(65) Prior Publication Data

US 2021/0338731 A1   Nov. 4, 2021

Related U.S. Application Data

(60) Provisional application No. 63/019,700, filed on May 4, 2020.

(51) Int. Cl.
| | |
|---|---|
| *C12N 15/62* | (2006.01) |
| *A61K 40/10* | (2025.01) |
| *A61K 40/11* | (2025.01) |
| *A61K 40/31* | (2025.01) |
| *A61K 40/42* | (2025.01) |
| *A61K 40/46* | (2025.01) |
| *A61P 31/18* | (2006.01) |
| *C07K 14/16* | (2006.01) |
| *C07K 14/715* | (2006.01) |

(52) U.S. Cl.
CPC .............. *C12N 15/62* (2013.01); *A61K 40/10* (2025.01); *A61K 40/11* (2025.01); *A61K 40/31* (2025.01); *A61K 40/4211* (2025.01); *A61K 40/4219* (2025.01); *A61K 40/46* (2025.01); *A61P 31/18* (2018.01); *C07K 14/162* (2013.01); *C07K 14/7158* (2013.01); *A61K 2239/29* (2023.05); *A61K 2239/31* (2023.05); *A61K 2239/38* (2023.05)

(58) Field of Classification Search
CPC .. C12N 15/62; A61K 2239/29; C07K 14/162; C07K 14/7158; C07K 2319/00
See application file for complete search history.

(56) References Cited

U.S. PATENT DOCUMENTS

| 9,566,352 B2 | 2/2017 | Holmes et al. | |
|---|---|---|---|
| 2012/0093787 A1* | 4/2012 | Holmes | A61P 31/12 435/325 |
| 2021/0275589 A1* | 9/2021 | Zeng | C07K 16/2866 |

FOREIGN PATENT DOCUMENTS

WO   2012079000 A1   6/2012

OTHER PUBLICATIONS

Brelot et al. Identification of Residues of CXCR4 Critical for Human Immunodeficiency Virus Coreceptor and Chemokine Receptor Activities. J Biol Chem. 2000;275(31):23736-44. (Year: 2000).*
Leslie et al. Potent and Broad Inhibition of HIV-1 by a Peptide from the gp41 Heptad Repeat-2 Domain Conjugated to the CXCR4 Amino Terminus. PLoS Pathog 2016; 12(11):1-30. (Year: 2016).*
Brelot et al. Identification of Residues of CXCR4 Critical for Human Immunodeficiency Virus Coreceptor and Chemokine Receptor Activities. JBC 2000; 275(31): 23736-23744. (Year: 2020).*
Leslie. Potent and Broad Inhibition of HIV-1 by a Peptide from the gp41 Heptad Repeat-2 Domain Conjugated to the CXCR4 Amino Terminus. PLoS Pathog, 12(11):1-30. (Year: 2016).*
Westcott. Signal transmission through the CXC chemokine receptor 4 (CXCR4) transmembrane helices. PNAS, 113(35):9928-9933. (Year: 2016).*
UniProt Accession No. P61073, CXCR4_Human (2004).
Abate-Daga , et al., "CAR models: next-generation CAR modifications for enhanced T-cell function", Mol Ther Oncolytics 3, 16014 (2016).
Alfei , et al., "TOX reinforces the phenotype and longevity of exhausted T cells in chronic viral infection", Nature 571, 265-269 (2019).
Ali , et al., "HIV-1-Specific Chimeric Antigen Receptors Based on Broadly Neutralizing Antibodies", J Virol 90, 6999-7006 (2016).
Anthony-Gonda , et al., "Multispecific anti-HIV duoCAR-T cells display broad in vitro antiviral activity and potent in vivo elimination of HIV-infected cells in a humanized mouse model.", Sci Transl Med 11(2019).
Appay , et al., "Memory CD8+ T cells vary in differentiation phenotype in different persistent virus infections", Nat Med 8, 379-385 (2002).
Boritz, et al., "Multiple Origins of Virus Persistence during Natural Control of HIV Infection", Cell 166, 1004-1015 (2016).
Boutwell , et al., "Reduced viral replication capacity of human immunodeficiency virus type 1 subtype C caused by cytotoxic-T-lymphocyte escape mutations in HLA-B57 epitopes of capsid protein", J Virol 83, 2460-2468 (2009).

(Continued)

*Primary Examiner* — Daniel E Kolker
*Assistant Examiner* — Maureen Varina Driscoll
(74) *Attorney, Agent, or Firm* — Saul Ewing LLP; Kathryn Doyle; Alireza Behrooz

(57) ABSTRACT

The present invention relates to engineered cells expressing a fusion protein comprising a peptide fusion inhibitor and a CXCR4 protein that lacks signaling activity. Also provided are methods of suppressing, inhibiting, preventing or treating a HIV infection in a subject in need thereof using the engineered cells.

12 Claims, 53 Drawing Sheets

Specification includes a Sequence Listing.

(56) References Cited

OTHER PUBLICATIONS

Brainard, et al., "Induction of robust cellular and humoral virus-specific adaptive immune responses in human immunodeficiency virus-infected humanized BLT mice", J Virol 83, 7305-7321 (2009).
Brelot, et al., "Identification of residues of CXCR4 critical for human immunodeficiency virus coreceptor and chemokine receptor activities", J Biol Chem 275, 23736-23744 (2000).
Brentjens, et al., "Genetically targeted T cells eradicate systemic acute lymphoblastic leukemia xenografts", Clin Cancer Res 13, 5426-5435 (2007).
Buggert, et al., "T-bet and Eomes are differentially linked to the exhausted phenotype of CD8+ T cells in HIV infection.", PLoS Pathog 10, e1004251 (2014).
Carpenito, et al., "Control of large, established tumor xenografts with genetically retargeted human T cells containing CD28 and CD137 domains", Proc Natl Acad Sci U S A 106, 3360-3365 (2009).
Cheng, et al., "In Vivo Expansion and Antitumor Activity of Coinfused CD28- and 4-1BB-Engineered CAR-T Cells in Patients with B Cell Leukemia", Mol Ther 26, 976-985 (2018).
Claiborne, et al., "Immunization of BLT Humanized Mice Redirects T Cell Responses to Gag and Reduces Acute HIV-1 Viremia", J Virol 93(2019).
Claiborne, et al., "Replicative fitness of transmitted HIV-1 drives acute immune activation, proviral load in memory CD4+ T cells, and disease progression", Proc Natl Acad Sci U S A 112, E1480-1489 (2015).
Clayton, et al., "Resistance of HIV-infected macrophages to CD8(+) T lymphocyte-mediated killing drives activation of the immune system", Nat Immunol 19, 475-486 (2018).
Colovos, et al., "Safety and stability of retrovirally transduced chimeric antigen receptor T cells", Immunotherapy 4, 899-902 (2012).
Crooks, et al., "Precise Quantitation of the Latent HIV-1 Reservoir: Implications for Eradication Strategies", J Infect Dis 212, 1361-1365 (2015).
Deeks, et al., "A phase II randomized study of HIV-specific T-cell gene therapy in subjects with undetectable plasma viremia on combination antiretroviral therapy", Mol Ther 5, 788-797 (2002).
Denton, et al., "Antiretroviral pre-exposure prophylaxis prevents vaginal transmission of HIV-1 in humanized BLT mice", PLoS Med 5, e16 (2008).
Deymier, et al., "Heterosexual Transmission of Subtype C HIV-1 Selects Consensus-Like Variants without Increased Replicative Capacity or Interferon-alpha Resistance", PLoS Pathog 11, e1005154 (2015).
Dudek, et al., "Rapid evolution of HIV-1 to functional CD8(+) T cell responses in humanized BLT mice", Sci Transl Med 4, 143ra198 (2012).
Estes, et al., "Defining total-body AIDS-virus burden with implications for curative strategies", Nat Med 23, 1271-1276 (2017).
Fesnak, et al., "Engineered T cells: the promise and challenges of cancer immunotherapy", Nat Rev Cancer 16, 566-581 (2016).
Gross, et al., "Expression of immunoglobulin-T-cell receptor chimeric molecules as functional receptors with antibodytype specificity", Proc Natl Acad Sci U S A 86, 10024-10028 (1989).
Guedan, et al., "Enhancing Car T cell persistence through ICOS and 4-1BB costimulation", JCI Insight 3(2018).
Hale, et al., "Engineering HIV-Resistant, Anti-HIV Chimeric Antigen Receptor T Cells", Mol Ther 25, 570-579 (2017).
Herzig, et al., "Attacking Latent HIV with convertibleCAR-T Cells, a Highly Adaptable Killing Platform", Cell 179, 880-894 e810 (2019).
Holt, et al., "Human hematopoietic stem/progenitor cells modified by zinc-finger nucleases targeted to CCR5 control HIV-1 in vivo", Nat Biotechnol 28, 839-847 (2010).
Hombach, et al., "OX40 costimulation by a chimeric antigen receptor abrogates CD28 and IL-2 induced IL-10 secretion by redirected CD4(+) T cells", Oncoimmunology 1, 458-466 (2012).

Johnson, et al., "Expression and structure of the human NGF receptor", Cell 47, 545-554 (1986).
June, et al., "Chimeric Antigen Receptor Therapy", N Engl J Med 379, 64-73 (2018).
Kahan, et al., "T cell exhaustion during persistent viral infections", Virology 479-480, 180-193 (2015).
Karpel, et al., "BLT humanized mice as a small animal model of HIV infection", Curr Opin Virol 13, 75-80 (2015).
Kawalekar, et al., "Distinct Signaling of Coreceptors Regulates Specific Metabolism Pathways and Impacts Memory Development in Car T Cells", Immunity 44, 380-390 (2016).
Khan, et al., "TOX transcriptionally and epigenetically programs CD8(+) T cell exhaustion", Nature 571, 211-218 (2019).
Leibman, et al., "Supraphysiologic control over HIV-1 replication mediated by CD8 T cells expressing a re-engineered CD4-based chimeric antigen receptor.", PLoS Pathog 13, e1006613 (2017).
Leslie, et al., "Potent and Broad Inhibition of HIV-1 by a Peptide from the gp41 Heptad Repeat-2 Domain Conjugated to the CXCR4 Amino Terminus", PLoS Pathog 12, e1005983 (2016).
Maldini, et al., "CAR T cells for infection, autoimmunity and allotransplantation", Nat Rev Immunol 18, 605-616 (2018).
Maldini, et al., "Dual CD4-based Car T cells with distinct costimulatory domains mitigate HIV pathogenesis in vivo", Nature Medicine 26, 1776-1787 (2020).
Martinez-Torres, et al., "Hypogammaglobulinemia in BLT humanized mice—an animal model of primary antibody deficiency", PLoS One 9, e108663 (2014).
Masur, et al., "CD4 counts as predictors of opportunistic pneumonias in human immunodeficiency virus (HIV) infection", Ann Intern Med 111, 223-231 (1989).
Maude, et al., "Chimeric antigen receptor T cells for sustained remissions in leukemia", N Engl J Med 371, 1507-1517 (2014).
Maude, et al., "Tisagenlecleucel in Children and Young Adults with B-Cell Lymphoblastic Leukemia", N Engl J Med 378, 439-448 (2018).
Milone, et al., "Chimeric receptors containing CD137 signal transduction domains mediate enhanced survival of T cells and increased antileukemic efficacy in vivo", Mol Ther 17, 1453-1464 (2009).
Moir, et al., "Pathogenic mechanisms of HIV disease", Annu Rev Pathol 6, 223-248 (2011).
Neelapu, et al., "Axicabtagene Ciloleucel CAR T-Cell Therapy in Refractory Large B-Cell Lymphoma", N Engl J Med 377, 2531-2544 (2017).
Pardi, et al., "Administration of nucleoside-modified mRNA encoding broadly neutralizing antibody protects humanized mice from HIV-1 challenge", Nat Commun 8, 14630 (2017).
Park, et al., "Long-Term Follow-up of CD19 CAR Therapy in Acute Lymphoblastic Leukemia", N Engl J Med 378, 449-459 (2018).
Perez, et al., "Establishment of HIV-1 resistance in CD4+ T cells by genome editing using zinc-finger nucleases", Nat Biotechnol 26, 808-816 (2008).
Peterson, et al., "Differential impact of transplantation on peripheral and tissueassociated viral reservoirs: Implications for HIV gene therapy", PLoS Pathog 14, e1006956 (2018).
Porter, et al., "Chimeric antigen receptor T cells persist and induce sustained remissions in relapsed refractory chronic lymphocytic leukemia", Sci Transl Med 7, 303ra139 (2015).
Prince, et al., "Role of transmitted Gag CTL polymorphisms in defining replicative capacity and early HIV-1 pathogenesis", PLoS Pathog 8, e1003041 (2012).
Pule, et al., "A chimeric T cell antigen receptor that augments cytokine release and supports clonal expansion of primary human T cells", Mol Ther 12, 933-941 (2005).
Quintarelli, et al., "Choice of costimulatory domains and of cytokines determines CAR T-cell activity in neuroblastoma", Oncoimmunology 7, e1433518 (2018).
Rabezanahary, et al., "Despite early antiretroviral therapy effector memory and follicular helper CD4 T cells are major reservoirs in visceral lymphoid tissues of SIV-infected macaques", Mucosal Immunol 13, 149-160 (2020).

(56) References Cited

OTHER PUBLICATIONS

Richardson, et al., "Mode of transmission affects the sensitivity of human immunodeficiency virus type 1 to restriction by rhesus TRIM5alpha", J Virol 82, 11117-11128 (2008).
Riley, et al., "Cell-Mediated Immunity to Target the Persistent Human Immunodeficiency Virus Reservoir", J Infect Dis 215, S160-S171 (2017).
Rosenberg, et al., "Use of Tumor-Infiltrating Lymphocytes and Interleukin-2 in the Immunotherapy of Patients with Metastatic Melanoma", New Eng. J. of Med. 319:1676, 1988 (Abstract only).
Salter, et al., "Phosphoproteomic analysis of chimeric antigen receptor signaling reveals kinetic and quantitative differences that affect cell function", Sci Signal 11(2018).
Scholler, et al., "Decade-long safety and function of retroviral-modified chimeric antigen receptor T cells", Sci Transl Med 4, 132ra153 (2012).
Schuster, et al., "Tisagenlecleucel in Adult Relapsed or Refractory Diffuse Large B-Cell Lymphoma", N Engl J Med 380, 45-56 (2019).
Scott, et al., "TOX is a critical regulator of tumour-specific T cell differentiation", Nature 571, 270-274 (2019).
Seo, et al., "TOX and TOX2 transcription factors cooperate with NR4A transcription factors to impose CD8(+) T cell exhaustion", Proc Natl Acad Sci U S A 116, 12410-12415 (2019).
Seung, et al., "Humoral immunity in humanized mice: a work in progress", J Infect Dis 208 Suppl 2, S155-159 (2013).
Siliciano, et al., "Long-term follow-up studies confirm the stability of the latent reservoir for HIV-1 in resting CD4+ T cells", Nat Med 9, 727-728 (2003).
Song, et al., "In vivo persistence, tumor localization, and antitumor activity of CAR-engineered T cells is enhanced by costimulatory signaling through CD137 (4-1BB)", Cancer Res 71, 4617-4627 (2011).
Sun, et al., "Intrarectal transmission, systemic infection, and CD4+ T cell depletion in humanized mice infected with HIV-1", J Exp Med 204, 705-714 (2007).
Tebas, et al., "Gene editing of CCR5 in autologous CD4 T cells of persons infected with HIV", N Engl J Med 370, 901-910 (2014).
Van Der Stegen, et al., "The pharmacology of second-generation chimeric antigen receptors", Nat Rev Drug Discov 14, 499-509 (2015).
Ventura, et al., "Longitudinal bioluminescent imaging of HIV-1 infection during antiretroviral therapy and treatment interruption in humanized mice", PLoS Pathog 15, e1008161 (2019).
Walker, et al., "The T-cell response to HIV", Cold Spring Harb Perspect Med 2(2012).
Wang, et al., "A transgene-encoded cell surface polypeptide for selection, in vivo tracking, and ablation of engineered cells", Blood 118, 1255-1263 (2011).
Wang, et al., "Clinical manufacturing of CAR T cells: foundation of a promising therapy", Mol Ther Oncolytics 3, 16015 (2016).
Weinkove, et al., "Selecting costimulatory domains for chimeric antigen receptors: functional and clinical considerations", Clin Transl Immunology 8, e1049 (2019).
Wherry, et al., "Molecular signature of CD8+ T cell exhaustion during chronic viral infection", Immunity 27, 10 670-684 (2007).
Wright, et al., "Influence of Gag-protease-mediated replication capacity on disease progression in individuals recently infected with HIV-1 subtype C", J Virol 85, 3996-4006 (2011).
Xu, et al., "CRISPR-Edited Stem Cells in a Patient with HIV and Acute Lymphocytic Leukemia", N Engl J Med 381, 1240-1247 (2019).
Yao, et al., "Single-cell RNA-seq reveals TOX as a key regulator of CD8(+) T cell persistence in chronic infection", Nat Immunol 20, 890-901 (2019).
Zhao, et al., "Structural Design of Engineered Costimulation Determines Tumor Rejection Kinetics and Persistence of CAR T Cells", Cancer Cell 28, 415-428 (2015).
Zhen, et al., "Longterm persistence and function of hematopoietic stem cell-derived chimeric antigen receptor T cells in a nonhuman primate model of HIV/AIDS", PLoS Pathog 13, e1006753 (2017).
Zhen, et al., "Targeting type I interferon-mediated activation restores immune function in chronic HIV infection", J Clin Invest 127, 260-268 (2017).

\* cited by examiner

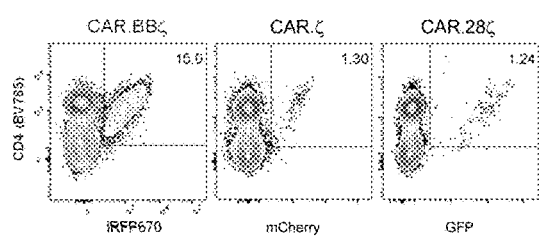 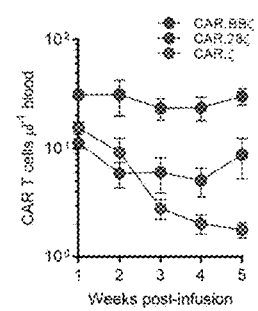 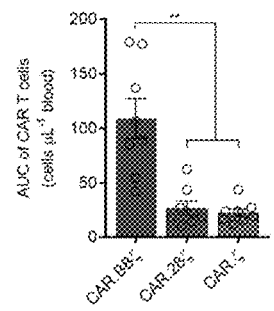
FIG. 11A  FIG. 11B  FIG. 11C
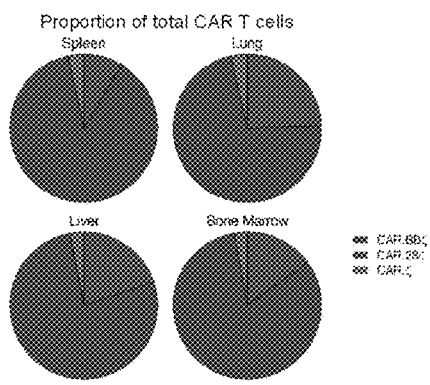 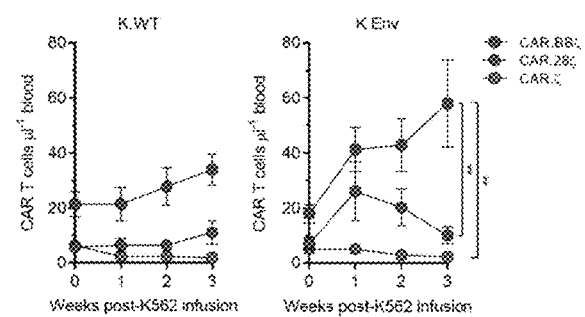
FIG. 11D  FIG. 11E

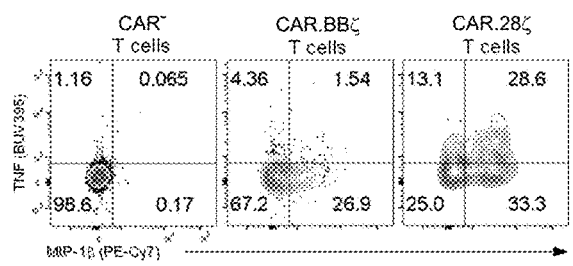
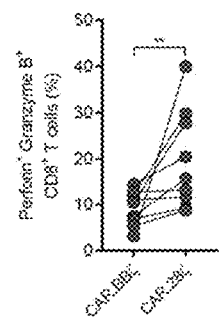
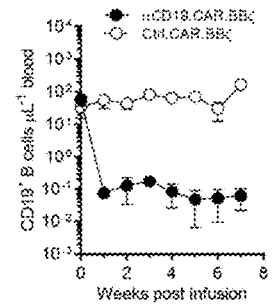
FIG. 11F      FIG. 11G      FIG. 11H
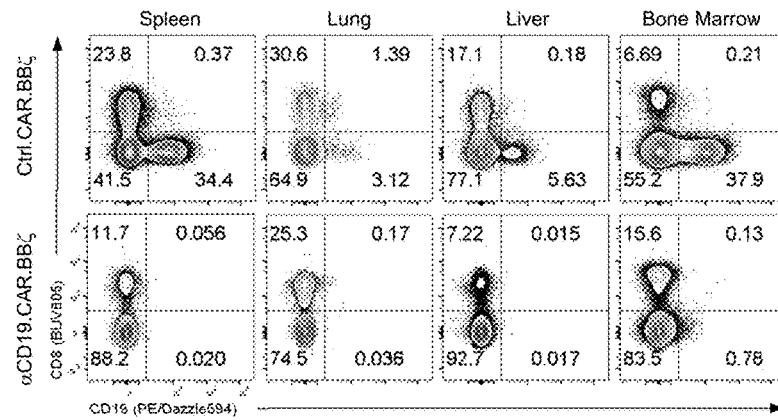
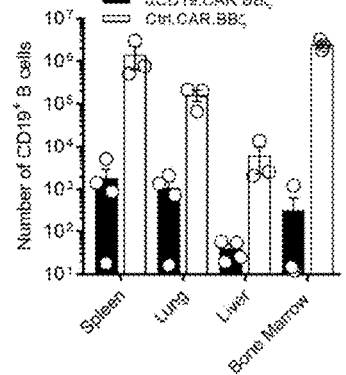
FIG. 11I
FIG. 11J
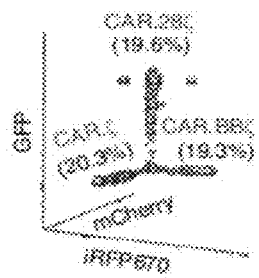
FIG. 11K

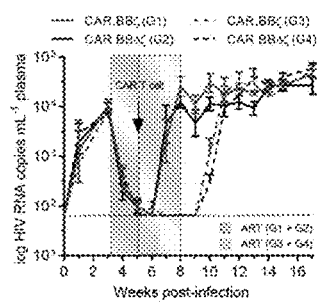
FIG. 12A
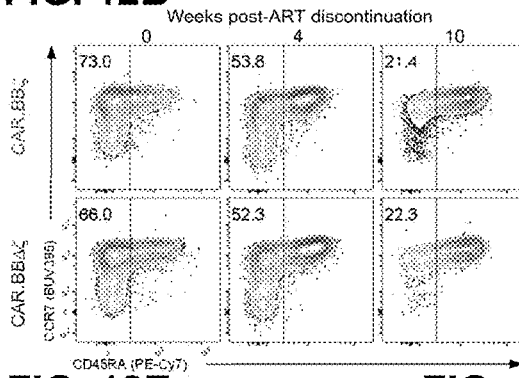
FIG. 12B
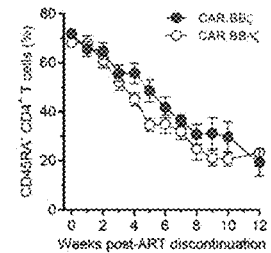
FIG. 12C
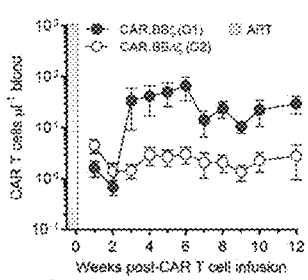
FIG. 12D
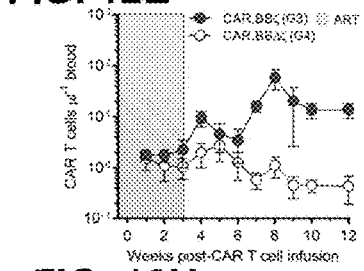
FIG. 12E
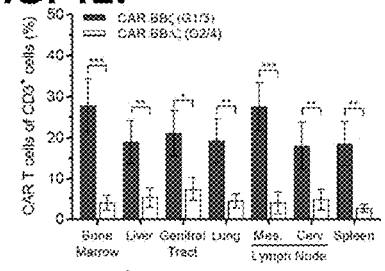
FIG. 12F
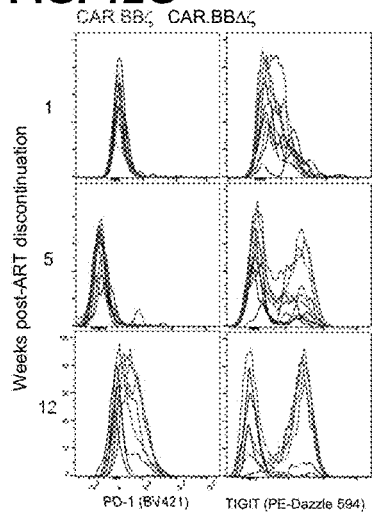
FIG. 12G
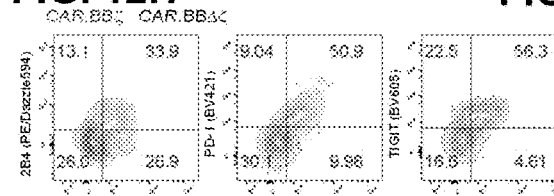
FIG. 12H
FIG. 12I
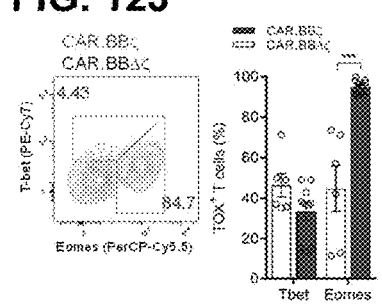
FIG. 12J
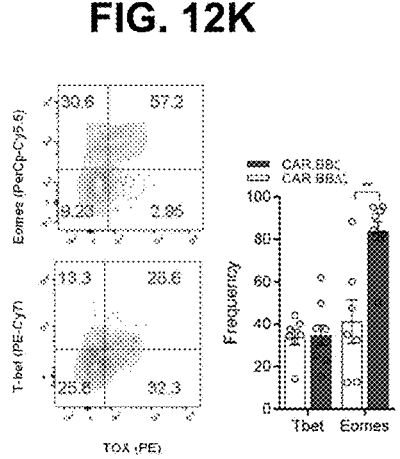
FIG. 12K

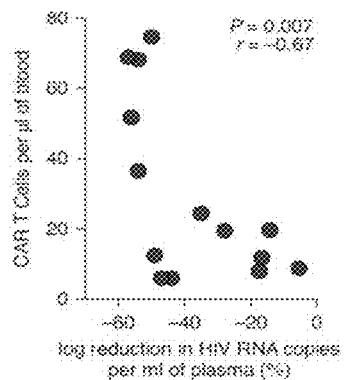
FIG. 15J
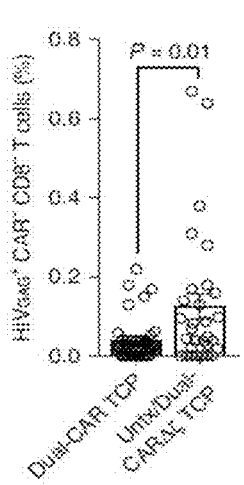 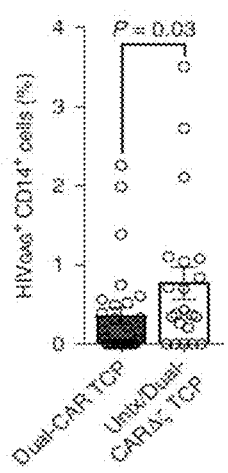 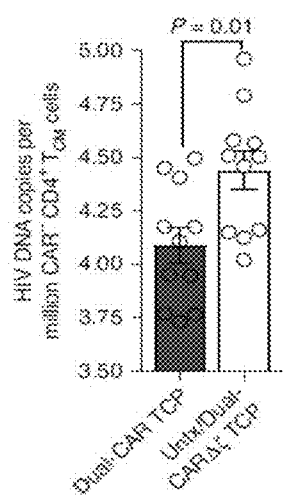
FIG. 15K  FIG. 15L  FIG. 15M

FIG. 16A
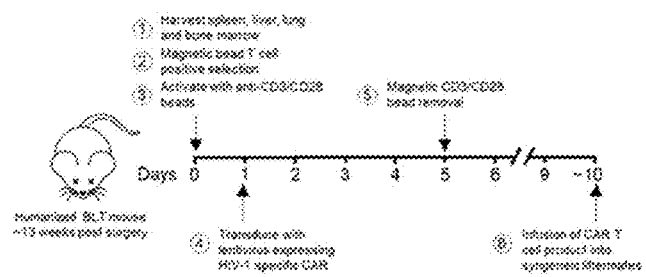
FIG. 16B
FIG. 16C
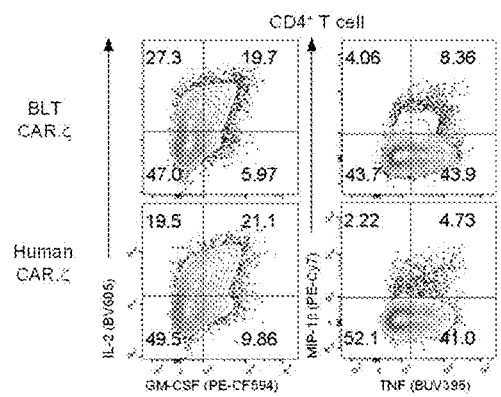
FIG. 16D
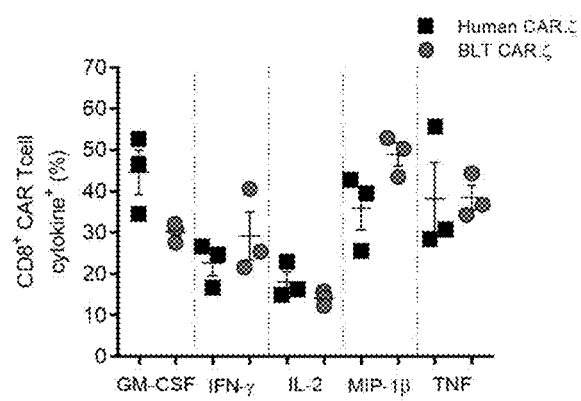
FIG. 16E
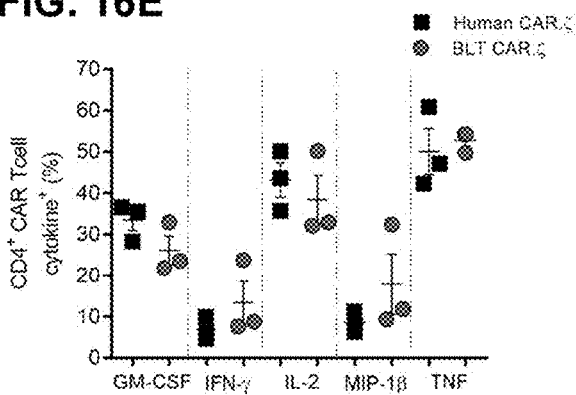
FIG. 16F
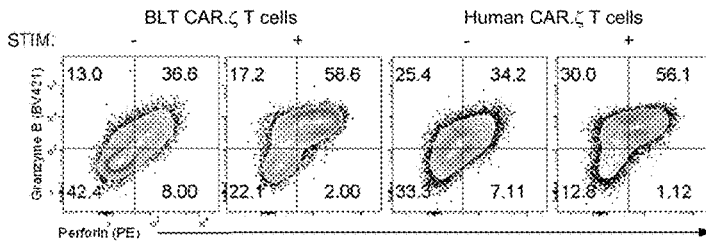
FIG. 16G
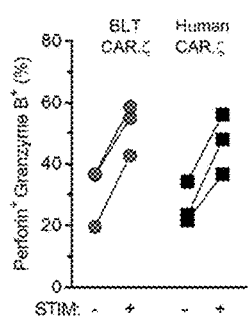

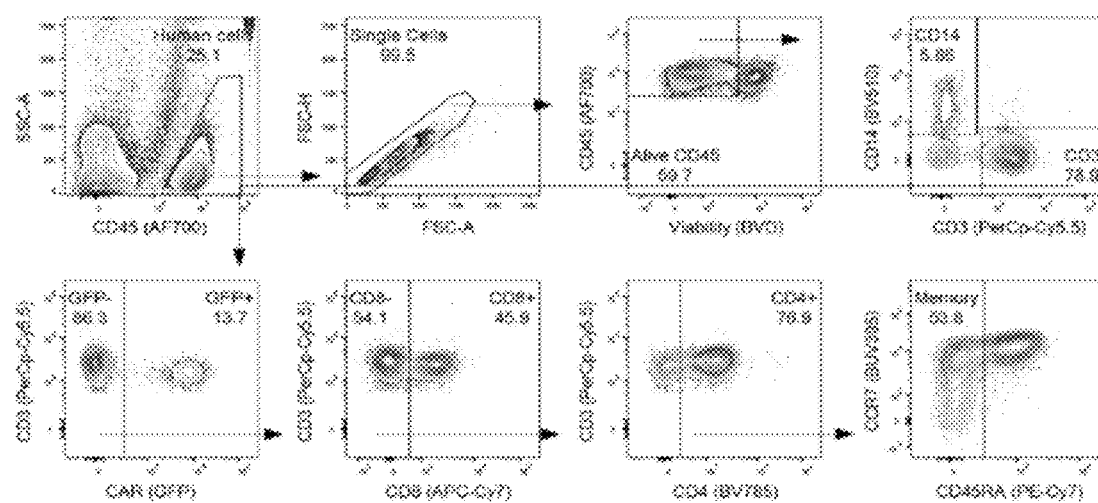
FIG. 18C
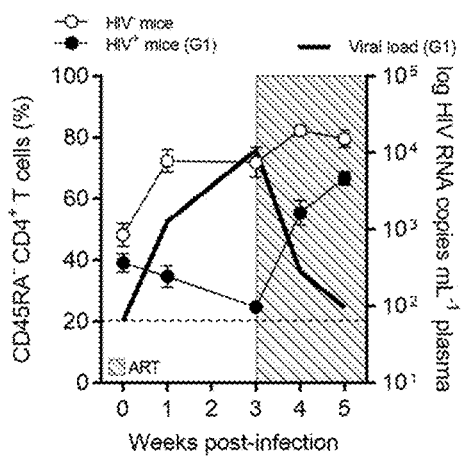 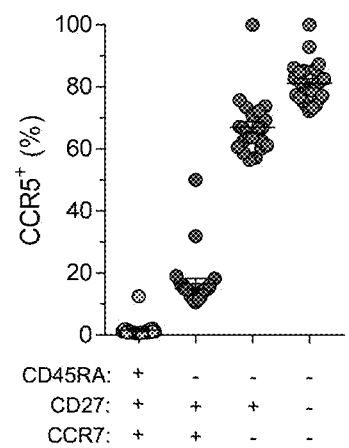
FIG. 19A  FIG. 19B

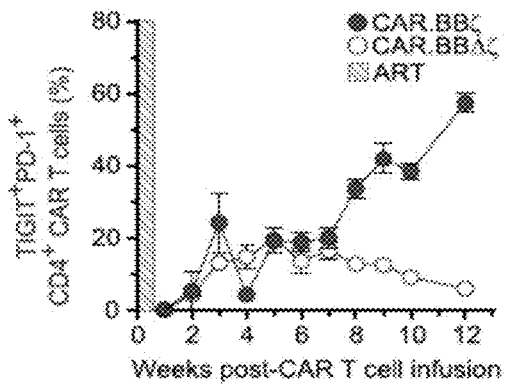 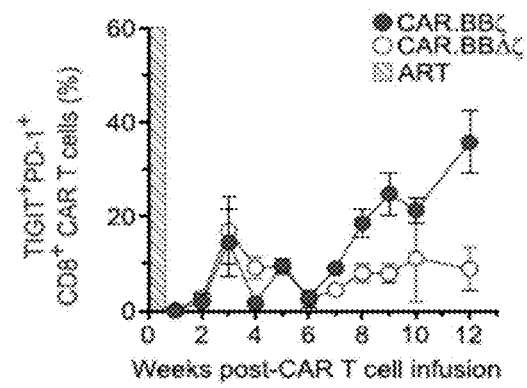
FIG. 36A  FIG. 36B
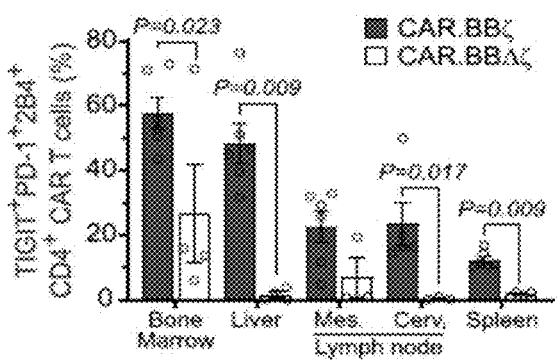 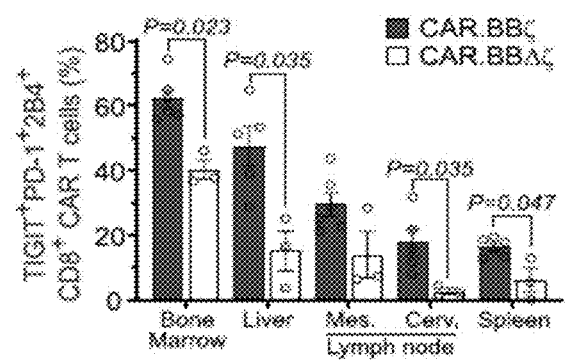
FIG. 36C  FIG. 36D
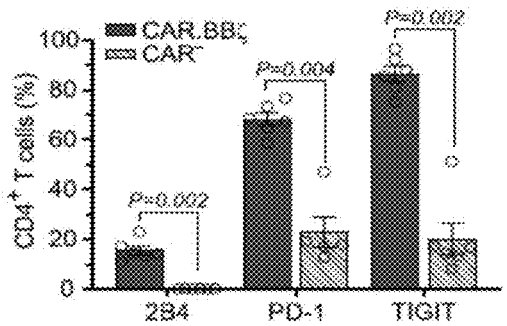 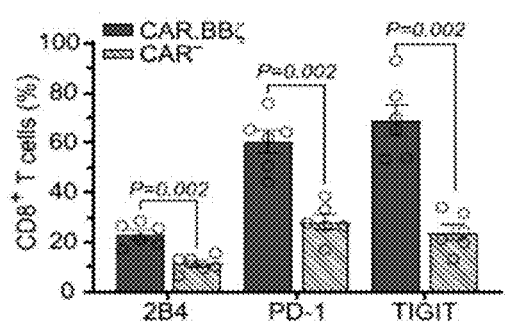
FIG. 36E  FIG. 36F

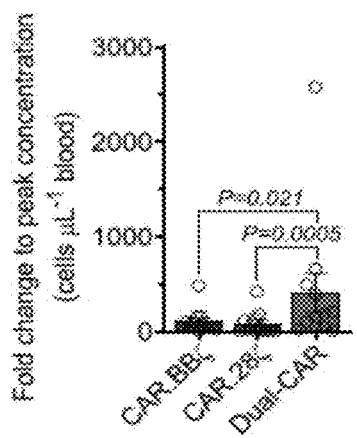 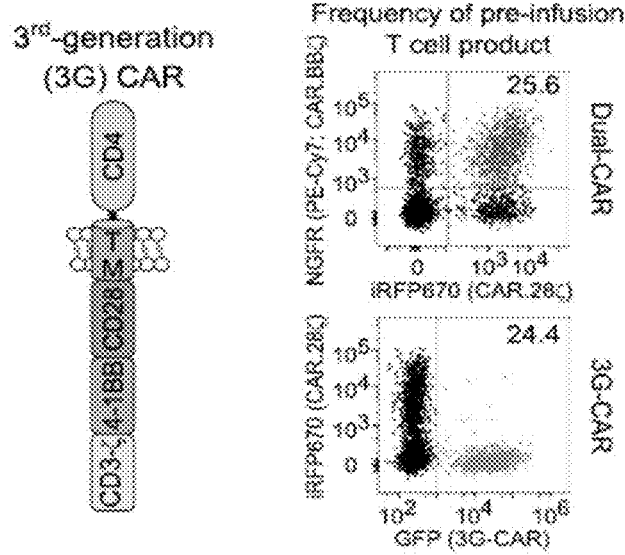
FIG. 40A    FIG. 40B    FIG. 40C
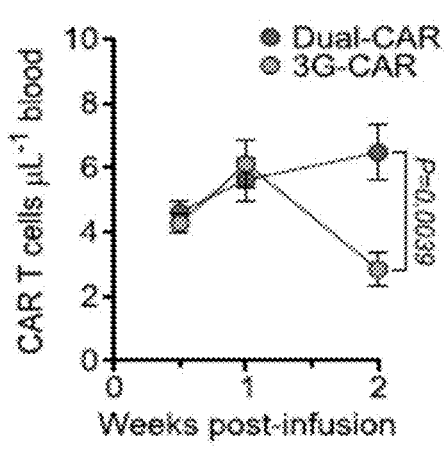 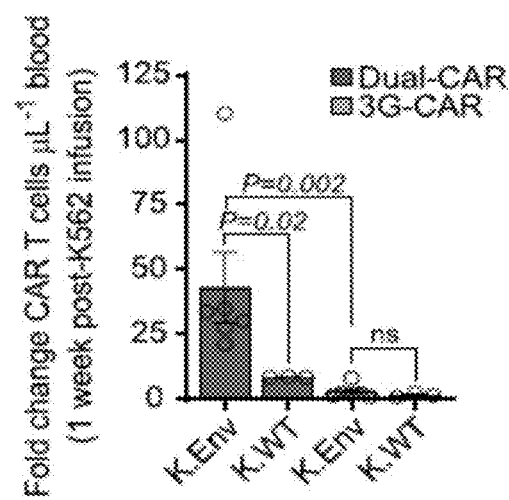
FIG. 40D    FIG. 40E

NON-SIGNALING HIV FUSION INHIBITORS AND METHODS OF USE THEREOF

CROSS-REFERENCE TO RELATED APPLICATIONS

This application claims the benefit of priority under 35 U.S.C. § 119(e) to U.S. Provisional Patent Application Ser. No. 63/019,700, filed May 4, 2020. The entire content of this application is hereby incorporated by reference herein.

STATEMENT REGARDING FEDERALLY SPONSORED RESEARCH OR DEVELOPMENT

This invention was made with government support under AI117950, AI126620 awarded by the National Institutes of Health. The government has certain rights in the invention.

REFERENCE TO SEQUENCE LISTING

The Sequence Listing concurrently submitted herewith as a text file named "046483_7302US1_Sequence_Listing.txt," created on Apr. 27, 2021 and having a size of 5,755 bytes is herein incorporated by reference pursuant to 37 C.F.R. § 1.52(e)(5).

BACKGROUND OF THE INVENTION

Human immunodeficiency virus type 1 (HIV-1), the major causative agent of acquired immunodeficiency syndrome (AIDS), is a retrovirus of the genus *Lentivirinae*. HIV-1 infection persists and requires life-long therapy. HIV-1 infection persists in the face of suppressive anti-retroviral therapy, and following cessation of treatment, typically rebounds rapidly, generating new rounds of infection. Viral persistence results from long-lived reservoirs that include memory CD4 T cells and perhaps other cell types that are established early after infection in humans. Approaches to prevent viral replication in the absence of treatment will likely require effective antiviral immune responses, but this goal has been confounded by HIV-1's ability to target CD4 T cells that coordinate adaptive immunity.

There remains an unmet need for therapies that augment antiviral immune responses that target viral reservoirs and provide long-term control of HIV-1.

SUMMARY OF THE INVENTION

In one aspect, the present invention provides a fusion protein comprising a peptide fusion inhibitor and a CXCR4 protein, wherein the CXCR4 protein comprises at least one mutation that decreases signaling activity of the CXCR4 protein relative to a reference.

In another aspect, the present invention provides an isolated nucleic acid comprising a nucleic acid sequence encoding a fusion protein comprising a peptide fusion inhibitor and a CXCR4 protein, wherein the CXCR4 protein comprises at least one mutation that decreases signaling activity of the CXCR4 protein relative to a reference.

In some aspects, the present invention provides a vector comprising a nucleic acid comprising a nucleic acid sequence encoding a fusion protein comprising a peptide fusion inhibitor and a CXCR4 protein, wherein the CXCR4 protein comprises at least one mutation that decreases signaling activity of the CXCR4 protein relative to a reference.

In other aspects, the present invention provides a cell comprising a nucleic acid comprising a nucleic acid sequence encoding a fusion protein comprising a peptide fusion inhibitor and a CXCR4 protein, wherein the CXCR4 protein comprises at least one mutation that decreases signaling activity of the CXCR4 protein relative to a reference.

In one aspect, the present invention provides a vector comprising a nucleic acid comprising a nucleic acid sequence encoding a fusion protein comprising a peptide fusion inhibitor and a CXCR4 protein, wherein the CXCR4 protein comprises at least one mutation that decreases signaling activity of the CXCR4 protein relative to a reference.

In another aspect, the present invention provides a method for suppressing, inhibiting, preventing or treating HIV infection in a subject in need thereof, the method comprising administering to the subject an effective amount of a cell comprising a nucleic acid comprising a nucleic acid sequence encoding a fusion protein comprising a peptide fusion inhibitor and a CXCR4 protein, wherein the CXCR4 protein comprises at least one mutation that decreases signaling activity of the CXCR4 protein relative to a reference.

In some aspects, the present invention provides a method for conferring resistance to HIV infection in a subject in need thereof, the method comprising administering to the subject an effective amount of a cell comprising a nucleic acid comprising a nucleic acid sequence encoding a fusion protein comprising a peptide fusion inhibitor and a CXCR4 protein, wherein the CXCR4 protein comprises at least one mutation that decreases signaling activity of the CXCR4 protein relative to a reference.

In other aspects, the present invention provides a method for generating a T cell resistant to infection with HIV, the method comprising introducing, into a T cell, a nucleic acid comprising a nucleic acid sequence encoding a fusion protein comprising a peptide fusion inhibitor and a CXCR4 protein, wherein the CXCR4 protein comprises at least one mutation that decreases signaling activity of the CXCR4 protein relative to a reference.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIGS. 5, 6, and 7 represent cells that have been in culture for 5, 8, and 11 days, respectively.

FIG. 10A: Representative FACS plots identify CAR. ζ T cells from each T cell source as GFP$^+$ and CD4$^+$. FIG. 10B: After 10 days of culture, HIV-specific CD8$^+$ CAR. ζ T cells were mixed with HIV$_{YU2}$ GP160$^+$ K562 cells (K.Env) and upregulation of human cytokines measured. FIG. 10C: Polyfunctionality profiles of combinatorial subsets for CD4$^+$ and CD8$^+$ CAR.ζ T cells producing 0 to 5 of the human cytokines GM-CSF, IFN-g, IL-2, MIP-1b, and TNF. Average of 3 unique donors per T cell source. FIG. 10D: Representative FACS plots indicating the frequency of HIV-infected T cells 6 days after co-culturing with BLT mouse- or human-derived CAR.ζ T cells at indicated effector-to-target (E:T) ratios. FIG. 10E: Summary of the frequency of HIV$_{GAG}^+$ target cells (live CAR$^-$ CD8$^-$ T cells) at 2, 4 and 6 days after co-culture with BLT mouse-, or FIG. 10F: human-derived CAR.ζ and untransduced (UTD) T cells at indicated E:T ratios. FIG. 10G: Representative FACS plots and FIG. 10H: summary data for frequency of active caspase-3 within live HIV$_{GAG}^+$ T cells after 24-hour co-culture with BLT mouse- or human-derived CAR.ζ and UTD T cells at 1:1 E:T ratio. Average of duplicates per donor (n=3). For FIGS. 10E and 10F, each donor was performed in triplicate. Symbols and lines indicate mean and error bars show±SEM.

FIGS. 11A-11K: 4-1BB costimulation improves the survival and proliferation of CAR T cells and induces B cell aplasia in vivo. BLT mouse-derived HIV-specific (CD4-based) CAR T cells expressed either mCherry.T2A.CAR.ζ (brown), iRFP670.T2A.CAR.BBζ (red) or GFP.T2A.CAR.28ζ (purple). 5×10$^6$ CAR T cells of each type were mixed and infused into syngeneic mice (n=8). FIG. 11A: Frequency of peripheral CAR T cells within the same mouse 5 weeks post-infusion. FIG. 11B: Peripheral concentration of each CAR T cell type over 5 weeks, and FIG. 11C: cumulative CAR T cell persistence by area under the curve. FIG. 11D: Relative tissue frequency of each CAR T cell type 7 weeks post-infusion. FIG. 11E: In a separate study, 2 weeks post-infusion of the CAR T cell mixture described in FIG. 11A, BLT mice received 10$^7$ irradiated wild-type (K.WT; n=8) or HIV$_{YU2}$ GP160 (K.Env; n=8) transduced K562 cells. Peripheral concentration each CAR T cell type following K.WT or K.Env stimulation. FIG. 11F: Representative FACS plots indicating frequency of MIP-1b$^+$ and TNF$^+$ CAR T cells within the same mouse after ex vivo K.Env stimulation. FIG. 11G: Frequency of granzyme B$^+$ perforin$^+$ CD8$^+$ CAR T cells within the same mouse ex vivo. FIGS. 11H-11J: BLT mice were infused with 5×10$^6$ CD19-specific CAR.BBζ (black; n=4) or control CD4-based CAR.BBζ T cells (white; n=3). FIG. 11H: Concentration of peripheral CD19$^+$ cells following infusion. FIG. 11I: Representative FACS plots showing frequency of CD19$^+$ cells out of total huCD45$^+$ cells, and FIG. 11J: the number of CD19$^+$ cells in tissues 7 weeks post-infusion. Closed symbols indicate mean and error bars show±SEM. FIG. 11K: Frequency of each CAR T cell type within the preinfusion CAR T cell product (TCP). For FIG. 11C: Friedman's test with Dunn's multiple corrections test, and FIG. 11E; FIG. 11G: Wilcoxon matched-pairs signed rank test performed to calculate significance (*P<0.05, **P<0.01).

FIGS. 12A-12L: HIV-specific CAR.BBζ T cells display features of T cell exhaustion after failing to control post-ART viral rebound. FIG. 12A: Mean log plasma viral RNA (copies mL$^{-1}$) in HIV$_{JRCSF}$-infected BLT mice treated with ART from week 3 to 5 (G1 and G2 mice; gray box) or from week 3 to 8 (G3 and G4 mice; brown box). At 5 weeks post-infection, mice in G1 (red solid; n=6) and G3 (red dash; n=10) received 10$^7$ CAR.BBζ T cells, and mice in G2 (black solid; n=6) and G4 (black dash; n=9) received 10$^7$ control inactive CAR.BBΔζ T cells. Thin dotted line denotes limit of quantification. FIG. 12B: Representative FACS plots and FIG. 12C: summary data showing the frequency of total memory CD4$^+$ T cells following ART cessation in CAR.BBζ (red) and control CAR.BBΔζ (white) T cell-treated mice. FIG. 12D: Concentration of peripheral CAR T cells for G1/G2 and FIG. 12E: G3/G4. FIG. 12F: Frequency of CAR T cells in tissues 12 weeks after CAR T cell infusion for G1/G3 (red) and G2/G4 (white). FIG. 12G: PD-1 and TIGIT expression on peripheral CAR.BBζ (red) or CAR.BBΔζ T cells (black) from G1/G2 after ART discontinuation. FIGS. 12H-12I: FACS analysis of splenic tissue of BLT mice 12 weeks after ART cessation. FIG. 12H: Co-expression of TOX and 2B4, PD-1 or TIGIT on peripheral CAR.BBζ (red) or CAR.BBΔζ T cells (black). FIG. 12I: Frequency of TOX$^-$ and TOX$^+$ CAR.BBζ T cells positive for indicated inhibitory receptors. FIG. 12J: Frequency of T-bet and Eomes expressing CAR.BBζ (red) and CAR.BBΔζ T cells (white). FIG. 12K: Frequency of TOX expression within T-bet$^+$ and Eomes$^+$ CAR.BBζ (red) and CAR.BBΔζ T cells (white). FIG. 12L: Memory distribution of 2B4$^+$PD-1$^+$TIGIT$^+$ (green) and Eomes$^{hi}$T-bet$^{dim}$ (purple) CAR.BBζ T cells. For FIGS. 12F, 12I, 12J, 12K: Wilcoxon rank sum test used to calculate significance (P<0.01, *P<0.001, ****P<0.0001). Bars and closed symbols indicate mean and error bars show±SEM.

FIGS. 13A and 13C: Concentration of peripheral total memory CD4$^+$ T cells in HIV$_{JRCSF}$- and HIV$_{MJ4}$-infected mice, respectively. FIGS. 13H-13I: Aggregate data from both infection studies. FIGS. 13P-13Q: Total number of splenic CAR T cells (FIG. 13P) and cumulative CAR T cell persistence (FIG. 13Q) at 5 weeks post-infection. For FIGS. 13A, 14C, and 13E: Wilcoxon rank sum test used to calculate significance. For FIGS. 13H, 14I, and 13K: Friedman's test followed by Dunn's multiple comparisons test used to calculate significance. For all data, *P<0.05, P<0.01, *P<0.001, ****P<0.0001. Bars and closed symbols indicate mean and errors bars show±SEM. Sample sizes in these studies indicate biologically independent animals.

FIGS. 14A-14N: HIV-resistant Dual-CAR (BBζ.28ζ) T cells exhibit superior virus-specific immunity in vivo. FIG. 14A: Schematic of HIV-resistant (C34-CXCR4+) Dual-CAR (BBζ.28ζ) T cells. FIG. 14B: HIV$_{JRCSF}$-infected BLT mice received 10$^7$ CAR T cells 48 hours post-challenge. HIV proviral (DNA) load in CAR T cells from individual mouse splenic tissue (n=8). FIGS. 14C-14D: HIV$_{MJ4}$-infected mice were infused 48 hours post-challenge with 10$^6$ C34-CXCR4+, purified CAR T cells containing either CAR.BBz (red; n=6), CAR.28ζ (purple; n=6) or CAR.BBζ28ζ (blue; n=4) intracellular domains. FIG. 14C: Longitudinal peripheral CAR T cell concentration. FIG. 14D: Peak peripheral CAR T cell frequency out of CD3+ cells. FIGS. 14E-14M: HIV$_{MJ4}$-infected mice were infused 48 hours post-challenge with 10$^6$ purified C34-CXCR4+ CAR T cells containing either CAR.BBζ.BBζ (red; n=5), CAR.28ζ.28ζ (purple; n=5) or CAR.BBζ.28ζ (blue; n=5) intracellular domains. FIG. 14E: Frequency of CAR T cell populations out of total huCD45+ cells at 3 weeks post-infection and FIG. 14F: longitudinal peripheral CAR T cell concentration. FIG. 14G: Cumulative peripheral CAR T cell persistence. FIG. 14H: Distribution of peripheral blood CCR5 expression within memory CD4+ T cells (green), and FIG. 14I: concentration of total memory CD4+ T cells (top) and CCR5+ CD4+ T cells (bottom) 6 weeks after infection. FIG. 14J: Representative FACS plots and FIG. 14K: frequency of MIP-1β+ and CD107a+ CD8+ CAR T cells from tissue at 8 weeks post-infection after ex vivo stimulation with K.Env cells. FIG. 14L: Distribution and FIG. 14M: frequency of CD107a+ CAR T cells within total granzyme B+ perforin+ T cells (black) from tissues after ex vivo stimulation. FIG. 14N: Frequency of MIP-1β+ and CD107a+ CD8+ CAR T cells from tissue at 8 weeks post-infection after ex vivo stimulation. For FIG. 14B, Wilcoxon matched pairs signed rank test used to calculate significance. For FIGS. 14C, 14D, 14F, 14G, 14I, 14K, 14M, 14N: Wilcoxon rank sum test used to calculate significance. For all data, *P<0.05, **P<0.01. Bars and closed symbols unless indicated otherwise represent mean and error bars show±SEM.

FIGS. 15A-15M: Mitigating CAR T cell infection improves control over HIV replication. FIG. 15A: Mean log plasma viral RNA (copies mL$^{-1}$) of active, unprotected CAR T cell-treated mice (maroon; n=38) and inactive or no CAR T cell-treated mice (black; n=36). Data is aggregated across 6 independent studies. Thin dotted line denotes limit of quantification. FIG. 15B: Mean log plasma HIV$_{MJ4}$ RNA (copies mL$^{-1}$) after ART discontinuation of mice infused at ART initiation with 10$^7$ fully-protected >98% C34-CXCR4+ (n=4; green) or partially-protected <20% C34-CXCR4+ (n=7; gray) Dual-CAR TCP, or no TCP (black dotted; n=9). FIG. 15C: Mean log plasma viral RNA (copies mL$^{-1}$) in mice infused 48 hours after HIV$_{MJ4}$ challenge with 10$^7$ fully protected (>98% C34-CXCR4+) Dual-CAR TCP (green; n=12) or no TCP mice (black; n=12). FIGS. 15D-15E: HIV$_{JRCSF}$-infected mice were ART-treated and simultaneously infused with 10$^7$ HIV-resistant Dual-CAR TCP (green; n=10), inactive Dual-ΔCAR TCP (white; n=5), or no TCP (white; n=6). FIG. 15D: Mean log plasma HIV RNA (copies mL$^{-1}$). Shaded box indicates ART and arrow indicates TCP infusion. FIG. 15E: Percent log reduction in plasma HIV RNA from pre-ART (week 3) to 1 and 1.5 weeks post-ART. FIGS. 15F and 15G: HIV$_{BAL}$-infected mice were ART-treated and simultaneously infused with 10$^7$ HIV-resistant Dual-CAR TCP (green n=6) or no TCP (black; n=6). FIG. 15F: Mean log plasma viral RNA in mice. Shaded box indicates ART and arrow indicates TCP infusion. FIG. 15G: Percent log reduction in plasma viral RNA from pre-ART (week 3) and 0.5 and 1 week post-ART. FIGS. 15H and 15I: Data aggregated from both HIV$_{JRCSF}$- and HIV$_{BAL}$-infected cohorts. FIG. 15H: Correlation between percent viral load reduction at first post-ART time-point and contemporaneous peripheral CAR T cell concentration. FIG. 15I: Kaplan-Meier curve of time to viral suppression after treatment initiation for Dual-CAR TCP versus control mice. FIG. 15J: Correlation between percentage viral load reduction at first post-ART time-point and contemporaneous peripheral CAR T cell concentration. FIG. 15K-15L: Frequency of HIV-infected CD8− T cells (CAR−) (FIG. 15K) and HIV-infected CD14+ macrophages (FIG. 15L) aggregated from various tissues of plasma viremia suppressed mice. FIG. 15M: Cell-associated HIV DNA load in sorted central memory (CAR−CD45RA−CCR7+) CD4+ T cells. Statistical significance calculated for FIG. 15A and FIGS. 15D-15G and 15K-M by Wilcoxon rank sum test, FIGS. 15H and 15J by Spearman correlation, and FIG. 15I by Log-rank test. For all data, *P<0.05, P<0.01, and *P<0.001. Bars indicate mean and error bars show±SEM.

FIGS. 16A-16H: BLT-mouse derived HIV-specific CAR T cells are multifunctional in vitro. FIG. 16A: Schematic for the manufacturing of BLT mouse-derived CAR T cells. FIG. 16B: Representative growth kinetics of BLT mouse-derived (brown) and adult human PBMC-derived (black) CAR.ζ T cells following activation with anti-CD3/CD28 Dynabeads. FIG. 16C: Representative FACS plots of CD4+ CAR.ζ T cells expressing MIP-1β, TNF, IL-2 and GM-CSF after stimulation with K562 cells expressing HIV$_{YU2}$ GP160 protein (K.Env) in vitro. FIG. 16D: Quantification of intracellular expression of the indicated effector molecules by CD8+ CAR.ζ T cells and FIG. 16E: CD4+ CAR.ζ T cells. Data shows expression of each molecule from 3 distinct donors per source. FIG. 16F: Representative FACS plots and FIG. 16G: cumulative data demonstrating the coordinated upregulation of granzyme B and perforin in BLT mouse-derived and human donor-derived CAR.ζ T cells following stimulation with K.Env cells (stim) or wild-type K562s (unstim) in vitro. FIG. 16H: Schematic of gating strategy used to identify active caspase-3+ HIVGAG+target cells for analysis of HIV elimination assay. Data shows expression from 3 distinct donors per source. For data in FIG. 16C, line and error bars indicate mean±SEM.

FIGS. 18A-18C: CAR.BBζ T cells fail to prevent CD4$^+$ T cell loss after the discontinuation of ART. FIG. 18A: Percentage of CAR$^-$ CD4$^+$ T cells out of total CD3$^+$ cells from the indicated tissues in BLT mice treated with CAR.BBζ T cells (G1; red) or control CAR.BBΔζ (G2; white) T cells, 12 weeks after the discontinuation of ART, and FIG. 18B: 9 weeks after the discontinuation of ART for G3/4. FIG. 18C: Schematic of gating strategy used to identify total memory CD4+ T cells (CAR−). Bars indicate mean and error bars show±SEM. N/A denotes tissue samples where the cell recovery was too low for analysis.

FIGS. 19A-19B: HIV infection preferentially depletes memory CD4$^+$ T cells in BLT mice. FIG. 19A: Mean plasma viral RNA (copies mL$^{-1}$) for mice in G1 (thick line; right axis) and frequency of post-challenge peripheral memory (CD45RA$^-$) CD4$^+$ T cells in HIV$^-$ mice (white) and HIV$^+$ mice (G1; black) (left y-axis). Thin dotted line denotes limit of quantification. Shaded box indicates window of ART. Symbols indicate mean and error bars show±SEM. FIG. 19B: Frequency of CCR5 expression on the indicated populations of CD4$^+$ T cells from the peripheral blood of BLT mice.

FIG. 20A: Frequency of CD4$^+$ and FIG. 20B: CD8$^+$ CAR.BBζ T cells (G1; red) and control CAR.BBDz T cells (G2; white) co-expressing TIGIT and PD-1 after infusion. Shaded box indicates the window of ART. FIG. 20C: Frequency of CD4$^+$ and FIG. 20D CD8$^+$ CAR.BBζ T cells (G1; red) and control CAR.BBΔζ T cells (G2; white) co-expressing TIGIT, PD-1 and 2B4 in tissues 12 weeks after infusion. FIG. 20E: Cumulative data indicating the frequency of 2B4$^+$, PD-1$^+$ and TIGIT$^+$ CD4$^+$ CAR.BBζ T cells (G1; red) compared to CAR$^-$ CD4$^+$ T cells (G1; diagonal lines) within the spleens of the same mice, and FIG. 20F: CD8$^+$ CAR.BBζ T cells (G1; red) compared to CAR$^-$ CD8$^+$ T cells (G1; diagonal lines) within the spleens of the same mice. Symbols and bars indicate mean and error bars show±SEM. For data in FIGS. 20C-20F, significance was calculated using Wilcoxon rank sum test (*P<0.05 and **P<0.01).

FIG. 21A: Representative FACS plots show the change in Eomes and T-bet expression within the different CAR T cells over time. FIG. 21B: Summary data indicating the longitudinal frequency of Eomes$^{hi}$T-bet$^{dim}$ CD4$^+$ and CD8$^+$ CAR T cells (left y-axis), and mean log plasma viral RNA (copies mL$^{-1}$) (right y-axis). Thin dotted line denotes limit of quantification. The symbols indicate mean and error bars show±SEM.

FIG. 22A: Representative FACS plots, and FIG. 22B: cumulative data for the expression of MIP-1β, granzyme B and CD107a in CD8$^+$ CAR.BBζ T cells (red) and CD8$^+$ CAR.BBΔζ T cells (white). The dotted line indicates the frequency of CD8$^+$ CAR.BBz T cells from the pre-infusion TCP expressing the indicated marker. The bars indicate mean and the error bars show±SEM. Significance was calculated using Wilcoxon rank sum test (*P<0.05 and ***P<0.001).

FIG. 23A: Schematic of lentiviruses that were used to co-transduce T cells. Each HIV-specific (CD4-based) CAR was linked to a unique fluorescent protein: iRFP670.T2A.CAR.BBζ, and GFP.T2A.CAR.28ζ to facilitate identification of each CAR T cell population by flow cytometry. FIG. 23B: FACS plot illustrating the three populations of CAR T cells that result from the co-transduction with the lentiviruses described in FIG. 23A. The resulting Dual-CAR T cell product comprises: CAR.BBζ, CAR.28ζ and Dual-CAR.BBζ.28ζ T cells. FIG. 23C: After 10 days of culture, the HIV-specific Dual-CAR TCP was mixed with K.Env and wild-type K562 cells and upregulation of human cytokines measured. Each symbol represents a unique donor.

FIG. 24A: Mean log plasma viral RNA (copies mL$^{-1}$) in BLT mice challenged with HIV$_{JRCSF}$. Thin dotted line denotes limit of quantification. FIG. 24B: Peripheral concentration of central memory (CD45RA$^-$CD27$^+$CCR7$^+$; left panel), transitional memory (CD45RA$^-$CD27$^+$CCR7$^-$; middle panel), and effector memory (CD45RA$^-$CD27$^-$CCR7$^-$; right panel) CAR$^-$ CD4$^+$ T cells. FIG. 24C: Frequency of memory CD4$^+$ T cell subsets in tissues 8 weeks post-infection. Symbols and bars indicate mean, and error bars show±SEM. For data in FIG. 24B, significance was calculated using Wilcoxon rank sum test (*P<0.05, **P<0.01).

FIG. 25A: In vitro replication assay comparing the replication kinetics of HIV$_{JRCSF}$ and HIV$_{MJ4}$ in human PBMCs stimulated with PHA and infected at a matched multiplicity of infection of 0.002. Virus replication was assessed by measuring p24 antigen in culture supernatants. FIG. 25B: Mean log plasma viral RNA (copies mL$^{-1}$) in BLT mice challenged with HIV$_{JRCSF}$ (black; n=3) or HIV$_{MJ4}$ (pink; n=4). Thin dotted line denotes limit of quantification. Symbols indicate mean values and error bars show±SEM. For data in FIG. 25B, significance was calculated using Wilcoxon rank sum test (*P<0.05).

FIG. 26A: Mean log plasma viral RNA (copies mL$^{-1}$) in BLT mice challenged with HIV$_{MJ4}$. Thin dotted line denotes limit of quantification. FIG. 26B: Peripheral concentration of central memory (CD45RA$^-$CD27$^+$CCR7$^+$; right panel), transitional (CD45RA$^-$ CD27$^+$CCR7$^-$; middle panel), and effector memory (CD45RA⁻CD27⁻CCR7⁻; left panel) CAR⁻ CD4⁺ T cells. FIG. 26C: Frequency of memory CD4⁺ T cell subsets in tissues 8 weeks after infection. Symbols and bars indicate mean, while error bars show±SEM. For data in FIG. 26B, significance was calculated using Wilcoxon rank sum test (**P<0.01).

FIG. 27A: BLT mice were challenged with either $HIV_{JRCSF}$ (n=6) or $HIV_{MJ4}$ (n=6) and infused with 2×10⁷ Dual-CAR T cell product (TCP). Fold-change in CAR T cell concentration from baseline to peak levels in peripheral blood. Data is the aggregate of both infection cohorts. FIG. 27B: Frequency of CD8⁺ and FIG. 27C: CD4⁺ CAR T cell populations from tissue within the same $HIV_{JRCSF}$-infected mice (n=5) expressing CD107a, MIP-1β, IL-2 and TNF after stimulation with K.Env cells ex vivo. For all data, bars indicate mean and error bars show±SEM. Significance was calculated using Wilcoxon rank sum test (P<0.01, *P<0.001).

FIG. 28A: Representative FACS plots and FIG. 28B cumulative data show the frequency of $HIV_{GAG}^+$ T cell populations sampled within the same BLT mice (n=5) 10 weeks post $HIV_{JRCSF}$ infection. Data in FIG. 28B is the aggregate of tissues: bone marrow, liver, lung, lymph node, terminal blood and spleen from 5 BLT mice. FIG. 28C: Representative FACS plots and FIG. 28D: cumulative data showing the expression of granzyme B and perforin within $HIV_{GAG}^+$ and $HIV_{GAG}^-$ CAR T cell populations from $HIV_{JRCSF}$-infected BLT mice after ex vivo stimulation with K.Env (stim) and wild-type K562 cells. For data in FIG. 28D, the data is represented as the average of 3 distinct CAR T cell populations. Significance was calculated using paired t test (*P<0.05). Symbols and bars indicate mean and error bars show±SEM.

FIG. 29A: FACS plots show C34-CXCR4-transduced T cells within each T cell population that comprises the Dual-CAR T cell product (TCP). The expression of C34-CXCR4 was linked to mCherry. FIG. 29B: Mean log plasma viral RNA (copies mL⁻¹) in BLT mice challenged with $HIV_{JRCSF}$ and 48 hours later mice were infused with HIV-resistant (C34-CXCR4⁺) Dual-CAR TCP (green; n=6), or no TCP (black; n=8). Thin dotted line denotes limit of quantification.

FIG. 30A: BLT mice were infected with $HIV_{JRCSF}$ and 48 hours later infused with 10⁷C34-CXCR4⁺ Dual-CAR T cell product. Representative FACS plots indicate the frequency of C34-CXCR4⁺ throughout infection. FIG. 30B: BLT mice were infected with $HIV_{MJ4}$ and 48 hours later were infused with 10⁶ purified C34-CXCR4⁺ CAR T cells: CAR.BBζ (n=5), CAR.28z (n=5) and CAR.BBζ28ζ (n=4). Frequency of C34-CXCR4⁺ CAR T cells in tissue 8 weeks post-infection. Thin dotted line indicates the frequency of C34-CXCR4⁺ CAR T cells in the pre-infusion TCP. FIGS. 30B-30C: BLT mice were infected with $HIV_{MJ4}$ and 48 hours later received 10⁶ purified C34-CXCR4⁺ Dual-CAR T cells: CAR.BBζ.BBζ (n=3), CAR.28ζ.28ζ (n=4) and CAR.BBζ.28ζ (n=3). FIG. 30B: Representative FACS plots and FIG. 30C: cumulative data show the frequency of each CD8⁺ CAR T cell population expressing MIP-1β and CD107a, and the frequency of CAR T cells with cytotoxic potential (granzyme B⁺ perforin⁺ CD107a⁺). CAR T cells were isolated from the spleen and bone marrow from BLT mice 8 weeks post infection and stimulated ex vivo with K.Env and wild-type K562 cells. Each symbol represents individual mice. Significance was calculated using Wilcoxon matched-pairs signed rank test (**P<0.01).

FIG. 32A: Schematic of lentivirus constructs used to generate Dual-CAR T cells. The HIV-specific (CD4-based) CAR with the 4-1BB/CD3-ζ or CD28/CD3-ζ endodomains were linked with NGFR or truncated EGFR (EGFRt) to enable positive magnetic selection during the T cell manufacturing process. FIG. 32B: Time line for CAR T cell manufacturing process. One day after T cell activation with αCD3/CD28 Dynabeads, the cells were transduced with the lentivirus constructs depicted in FIG. 32A. On days 4 and 7 after activation, the CAR T cells were positively selected using anti-EGFR and anti-NGFR coated magnetic beads as described in Materials and Methods. FIG. 32C: Representative FACS plots illustrating the purity of the pre-infusion Dual-CAR TCP after EGFR and NGFR selection. FIG. 32D: FACS plots indicate the frequency of CAR.BBz.BBz, CAR.28z.28z, and Dual-CAR T cells post-selection in their respective pre-infusion T cell products, prior to adoptive transfer into mice described in FIGS. 14E-14N.

FIG. 33A: Fold-change in the concentration of CAR T cells in peripheral blood between weeks 3 and 2 post-HIV challenge. The number above the bars indicate mean fold-change. FIG. 33B: Absolute count of each CAR T cell population in tissues 8 weeks post-infection. FIG. 33C: Concentration of total memory (CD45RA⁻) and FIG. 33D: CD45RA⁻CCR5⁺ CAR⁻CD4⁺ T cells in peripheral blood. FIG. 33E: Association between fold-change in the concentration of CAR T cells and change in total memory (CD45RA⁻) CD4⁺ T cells in peripheral blood between weeks 3 and 2 post-challenge. Each symbol represents an individual mouse. For data in FIGS. 33A-33D, the bars and symbols indicate mean and error bars show±SEM. For data in FIG. 33E, Spearman correlation was used to calculate significance.

FIG. 34A: $HIV_{JRCSF}$-infected BLT mice were infused with 10⁷ C34-CXCR4 co-transduced Dual-CAR TCP 48 hours post-challenge. Mice were sacrificed weekly after infection and spleens were processed into single cell suspension and bulk sorted by FACS following the depicted gating strategy. Cell-associated HIV DNA was subsequently quantified in sorted C34-CXCR4⁺ and C34-CXCR4⁻ CAR T cells by digital droplet PCR. FIG. 34B: For the study described in FIG. 15D, endogenous central memory CD4+ T cells (CAR−) were sorted from splenocytes harvested at necropsy (7 weeks post-infection) following the depicted gating strategy. For all data, cell-associated HIV DNA load was quantified on sorted cell populations by droplet-digital PCR.

FIGS. 36A-36F: CAR.BBζ T cells accumulate multiple inhibitory receptors as disease progresses. FIG. 36A, Frequency of CD4+ and (FIG. 36B) CD8+ CAR.BBζ T cells (G1; n=6) and CAR.BBΔζ T cells (G2; n=6) co-expressing TIGIT and PD-1 after infusion. Shaded box indicates the window of ART. Symbols and error bars indicate mean±SEM. FIG. 36C, Frequency of CD4+ and (FIG. 36D) CD8+ CAR.BBζ T cells (G1) and CAR.BBΔζ T cells (G2) co-expressing TIGIT, PD-1 and 2B4 in tissues 12 weeks post-infusion. FIG. 36E, Cumulative data indicating; the frequency of 2B4+, PD-1+ and TIGIT+ CD4+ CAR:BBζ T cells (G1) compared to CARCD4+ T cells (G1) within the spleens of the same mice, and (FIG. 36F) CD8+ CAR:BBζ T cells (G1) compared to CAR− CD8+ T cells (G1) within the spleens of the same mice. FIGS. 36C-36F, Bars indicate mean, error bars show ±SEM and symbols represent individual mice. Significance was calculated using two-sided Wilcoxon rank-sum test. Sample sizes in these studies represent biologically independent animals.

FIG. 37A: FACS plots show the change in Eomes and T-bet expression within the different CAR cell types over time. FIG. 37B: Summary data indicating the longitudinal frequency of EorneshiT-betdim CD8+ (left panel) and CD4+ (right panel) CAR T cells (left y-axis), and mean log plasma HIV RNA (copies mL-1) (right y-axis). Thin dotted line denotes limit of viral load quantification. Symbols and error bars indicate mean±SEM. FIG. 37C: Spearman correlation analysis of frequency of EomeshiT-betdim CD8+ CAR.BBζ T cells compared with viral burden measured as the frequency of HIVGAG+ CD8− T cells in various tissues 10 weeks post-infection. Sample sizes in these studies indicate biologically independent animals.

FIG. 38A: Concentration of peripheral total memory CD4+ T cells (CAR−). FIG. 38B: Concentration of peripheral central memory (CD45RA−CD27+CCR7+; left panel), transitional memory (CD45RA−CD27+CCR7−; middle panel), and effector memory (CD45RA−CD27−CCR7−; right panel) CD4+ T cells (CAR−). FIG. 38C: Frequency of memory CD4+ T cell (CAR−) subsets in tissues 8 weeks post-infection. FIGS. 38A and 38B: Significance was calculated using a two-sided Wilcoxon rank-sum test. Symbols and bars indicate mean, and error bars show±SEM. Sample sizes indicate biologically independent animals.

FIG. 39A: Concentration of peripheral total memory CD4+ T cells (CAR−), FIG. 39B: Concentration of peripheral central memory (CD45RA−CD27+CCR7+; right panel), transitional memory (CD45RA−CD27+CCR7−; middle panel), and effector memory (CD45RA−CD27−CCR7−; left panel) CD4+ T cells (CAR−). FIG. 39C: Frequency of memory CD4+ T cell (CAR−) subsets in tissues 8 weeks post-infection. FIGS. 39A and 39B: Significance was calculated using a two-sided Wilcoxon rank-sum test. Symbols and bars indicate mean, while error bars show±SEM. Sample sizes indicate biologically independent animals.

FIGS. 40A-40E—Extended Data FIG. 6|Dual-CAR T cells exhibit superior in vivo expansion compared to 4-1BB-costimulated, CD28-costimulated, and 3rd-generation CAR T cells, FIG. 40A: BLT mice were challenged with either HIVJRCSF (n=6) or HIVMJ4 (n=6) and infused with 2×107 Dual-CAR T cell product (TCP). Fold-change in CAR T cell concentration from baseline to peak levels in peripheral blood. Data is the aggregate of both infection cohorts. FIG. 40A: Schematic shows the structural components of the 3rd-generation (3 G) CD4-based CAR construct. FIGS. 40C-40E: Dual-CAR T cell product and 3G-CAR T cells were combined at an equal frequency prior to infusion into uninfected mice (n=9). FIG. 40C: FACS plots indicate the frequency of Dual-CAR and 3G-CAR T cells present within the pre-infusion T cell product. FIG. 40D: Longitudinal concentration of peripheral CAR T cells following adoptive transfer into HIV-negative mice. Symbols and error bars indicate mean±SEM. FIG. 40E: At 2 weeks post-infusion, mice received either 107 irradiated K.Env cells (n=6) or 107 irradiated K.WT cells (n=3). Fold change in the concentration of peripheral CAR T cells 1-week post-K562 infusion from baseline concentration prior to K562 infusion. FIGS. 40A and 40E: Bar and error bars indicate mean±SEM, and symbols represent individual mice. FIGS. 40A, 40D, and 40E: Two-sided Wilcoxon rank-sum test was used to calculate significance. Sample sizes in these studies indicate biologically independent animals.

FIG. 41A: BLT mice were infected with HIVJRCSF and 48 h later infused with 107 C34-CXCR4+ Dual-CAR T cell product (TCP). FACS plots indicate the frequency of C34-CXCR4+ throughout infection. FIG. 41B: Mice were infected with HIVMJ4 and 48 h later were infused with 106 C34-CXCR4+ CAR.BBζ (n=5), CAR.28ζ (n=5), or purified Dual-CAR (n=4) T cells. Frequency of C34-CXCR4+ CAR T cells in tissue 8 weeks post-infection. Thin dotted line indicates the frequency of C34-CXCR4+ CAR T cells in the pre-infusion TCP for the indicated CAR T cell type. Line and error bars indicate mean±SEM. FIGS. 41C and 41D: Mice were infected with HIVMJ4 and 48 h later received 106 C34-CXCR4+, purified CAR.BBζ.BBζ (n=3), CAR.28ζ.28ζ (n 4), or Dual-CAR (n=3) T cells. FIG. 41C: FACS plots and FIG. 41D: cumulative data show the frequency of each CD8+ CAR T cell population expressing MIP-1β and CD107a, and the frequency of CAR T cells with cytotoxic potential (granzyme B+ perforin+ CD107a+). CAR T cells were isolated from the spleen and bone marrow of mice 8 weeks post-infection and ex vivo stimulated. Significance was calculated using two-sided Wilcoxon matched-pairs signed rank test. For all data, symbols represent individual mice. Sample sizes in these studies indicate biologically independent animals.

FIG. 42A: Representative FACS plots and FIG. 42B: cumulative data shows the induction of active caspase-3 within the different target cell populations. Symbols and error bars indicate mean±SEM. Sample size indicates biologically independent animals.

FIG. 43A: Frequency of CD8+ and FIG. 43B: CD4+ CAR T cell populations from tissue at necropsy (8-weeks post-infection) within the same mice expressing CD107a, MIP-1β, IL-2 and TNF after ex vivo stimulation. Bars and error bars indicate mean±SEM, and symbols represent individual mice. Significance was calculated using two-sided Wilcoxon rank-sum test.

FIG. 44A: Frequency of HIVGAG+ CD8− T cells (CAR-) within the bone marrow and spleen of HIVJRCSF-infected mice (n=6) and FIG. 44B: HIVMJ4-infected mice (n=6) that were treated 48 h post-challenge with the Dual-CAR T cell product (TCP) or were untreated (Untx). Significance was calculated by two-sided Wilcoxon rank-sum test. Sample sizes in these studies indicate biologically independent animals.

DETAILED DESCRIPTION

Definitions

Figure 1:
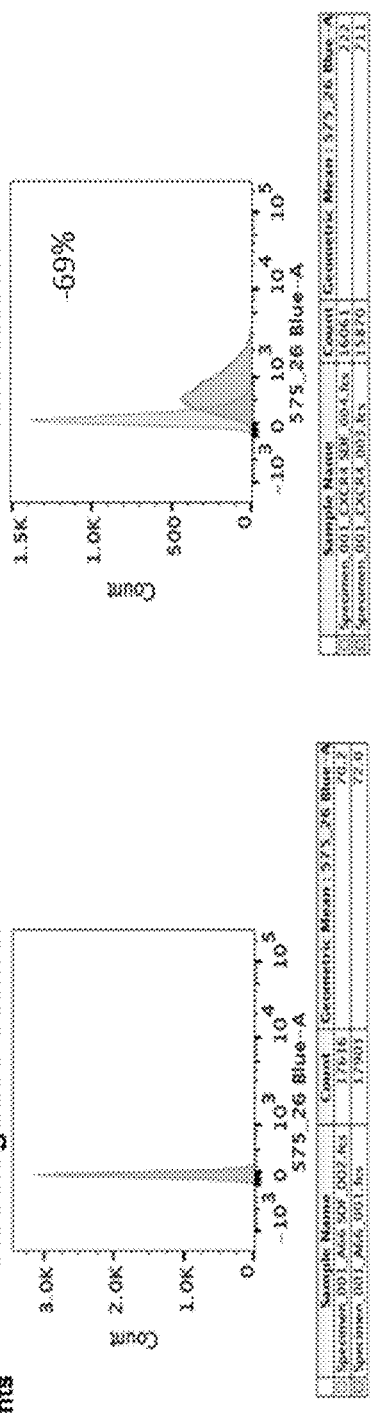
FIG. 1 shows results of a SDF-1 Response Assay (A66 Negative Control; A66 CXCR4; A66 C34-CXCR5, D97N).
Figure 1:
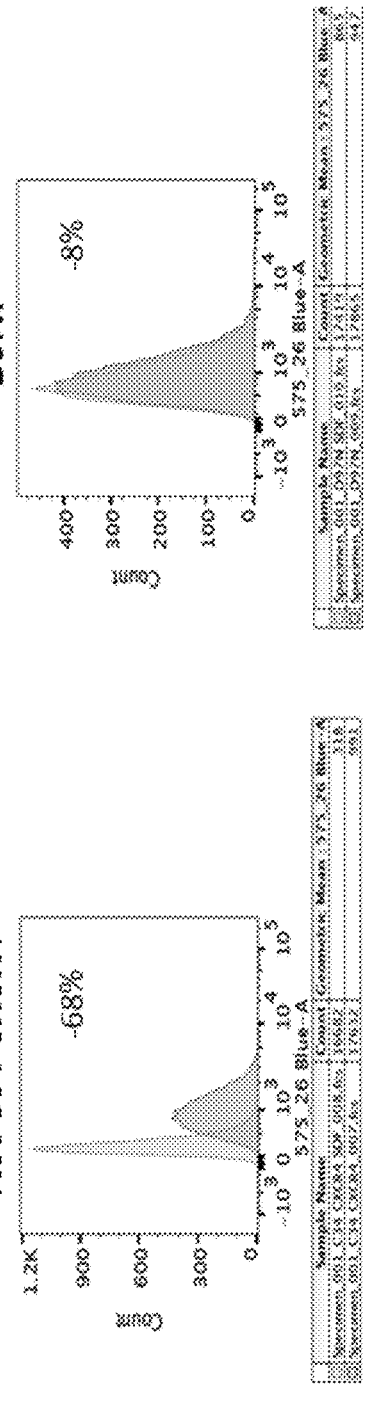

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used.

It is also to be understood that the terminology used herein is for the purpose of describing particular embodiments only, and is not intended to be limiting.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

"Activation," as used herein, refers to the state of a T cell that has been sufficiently stimulated to induce detectable cellular proliferation. Activation can also be associated with induced cytokine production, and detectable effector functions. The term "activated T cells" refers to, among other things, T cells that are undergoing cell division.

The term "antibody," as used herein, refers to an immunoglobulin molecule which specifically binds with an antigen. Antibodies can be intact immunoglobulins derived from natural sources or from recombinant sources and can be immunoreactive portions of intact immunoglobulins. Antibodies are typically tetramers of immunoglobulin molecules. The antibodies in the present invention may exist in a variety of forms including, for example, polyclonal antibodies, monoclonal antibodies, Fv, Fab and F(ab)$_2$, as well as single chain antibodies (scFv) and humanized antibodies (Harlow et al., 1999, In: Using Antibodies: A Laboratory Manual, Cold Spring Harbor Laboratory Press, NY; Harlow et al., 1989, In: Antibodies: A Laboratory Manual, Cold Spring Harbor, New York; Houston et al., 1988, Proc. Natl. Acad. Sci. USA 85:5879-5883; Bird et al., 1988, Science 242:423-426).

The term "antibody fragment" refers to a portion of an intact antibody and refers to the antigenic determining variable regions of an intact antibody. Examples of antibody fragments include, but are not limited to, Fab, Fab', F(ab')$_2$, and Fv fragments, linear antibodies, scFv antibodies, and multispecific antibodies formed from antibody fragments.

An "antibody heavy chain," as used herein, refers to the larger of the two types of polypeptide chains present in all antibody molecules in their naturally occurring conformations.

An "antibody light chain," as used herein, refers to the smaller of the two types of polypeptide chains present in all antibody molecules in their naturally occurring conformations. Kappa (κ) and lambda (λ) light chains refer to the two major antibody light chain isotypes.

The term "synthetic antibody" as used herein, refers to an antibody which is generated using recombinant DNA technology, such as, for example, an antibody expressed by a bacteriophage as described herein. The term should also be construed to mean an antibody which has been generated by the synthesis of a DNA molecule encoding the antibody and which DNA molecule expresses an antibody protein, or an amino acid sequence specifying the antibody, wherein the DNA or amino acid sequence has been obtained using synthetic DNA or amino acid sequence technology which is available and well known in the art.

The term "antigen" or "Ag" as used herein is defined as a molecule that provokes an immune response. This immune response may involve either antibody production, or the activation of specific immunologically-competent cells, or both. The skilled artisan will understand that any macromolecule, including virtually all proteins or peptides, can serve as an antigen. Furthermore, antigens can be derived from recombinant or genomic DNA. A skilled artisan will understand that any DNA, which comprises a nucleotide sequences or a partial nucleotide sequence encoding a protein that elicits an immune response therefore encodes an "antigen" as that term is used herein. Furthermore, one skilled in the art will understand that an antigen need not be encoded solely by a full length nucleotide sequence of a gene. It is readily apparent that the present invention includes, but is not limited to, the use of partial nucleotide sequences of more than one gene and that these nucleotide sequences are arranged in various combinations to elicit the desired immune response. Moreover, a skilled artisan will understand that an antigen need not be encoded by a "gene" at all. It is readily apparent that an antigen can be generated, synthesized or derived from a biological sample. Such a biological sample can include, but is not limited to a tissue sample, a cell or a biological fluid.

The term "auto-antigen" means, in accordance with the present invention, any self-antigen which is recognized by the immune system as being foreign. Auto-antigens comprise, but are not limited to, cellular proteins, phosphoproteins, cellular surface proteins, cellular lipids, nucleic acids, glycoproteins, including cell surface receptors.

The term "autoimmune disease" as used herein is defined as a disorder that results from an autoimmune response. An autoimmune disease is the result of an inappropriate and excessive response to a self-antigen. Examples of autoimmune diseases include but are not limited to, Addision's disease, alopecia areata, ankylosing spondylitis, autoimmune hepatitis, autoimmune parotitis, Crohn's disease, diabetes (Type I), dystrophic epidermolysis bullosa, epididymitis, glomerulonephritis, Graves' disease, Guillain-Barr syndrome, Hashimoto's disease, hemolytic anemia, systemic lupus erythematosus, multiple sclerosis, myasthenia gravis, pemphigus vulgaris, psoriasis, rheumatic fever, rheumatoid arthritis, sarcoidosis, scleroderma, Sjogren's syndrome, spondyloarthropathies, thyroiditis, vasculitis, vitiligo, myxedema, pernicious anemia, ulcerative colitis, among others.

As used herein, the term "autologous" refers to any material derived from the same individual to which it is later re-introduced into the individual.

"Allogeneic" refers to a graft or infusion derived from a different animal of the same species.

"Xenogeneic" refers to a graft or infusion derived from an animal of a different species.

The term "cancer" as used herein refers to a disease characterized by the rapid and uncontrolled growth of aberrant cells. Cancer cells can grow locally in its tissue of origin or spread through the bloodstream and lymphatic system to other parts of the body. Examples of various cancers include but are not limited to, breast cancer, prostate cancer, ovarian cancer, cervical cancer, skin cancer, pancreatic cancer, colorectal cancer, renal cancer, liver cancer, brain cancer, lymphoma, leukemia, lung cancer and the like. In certain embodiments, the cancer is medullary thyroid carcinoma.

The term "chimeric antigen receptor" or "CAR," as used herein, refers to a non-MHC-restricted synthetic antigen-specific immune receptor that is engineered to be expressed on an immune effector cell. CARs are commonly used to engineer cells, subsequently referred to as "CAR T cells". To make a CAR T cell, T cells are removed from a patient and modified to express one or more receptors specific to a particular antigen(s) of interest. CARs are delivered to patients generally as an intravenous infusion through a process referred to as adoptive cell transfer. In some embodiments, the CARs specifically bind HIV or an HIV-associated antigen, for example. CARs may also comprise an intracellular activation domain, a transmembrane domain and an extracellular domain comprising a tumor-associated antigen binding domain or a tumor-specific antigen binding domain. In some aspects, CARs constructs comprise nucleic acids encoding (1) a single-chain variable fragment (scFv) targeting a clinically-relevant antigen derived from a monoclonal antibody, (2) a transmembrane domain, (3) one or more costimulatory domains, and (4) an ITAM-containing signaling domain such as CD3-zeta. In some embodiments, a CAR can target cancers by redirecting the specificity of a T cell expressing the CAR specific for a HIV or HIV-associated antigen.

As used herein, the term "conservative sequence modifications" is intended to refer to amino acid modifications that do not significantly affect or alter the binding characteristics of the antibody containing the amino acid sequence. Such conservative modifications include amino acid substitutions, additions and deletions. Modifications can be introduced into an antibody of the invention by standard techniques known in the art, such as site-directed mutagenesis and PCR-mediated mutagenesis. Conservative amino acid substitutions are ones in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), beta-branched side chains (e.g., threonine, valine, isoleucine) and aromatic side chains (e.g., tyrosine, phenylalanine, tryptophan, histidine). Thus, one or more amino acid residues within the CDR regions of an antibody can be replaced with other amino acid residues from the same side chain family and the altered antibody can be tested for the ability to bind antigens using the functional assays described herein.

"Co-stimulatory ligand," as the term is used herein, includes a molecule on an antigen presenting cell (e.g., an aAPC, dendritic cell, B cell, and the like) that specifically binds a cognate co-stimulatory molecule on a T cell, thereby providing a signal which, in addition to the primary signal provided by, for instance, binding of a TCR/CD3 complex with an MEW molecule loaded with peptide, mediates a T cell response, including, but not limited to, proliferation, activation, differentiation, and the like. A co-stimulatory ligand can include, but is not limited to, CD7, B7-1 (CD80), B7-2 (CD86), PD-L1, PD-L2, 4-1BBL, OX40L, inducible costimulatory ligand (ICOS-L), intercellular adhesion molecule (ICAM), CD30L, CD40, CD70, CD83, HLA-G, MICA, MICB, HVEM, lymphotoxin beta receptor, 3/TR6, ILT3, ILT4, HVEM, an agonist or antibody that binds Toll ligand receptor and a ligand that specifically binds with B7-H3. A co-stimulatory ligand also encompasses, inter alia, an antibody that specifically binds with a co-stimulatory molecule present on a T cell, such as, but not limited to, CD27, CD28, 4-1BB, OX40, CD30, CD40, PD-1, ICOS, lymphocyte function-associated antigen-1 (LFA-1), CD2, CD7, LIGHT, NKG2C, B7-H3, and a ligand that specifically binds with CD83.

A "co-stimulatory molecule" refers to the cognate binding partner on a T cell that specifically binds with a co-stimulatory ligand, thereby mediating a co-stimulatory response by the T cell, such as, but not limited to, proliferation. Co-stimulatory molecules include, but are not limited to an MHC class I molecule, BTLA and a Toll ligand receptor.

A "co-stimulatory signal", as used herein, refers to a signal, which in combination with a primary signal, such as TCR/CD3 ligation, leads to T cell proliferation and/or upregulation or downregulation of key molecules.

The term "CRISPR/CAS," "clustered regularly interspaced short palindromic repeats system," or "CRISPR" refers to DNA loci containing short repetitions of base sequences. Each repetition is followed by short segments of spacer DNA from previous exposures to a virus. Bacteria and archaea have evolved adaptive immune defenses termed CRISPR-CRISPR-associated (Cas) systems that use short RNA to direct degradation of foreign nucleic acids. In bacteria, the CRISPR system provides acquired immunity against invading foreign DNA via RNA-guided DNA cleavage.

In the type II CRISPR/Cas system, short segments of foreign DNA, termed "spacers" are integrated within the CRISPR genomic loci are transcribed and processed into short CRISPR RNA (crRNA). These crRNAs anneal to trans-activating crRNAs (tracrRNAs) and direct sequence-specific cleavage and silencing of pathogenic DNA by Cas proteins. Recent work has shown that target recognition by the Cas9 protein requires a "seed" sequence within the crRNA and a conserved dinucleotide-containing protospacer adjacent motif (PAM) sequence upstream of the crRNA-binding region.

To direct Cas9 to cleave sequences of interest, crRNA-tracrRNA fusion transcripts, hereafter referred to as "guide RNAs" or "gRNAs," may be designed from the human U6 polymerase III promoter. The term "CRISPRi" refers to a CRISPR system for sequence specific gene repression or inhibition of gene expression at the transcriptional level.

"Effective amount" or "therapeutically effective amount" are used interchangeably herein, each referring to an amount of a compound, formulation, material, or composition, as described herein effective to achieve a particular biological result or provides a therapeutic or prophylactic benefit. Such results may include, but are not limited to, anti-tumor activity as determined by any means suitable in the art.

The term "effector" as used herein refers to a molecule or a protein or fragment thereof that alters, moderates, interferes with or blocks a signaling axis or a transcription modulator or fragment thereof that provides benefit to immune cell function. In some embodiments, effectors comprise effectors for: (1) limiting toxicities (sensing/preventing CRS, sensing/preventing cerebral toxicities); (2) overcoming checkpoint inhibition; (3) recruiting endogenous immune responses and improving persistence; (4) improving penetrance; and/or (5) improving persistence; (6) shifting engineered T cells into a preferred phenotype that provides therapeutic benefit; (7) modulating gene expression that provides benefit to immune cell function. In some embodiments, the effector blocks the IL-6 or another inflammatory signaling axis. The effector may be a cytokine, an interleukin, an interferon, a chemokine, a receptor, a ligand, an antibody or antibody fragment, a bispecific antibody, a checkpoint inhibitor antagonist, an agonist, an enzyme, a regulatory element, a transcription factor, or a DNA binding domain of a transcription factor.

"Encoding" refers to the inherent property of specific sequences of nucleotides in a polynucleotide, such as a gene, a cDNA, or an mRNA, to serve as templates for synthesis of other polymers and macromolecules in biological processes having either a defined sequence of nucleotides (i.e., rRNA, tRNA and mRNA) or a defined sequence of amino acids and the biological properties resulting therefrom. Thus, a gene encodes a protein if transcription and translation of mRNA corresponding to that gene produces the protein in a cell or other biological system. Both the coding strand, the nucleotide sequence of which is identical to the mRNA sequence and is usually provided in sequence listings, and the non-coding strand, used as the template for transcription of a gene or cDNA, can be referred to as encoding the protein or other product of that gene or cDNA.

As used herein "endogenous" refers to any material from or produced inside an organism, cell, tissue or system.

As used herein, the term "exogenous" refers to any material introduced from or produced outside an organism, cell, tissue or system.

The term "expand" as used herein refers to increasing in number, as in an increase in the number of T cells. In one embodiment, the T cells that are expanded ex vivo increase in number relative to the number originally present in the culture. In another embodiment, the T cells that are expanded ex vivo increase in number relative to other cell types in the culture.

The term "ex vivo" as used herein refers to cells that have been removed from a living organism, (e.g., a human) and propagated outside the organism (e.g., in a culture dish, test tube, or bioreactor).

The term "expression" as used herein refers to the transcription and/or translation of a particular nucleotide sequence driven by an endogenous or exogenous promoter.

"Expression vector" refers to a vector comprising a recombinant polynucleotide comprising expression control sequences. The expression control sequences may be operatively linked to a nucleotide sequence to be expressed. An expression vector comprises sufficient cis-acting elements for expression; other elements for expression can be supplied by the host cell or in an in vitro expression system. Expression vectors include all those known in the art, such as cosmids, plasmids (e.g., naked or contained in liposomes) and viruses (e.g., Sendai viruses, lentiviruses, retroviruses, adenoviruses, and adeno-associated viruses) that incorporate the recombinant polynucleotide.

"Humanized" forms of non-human (e.g., murine) antibodies are chimeric immunoglobulins, immunoglobulin chains or fragments thereof (such as Fv, Fab, Fab', F(ab')2 or other antigen-binding subsequences of antibodies) which contain minimal sequence derived from non-human immunoglobulin. For the most part, humanized antibodies are human immunoglobulins (recipient antibody) in which residues from a complementary-determining region (CDR) of the recipient are replaced by residues from a CDR of a non-human species (donor antibody) such as mouse, rat or rabbit having the desired specificity, affinity, and capacity. In some instances, Fv framework region (FR) residues of the human immunoglobulin are replaced by corresponding non-human residues. Furthermore, humanized antibodies can comprise residues which are found neither in the recipient antibody nor in the imported CDR or framework sequences. These modifications are made to further refine and optimize antibody performance. In general, the humanized antibody will comprise substantially all of at least one, and typically two, variable domains, in which all or substantially all of the CDR regions correspond to those of a non-human immunoglobulin and all or substantially all of the FR regions are those of a human immunoglobulin sequence. The humanized antibody optimally also will comprise at least a portion of an immunoglobulin constant region (Fc), typically that of a human immunoglobulin. For further details, see Jones et al., Nature, 321: 522-525, 1986; Reichmann et al., Nature, 332: 323-329, 1988; Presta, Curr. Op. Struct. Biol., 2: 593-596, 1992.

"Fully human" refers to an immunoglobulin, such as an antibody, where the whole molecule is of human origin or consists of an amino acid sequence identical to a human form of the antibody.

The term "sequence identity" as used herein refers to the degree of sequence identity between two polymeric molecules particularly between two polypeptide molecules. When two amino acid sequences have the same residues at the same positions; e.g., if a position in each of two polypeptide molecules is occupied by an Arginine, then they are identical at that position. The identity or extent to which two amino acid sequences have the same residues at the same positions in an alignment is often expressed as a percentage. The identity between two amino acid sequences is a direct function of the number of matching or identical positions; e.g., if half (e.g., five positions in a polymer ten amino acids in length) of the positions in two sequences are identical, the two sequences are 50% identical; if 90% of the positions (e.g., 9 of 10), are matched or identical, the two amino acids sequences are 90% identical.

The term "immunoglobulin" or "Ig," as used herein is defined as a class of proteins, which function as antibodies. Antibodies expressed by B cells are sometimes referred to as the BCR (B cell receptor) or antigen receptor. The five members included in this class of proteins are IgA, IgG, IgM, IgD, and IgE. IgA is the primary antibody that is present in body secretions, such as saliva, tears, breast milk, gastrointestinal secretions and mucus secretions of the respiratory and genitourinary tracts. IgG is the most common circulating antibody. IgM is the main immunoglobulin produced in the primary immune response in most subjects. It is the most efficient immunoglobulin in agglutination, complement fixation, and other antibody responses, and is important in defense against bacteria and viruses. IgD is the immunoglobulin that has no known antibody function, but may serve as an antigen receptor. IgE is the immunoglobulin that mediates immediate hypersensitivity by causing release of mediators from mast cells and basophils upon exposure to allergen.

The term "immune response" as used herein is defined as a cellular response to an antigen that occurs when lymphocytes identify antigenic molecules as foreign and induce the formation of antibodies and/or activate lymphocytes to remove the antigen.

"Isolated" means altered or removed from the natural state. For example, a nucleic acid or a peptide naturally present in a living animal is not "isolated," but the same nucleic acid or peptide partially or completely separated from the coexisting materials of its natural state is "isolated." An isolated nucleic acid or protein can exist in substantially purified form, or can exist in a non-native environment such as, for example, a host cell.

The term "knockdown" as used herein refers to a decrease in gene expression of one or more genes.

The term "knockout" as used herein refers to the ablation of gene expression of one or more genes.

The term "lentivirus" as used herein refers to viruses in a genus of the Retroviridae family. Lentiviruses are unique among the retroviruses in being able to infect non-dividing cells. In addition, they can deliver a significant amount of genetic information into the DNA of the host cell, so lentivirus-derived vectors are one of the most efficient gene delivery vectors available. HIV, SIV, and FIV are all examples of lentiviruses.

The term "modified" as used herein, refers to a changed state or structure of a molecule or cell of the invention. Molecules may be modified in many ways, including chemically, structurally, and functionally. Cells may be modified through the introduction of nucleic acids.

A "mutation" as used herein is a change in a sequence (e.g., an amino acid sequence of a protein) resulting in an alteration from a given reference sequence (which may be, for example, a wildtype amino acid sequence of a protein). In some embodiments, the mutation is a deletion and/or insertion and/or duplication and/or substitution of at least one amino acid. In some embodiments, the mutation produces a change in at least one function and/or activity of a protein. In some embodiments, a CXCR4 protein comprises a mutation which decreases or abolishes its signaling activity. In some embodiments, a CXCR4 protein comprises a mutation which impairs SDF-1 binding. In some other embodiments, a CXCR4 protein comprises a mutation which limits receptor internalization.

The term "operably linked" refers to functional linkage between a regulatory sequence and a heterologous nucleic acid sequence resulting in expression of the latter. For example, a first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein coding regions, in the same reading frame.

The term "overexpressed" or "overexpression" in reference to an antigen indicates an increased level of expression compared to the level of expression in a normal cell from that tissue or organ.

"Parenteral" administration of an immunogenic composition includes, e.g., subcutaneous (s.c.), intravenous (i.v.), intramuscular (i.m.), or intrasternal injection, or infusion techniques.

The terms "nucleic acid" or "polynucleotide" as used interchangeably herein refer to polymers of nucleotides. Polynucleotides, which can be hydrolyzed into monomeric "nucleotides." The monomeric nucleotides can be hydrolyzed into nucleosides. As used herein, the term "polynucleotides" encompasses, but is not limited to, all nucleic acid sequences which are obtained by any means available in the art, including, without limitation, recombinant means, i.e., the cloning of nucleic acid sequences from a recombinant library or a cell genome, using ordinary cloning technology and PCR, and the like, and by synthetic means.

As used herein, the terms "peptide," "polypeptide," and "protein" are used interchangeably to refer to polymers of amino acid residues covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short amino acid polymers, which also commonly are referred to in the art as peptides, oligopeptides and oligomers, for example, and to longer amino acid polymers, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

The term "promoter" as used herein refers to a DNA sequence recognized by the synthetic machinery of the cell, or introduced synthetic machinery, required to initiate the transcription of a specific polynucleotide sequence.

As used herein, the term "promoter/regulatory sequence" means a nucleic acid sequence which is required for expression of a gene product operably linked to the promoter/regulatory sequence. In some instances, this sequence may be the core promoter sequence and in other instances, this sequence may also include an enhancer sequence and other regulatory elements which are required for expression of the gene product. The promoter/regulatory sequence may, for example, be one which expresses the gene product in a tissue-specific manner.

The term "minimal promoter ($P_{MIN}$)" as used herein refers to a TATA-box promoter element upstream of the inducible gene and sequence can be located between the −35 to +35 region with respect to transcription start site (Smale S T (2001) Core promoters: active contributors to combinatorial gene regulation. Genes Dev 15: 2503-2508). Eukaryotic promoters of protein-coding genes have one or more of three conserved sequences in this region (i.e. the TATA-box, initiator region, and downstream promoter element). A minimal promoter enables low basal leakiness in the absence of specific transcriptional activators and high expression when transcription activators are bound upstream of minimal promoter at their specific DNA binding sites. In some embodiments the minimal promoter is derived from the pGL4.23[luc2/minP]; Promega and validated in (Smole, A., Lainšček, D., Bezeljak, U., Horvat, S. & Jerala, R. A Synthetic Mammalian Therapeutic Gene Circuit for Sensing and Suppressing Inflammation. *Mol. Ther.* 25, 102-119 (2017)). Alternative minimal promoters can be used, such as minimal TATA box promoter, minimal CMV promoter or minimal IL-2 promoter.

A "constitutive" promoter is a nucleotide sequence which, when operably linked with a polynucleotide which encodes or specifies a gene product, causes the gene product to be produced in a cell under most or all physiological conditions of the cell.

An "inducible" promoter is a nucleotide sequence which, when operably linked with a polynucleotide which encodes or specifies a gene product, causes the gene product to be produced in a cell substantially only in the presence or absence of certain conditions such as, for example, when an inducer (e.g., metal ions, alcohol, oxygen, etc.) which corresponds to the promoter is present in the cell.

A "tissue-specific" promoter is a nucleotide sequence which, when operably linked with a polynucleotide encodes or specified by a gene, causes the gene product to be produced in a cell substantially only if the cell is a cell of the tissue type corresponding to the promoter.

A "Sendai virus" refers to a genus of the Paramyxoviridae family. Sendai viruses are negative, single stranded RNA viruses that do not integrate into the host genome or alter the genetic information of the host cell. Sendai viruses have an exceptionally broad host range and are not pathogenic to humans. Used as a recombinant viral vector, Sendai viruses are capable of transient but strong gene expression.

A "signal transduction pathway" refers to the biochemical relationship between a variety of signal transduction molecules that play a role in the transmission of a signal from one portion of a cell to another portion of a cell, or across a cell membrane. The phrase "cell surface receptor" includes molecules and complexes of molecules capable of receiving a signal and transmitting signal across the plasma membrane of a cell.

"Single chain antibodies" refer to antibodies formed by recombinant DNA techniques in which immunoglobulin heavy and light chain fragments are linked to the Fv region via an engineered span of amino acids. Various methods of generating single chain antibodies are known, including those described in U.S. Pat. No. 4,694,778; Bird (1988) Science 242:423-442; Huston et al. (1988) Proc. Natl. Acad. Sci. USA 85:5879-5883; Ward et al. (1989) Nature 334: 54454; Skerra et al. (1988) Science 242:1038-1041.

By the term "specifically binds," as used herein with respect to an antibody, is meant an antibody which recognizes a specific antigen, but does not substantially recognize or bind other molecules in a sample. For example, an antibody that specifically binds to an antigen from one species may also bind to that antigen from one or more species. But, such cross-species reactivity does not itself alter the classification of an antibody as specific. In another example, an antibody that specifically binds to an antigen may also bind to different allelic forms of the antigen. However, such cross reactivity does not itself alter the classification of an antibody as specific. In some instances, the terms "specific binding" or "specifically binding," can be used in reference to the interaction of an antibody, a protein, or a peptide with a second chemical species, to mean that the interaction is dependent upon the presence of a particular structure (e.g., an antigenic determinant or epitope) on the chemical species; for example, an antibody recognizes and binds to a specific protein structure rather than to proteins generally. If an antibody is specific for epitope "A", the presence of a molecule containing epitope A (or free, unlabeled A), in a reaction containing labeled "A" and the antibody, will reduce the amount of labeled A bound to the antibody.

By the term "stimulation," is meant a primary response induced by binding of a stimulatory molecule (e.g., a TCR/CD3 complex) with its cognate ligand thereby mediating a signal transduction event, such as, but not limited to, signal transduction via the TCR/CD3 complex. Stimulation can mediate altered expression of certain molecules, such as downregulation of TGF-beta, and/or reorganization of cytoskeletal structures, and the like.

The term "subject" is intended to include living organisms in which an immune response can be elicited (e.g., mammals). A "subject" or "patient," as used therein, may be a human or non-human mammal. Non-human mammals include, for example, livestock and pets, such as sheep, cattle, pigs, cats, dogs, mice, and rats. Preferably, the subject is human.

As used herein, the term "T cell receptor" or "TCR" refers to a heterodimeric membrane protein that participates in the activation of T cells in response to the presentation of antigen. The TCR is responsible for recognizing antigens bound to major histocompatibility complex molecules. The TCR cannot transduce signals through the cell membrane, instead relying on the activity of CD3, another heterodimeric protein complexed with the TCR to form a TCR/CD3 complex. TCR is composed of a heterodimer of an alpha ($\alpha$) and beta ($\beta$) chain, although in some cells the TCR consists of gamma ($\gamma$) and delta ($\delta$) chains. TCRs may exist in alpha/beta and gamma/delta forms, which are structurally similar but have distinct anatomical locations and functions. Each chain is composed of two extracellular domains, a variable and constant domain. In some embodiments, the TCR may be modified on any cell comprising a TCR, including, for example, a helper T cell, a cytotoxic T cell, a memory T cell, regulatory T cell, natural killer T cell, and gamma delta T cell.

The term "therapeutic" as used herein describes a type of treatment and/or prophylaxis. A therapeutic effect is obtained by suppression, remission, or eradication of a disease state.

The terms "transfected" or "transformed" or "transduced" are used interchangeably herein to refer to a process by which exogenous nucleic acid is transferred or introduced into the host cell. A "transfected" or "transformed" or "transduced" cell is one which has been transfected, transformed or transduced with exogenous nucleic acid (e.g., a lentiviral vector comprising a CAR, a plasmid, etc.). The cell includes the primary subject cell actually transfected, transformed, or transduced and its progeny.

To "treat" a disease as the term is used herein, means to reduce the frequency or severity of at least one sign or symptom of a disease or disorder experienced by a subject.

The phrase "under transcriptional control" or "operatively linked" as used herein means that the promoter is in the correct location and orientation in relation to a polynucleotide to control the initiation of transcription by RNA polymerase and expression of the polynucleotide.

A "vector" is a composition of matter which comprises an isolated nucleic acid and which can be used to deliver the isolated nucleic acid to the interior of a cell. Numerous vectors are known in the art including, but not limited to, linear polynucleotides, polynucleotides associated with ionic or amphiphilic compounds, plasmids, and viruses. Thus, the term "vector" includes an autonomously replicating plasmid or a virus. The term should also be construed to include non-plasmid and non-viral compounds which facilitate transfer of nucleic acid into cells, such as, for example, polylysine compounds, liposomes, and the like. Examples of viral vectors include, but are not limited to, Sendai viral vectors, adenoviral vectors, adeno-associated virus vectors, retroviral vectors, lentiviral vectors, and the like.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

Fusion Protein—Peptide Fusion Inhibitor and CXCR4 with Decreased Signaling Activity Approaches for conferring HIV-resistance to CD4 T cells using fusion inhibitor peptides fused to CXCR4 have been described (Leslie et al. *PLoS Pathog. Nov.* 17, 2016; 12(11): e1005983). Described herein is the generation of an improved version where the CXCR4 protein has been mutated so that it does not signal. Without intending to be bound by theory, this is presumed to block receptor internalization, providing sustained surface expression and improved inhibition of HIV infection.

In one aspect, provided herein is a fusion protein comprising a peptide fusion inhibitor and a CXCR4 protein, wherein the CXCR4 protein comprises at least one mutation that decreases signaling activity of the CXCR4 protein relative to a reference. In one embodiment, the reference is the signaling activity of a wildtype CXCR4 protein.

CXCR4

CXCR4 is a G-coupled receptor for the stromal cell-derived factor (SDF-1) chemokine, and a CD4-associated human immunodeficiency virus type 1 (HIV-1) coreceptor. An exemplary wildtype CXCR4 protein sequence is provided in UniProt Accession No. P61073-1, and reproduced below as SEQ ID NO: 1:

```
        10         20         30         40
MEGISIYTSD NYTEEMGSGD YDSMKEPCFR EENANFNKIF 50         60         70         80
LPTIYSIIFL TGIVGNGLVI LVMGYQKKLR SMTDKYRLHL
```

-continued

```
        90        100        110        120
SVADLLFVIT LPFWAVDAVA NWYFGNFLCK AVHVIYTVNL 130        140        150        160
YSSVLILAFI SLDRYLAIVH ATNSQRPRKL LAEKVVYVGV 170        180        190        200
WIPALLLTIP DFIFANVSEA DDRYICDRFY PNDLWVVVFQ 210        220        230        240
FQHIMVGLIL PGIVILSCYC IIISKLSHSK GHQKRKALKT 250        260        270        280
TVILILAFFA CWLPYYIGIS IDSFILLEII KQGCEFENTV 290        300        310        320
HKWISITEAL AFFHCCLNPI LYAFLGAKFK TSAQHALTSV 330        340        350
SRGSSLKILS KGKRGGHSSV STESESSSFH SS
```

In one embodiment, the CXCR4 protein comprises one or more mutations selected from the mutations listed in Table 1. In another embodiment, the CXCR4 protein comprises one or more mutations selected from the mutation(s) designated in any one of 1a-9a listed in Table 1 (e.g., 3c, namely D97N, R134H, and L226R).

TABLE 1

| |
|---|
| 1a. R134H |
| 1b. L86P |
| 1c. L244P |
| 1d. Y116S |
| 1e. D97N |
| 2a. R134H, N143H |
| 2c. W94R, Y116S |
| 2d. V242D, A291T |
| 2e. Y219F, Y302H |
| 2f. R134H, L226R |
| 2g. L86P, D97N |
| 3a. R134H, Y219F, Y302H |
| 3c. D97N, R134H, L226R |
| 4a. R134H, Y219F, L226R, Y302H |
| 4b. Y116S, L226R, Y219F, V242D |
| 8a. G55S, L86P, Y116S, N143H, Y219F, L226R, V242D, A291T, S338P |
| 8b. delta311 G55S, L86P, Y116S, R134H, N143H, Y219F, L226R, V242D, A291T, T311Stop |
| 8c. W94R, Y116S, R134H, Y219F, L226R, V242D, A291T, Y302H |
| 9a. G55S, L86P, Y116S, N143H, Y219F, L226R, V242D, A291T, S338P |

CXCR4 proteins comprising the mutations in Table 1 have been shown to be signaling defective or are predicted to be signaling defective.

In one embodiment, the CXCR4 protein comprises one or more mutations selected from the mutations listed in Table 1 at the indicated positions of SEQ ID NO: 1 or equivalent positions. One of ordinary skill in the art will recognize that such amino acid positions can vary depending on whether amino acids are added or removed from, for example, an amino acid sequence.

In other embodiments, the invention encompasses the amino acid substitutions at the recited positions in Table 1 or equivalent positions (e.g., R to H substitution at amino acid position 134 or equivalent position).

In some embodiments, the CXCR4 protein comprises the amino acid sequence of SEQ ID NO: 1 with the proviso that the CXCR4 protein further comprises one or more mutations selected from the substitutions listed in Table 1.

In other embodiments, the CXCR4 protein comprises at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99%, but not 100%, sequence identity to the amino acid sequence set forth as SEQ ID NO: 1 with the proviso that the CXCR4 protein further comprises one or more substitutions selected from the substitutions listed in Table 1.

In some other embodiments, the CXCR4 protein comprises one or more mutations that decreases CXCR4 signaling activity, as described in Brelot et al. *J Biol Chem.* 2000 Aug. 4; 275(31):23736-44. In one embodiment the CXCR4 protein comprises a mutation at at least one amino acid residue position selected from positions 97, 134, and 226. In one embodiment, the CXCR4 protein comprises a mutation at position 97. In one embodiment, the CXCR4 protein comprises a mutation at positions 97, 134, and 226. In one embodiment, the CXCR protein comprises at least one mutation selected from: D97N, R134H, L226P, L226R. In one embodiment, the CXCR4 protein comprises the mutations D97N, R134H, and L226R. In one embodiment, the CXCR4 protein comprises the mutation D97N.

The signaling activity of CXCR4 can be measured in a variety of ways, for example, by measuring intracellular $Ca^{2+}$ concentration of cells expressing CXCR4 in response to SDF-1, as described in Brelot et al. *J Biol Chem.* 2000 Aug. 4; 275(31):23736-44, or as described elsewhere herein.

Peptide Fusion Inhibitor

In some embodiments, the peptide fusion inhibitor is a peptide derived from the HIV-1 gp41 heptad repeat-2 (HR2) domain. The peptide can be, for example, a peptide described in Leslie et al., *PLoS Pathog. Nov.* 17, 2016; 12(11):e1005983, which describes an approach for conferring HIV-resistance to CD4 T cells using peptides from the HIV-1 gp41 heptad repeat-2 (HR2) domain to inhibit infection.

In some embodiments, the peptide is a 34 amino acid peptide corresponding to amino acids 628-661 in HxB2 or having at least: 90%, 91%, 92%, 93%, 94%, 95%, 96%, 97%, 98%, or 99% sequence identity to the sequence of amino acids 628-661 in HxB2 or to the sequence set forth in SEQ ID NO:2 or 3. In one embodiment, the peptide fusion inhibitor comprises the amino acid sequence WMEWDREINNYTSLIHSLIEESQNQQEKNEQELL (SEQ ID NO: 2). In a particular embodiment, the peptide fusion inhibitor comprises the amino acid sequence MEGISWMEWDREINNYTSLIHSLIEESQNQQEKNEQELLLK (SEQ ID NO: 3). In another embodiment, the peptide fusion inhibitor consists of the amino acid sequence set forth in SEQ ID NO: 3. In some other embodiments, the peptide fusion inhibitor is a peptide described in U.S. Pat. No. 9,566,352B2 (e.g., a peptide comprising SEQ ID NO: 5 of U.S. Pat. No. 9,566,352B2, which is set forth in SEQ ID NO: 2 of the present disclosure).

In some embodiments, the peptide fusion inhibitor is fused in frame to the N-terminal extracellular domain of the CXCR4 protein. In some embodiments, the fusion protein is membrane bound, and the peptide fusion inhibitor is expressed on the surface of a cell.

Isolated Nucleic Acid

The nucleic acid sequences coding for the desired molecules can be obtained using recombinant methods known in the art, using standard techniques. Alternatively, the gene of interest can be produced synthetically. The present invention also provides vectors in which a nucleic acid of the present invention is inserted (e.g., DNA encoding the fusion protein as described herein). Vectors derived from retroviruses such as the lentivirus are suitable tools to achieve long-term gene transfer since they allow long-term, stable integration of a transgene and its propagation in daughter cells. In brief summary, the expression of natural or synthetic nucleic acids encoding universal immune receptors is typically achieved by operably linking a nucleic acid encoding the fusion protein thereof to a promoter, and incorporating the construct into an expression vector. The vectors can be suitable for replication and integration in eukaryotes. Typical cloning vectors contain transcription and translation terminators, initiation sequences, and promoters useful for regulation of the expression of the desired nucleic acid sequence.

The nucleic acid can be cloned into a number of types of vectors. For example, the nucleic acid can be cloned into a vector including, but not limited to a plasmid, a phagemid, a phage derivative, an animal virus, and a cosmid. Vectors of particular interest include expression vectors, replication vectors, probe generation vectors, and sequencing vectors.

Further, the expression vector may be provided to a cell in the form of a viral vector. Viral vector technology is well known in the art and is described, for example, in Sambrook et al. (2001, Molecular Cloning: A Laboratory Manual, Cold Spring Harbor Laboratory, New York), and in other virology and molecular biology manuals. Viruses, which are useful as vectors include, but are not limited to, retroviruses, adenoviruses, adeno-associated viruses, herpes viruses, and lentiviruses. In general, a suitable vector contains an origin of replication functional in at least one organism, a promoter sequence, convenient restriction endonuclease sites, and one or more selectable markers, (e.g., WO 01/96584; WO 01/29058; and U.S. Pat. No. 6,326,193).

Additional promoter elements, e.g., enhancers, regulate the frequency of transcriptional initiation. Typically, these are located in the region 30-110 bp upstream of the start site, although a number of promoters have recently been shown to contain functional elements downstream of the start site as well. The spacing between promoter elements frequently is flexible, so that promoter function is preserved when elements are inverted or moved relative to one another. In the thymidine kinase (tk) promoter, the spacing between promoter elements can be increased to 50 bp apart before activity begins to decline. Depending on the promoter, it appears that individual elements can function either cooperatively or independently to activate transcription.

One example of a suitable promoter is the immediate early cytomegalovirus (CMV) promoter sequence. This promoter sequence is a strong constitutive promoter sequence capable of driving high levels of expression of any polynucleotide sequence operatively linked thereto. Another example of a suitable promoter is Elongation Growth Factor-1α (EF-1α). However, other constitutive promoter sequences may also be used, including, but not limited to the simian virus 40 (SV40) early promoter, mouse mammary tumor virus (MMTV), human immunodeficiency virus (HIV) long terminal repeat (LTR) promoter, MoMuLV promoter, an avian leukemia virus promoter, an Epstein-Barr virus immediate early promoter, a Rous sarcoma virus promoter, as well as human gene promoters such as, but not limited to, the actin promoter, the myosin promoter, the hemoglobin promoter, and the creatine kinase promoter. Further, the invention should not be limited to the use of constitutive promoters. Inducible promoters are also contemplated as part of the invention. The use of an inducible promoter provides a molecular switch capable of turning on expression of the polynucleotide sequence which it is operatively linked when such expression is desired, or turning off the expression when expression is not desired. Examples of inducible promoters include, but are not limited to a metallothionine promoter, a glucocorticoid promoter, a progesterone promoter, and a tetracycline promoter.

In order to assess the expression of a universal immune receptor polypeptide or portions thereof, the expression vector to be introduced into a cell can also contain either a selectable marker gene or a reporter gene or both to facilitate identification and selection of expressing cells from the population of cells sought to be transfected or infected through viral vectors. In other aspects, the selectable marker may be carried on a separate piece of DNA and used in a co-transfection procedure. Both selectable markers and reporter genes may be flanked with appropriate regulatory sequences to enable expression in the host cells. Useful selectable markers include, for example, antibiotic-resistance genes, such as neo and the like.

Reporter genes are used for identifying potentially transfected cells and for evaluating the functionality of regulatory sequences. In general, a reporter gene is a gene that is not present in or expressed by the recipient organism or tissue and that encodes a polypeptide whose expression is manifested by some easily detectable property, e.g., enzymatic activity. Expression of the reporter gene is assayed at a suitable time after the DNA has been introduced into the recipient cells. Suitable reporter genes may include genes encoding luciferase, beta-galactosidase, chloramphenicol acetyl transferase, secreted alkaline phosphatase, or the green fluorescent protein gene (e.g., Ui-Tei et al., 2000 FEBS Letters 479: 79-82). Suitable expression systems are well known and may be prepared using known techniques or obtained commercially. In general, the construct with the minimal 5' flanking region showing the highest level of expression of reporter gene is identified as the promoter. Such promoter regions may be linked to a reporter gene and used to evaluate agents for the ability to modulate promoter-driven transcription.

Methods of introducing and expressing genes into a cell are known in the art. In the context of an expression vector, the vector can be readily introduced into a host cell, e.g., mammalian, bacterial, yeast, or insect cell by any method in the art. For example, the expression vector can be transferred into a host cell by physical, chemical, or biological means.

Physical methods for introducing a polynucleotide into a host cell include calcium phosphate precipitation, lipofection, particle bombardment, microinjection, electroporation, and the like. Methods for producing cells comprising vectors and/or exogenous nucleic acids are well-known in the art. See, for example, Sambrook et al. (2001, Molecular Cloning: A Laboratory Manual, Cold Spring Harbor Laboratory, New York). A preferred method for the introduction of a polynucleotide into a host cell is calcium phosphate transfection.

Biological methods for introducing a polynucleotide of interest into a host cell include the use of DNA and RNA vectors. Viral vectors, and especially retroviral vectors, have become the most widely used method for inserting genes into mammalian, e.g., human cells. Other viral vectors can be derived from lentivirus, poxviruses, herpes simplex virus I, adenoviruses and adeno-associated viruses, and the like. See, for example, U.S. Pat. Nos. 5,350,674 and 5,585,362.

Chemical means for introducing a polynucleotide into a host cell include colloidal dispersion systems, such as macromolecule complexes, nanocapsules, microspheres, beads, and lipid-based systems including oil-in-water emulsions, micelles, mixed micelles, and liposomes. An exemplary colloidal system for use as a delivery vehicle in vitro and in vivo is a liposome (e.g., an artificial membrane vesicle).

In the case where a non-viral delivery system is utilized, an exemplary delivery vehicle is a liposome. The use of lipid formulations is contemplated for the introduction of the nucleic acids into a host cell (in vitro, ex vivo or in vivo). In another aspect, the nucleic acid may be associated with a lipid. The nucleic acid associated with a lipid may be encapsulated in the aqueous interior of a liposome, interspersed within the lipid bilayer of a liposome, attached to a liposome via a linking molecule that is associated with both the liposome and the oligonucleotide, entrapped in a liposome, complexed with a liposome, dispersed in a solution containing a lipid, mixed with a lipid, combined with a lipid, contained as a suspension in a lipid, contained or complexed with a micelle, or otherwise associated with a lipid. Lipid, lipid/DNA or lipid/expression vector associated compositions are not limited to any particular structure in solution. For example, they may be present in a bilayer structure, as micelles, or with a "collapsed" structure. They may also simply be interspersed in a solution, possibly forming aggregates that are not uniform in size or shape. Lipids are fatty substances which may be naturally occurring or synthetic lipids. For example, lipids include the fatty droplets that naturally occur in the cytoplasm as well as the class of compounds which contain long-chain aliphatic hydrocarbons and their derivatives, such as fatty acids, alcohols, amines, amino alcohols, and aldehydes.

Regardless of the method used to introduce exogenous nucleic acids into a host cell or otherwise expose a cell to the inhibitor of the present invention, in order to confirm the presence of the recombinant DNA sequence in the host cell, a variety of assays may be performed. Such assays include, for example, "molecular biological" assays well known to those of skill in the art, such as Southern and Northern blotting, RT-PCR and PCR; "biochemical" assays, such as detecting the presence or absence of a particular peptide, e.g., by immunological means (ELISAs and Western blots) or by assays described herein to identify agents falling within the scope of the invention.

RNA Transfection

In one embodiment, the genetically modified T cells of the invention are modified through the introduction of RNA. In one embodiment, an in vitro transcribed SpyTag or Spy-Catcher universal immune receptor RNA can be introduced to a cell as a form of transient transfection. The RNA is produced by in vitro transcription using a polymerase chain reaction (PCR)-generated template. DNA of interest from any source can be directly converted by PCR into a template for in vitro mRNA synthesis using appropriate primers and RNA polymerase. The source of the DNA can be, for example, genomic DNA, plasmid DNA, phage DNA, cDNA, synthetic DNA sequence or any other appropriate source of DNA. The desired template for in vitro transcription is the universal immune receptor of the present invention. For example, the template for the RNA of the universal immune receptor comprises an extracellular domain comprising a label binding domain; a transmembrane domain comprising the hinge and transmembrane domain of CD8a; and a cytoplasmic domain comprises the signaling domain of CD3-zeta.

Genetically Modified Cells

In one aspect, a method of generating a cell (e.g., a T cell) resistant to infection with HIV is provided. The method includes the step introducing in to a cell a nucleic acid encoding a fusion protein as described herein. In some embodiments, the fusion protein comprises a peptide fusion inhibitor (e.g., C34) and a CXCR4 protein with decreased signaling activity.

In some embodiments, nucleic acid encoding the fusion protein are delivered into cells using a retroviral or lentiviral vector. Fusion protein-expressing retroviral and lentiviral vectors can be delivered into different types of eukaryotic cells as well as into tissues and whole organisms using transduced cells as carriers or cell-free local or systemic delivery of encapsulated, bound or naked vectors. The method used can be for any purpose where stable expression is required or sufficient.

Chimeric Antigen Receptors

The invention relates to compositions and methods for treating a disease. In some embodiments, the disease is acquired immunodeficiency syndrome (AIDS). The invention also encompasses methods of method of inhibiting, suppressing or preventing an HIV-1 infection in a subject in need thereof. The methods comprise administering to a patient in need of such treatment or prevention a therapeutically or prophylactically effective amount of a T cell transduced to express a fusion protein of the invention (e.g., a C34-CXCR4 fusion protein, where CXCR4 has decreased signaling activity) and a chimeric antigen receptor (CAR). Provided are compositions and methods comprising a CAR. CARs are molecules that combine antibody-based specificity for a desired antigen (e.g., HIV) with a T cell receptor-activating intracellular domain to generate a chimeric protein that exhibits a specific anti-antigen immune activity.

A potent and sustained antiviral T cell response will likely be a critical component of an effective HIV cure strategy. Described herein are studies exploring the utility of CD4-based Chimeric Antigen Receptor (CAR) T cells to mitigate HIV-induced pathogenesis in BLT humanized mice. CAR T cells expressing the archetypal 4-1BB/CD3-ζ endodomain were insufficient to prevent viral rebound and CD4$^+$ T cell loss after the discontinuation of antiretroviral therapy (ART). Through iterative in vivo improvements to the CAR T cell product, Dual-CAR (BBζ.28ζ) T cells that independently expressed both 4-1BB/CD3-ζ and CD28/CD3-ζ endodomains were developed. Dual-CAR T cells exhibited expansion kinetics that exceeded 4-1BB-costimulated CAR T cells, elicited effector functions equivalent to CD28-costimulated CAR T cells, and prevented HIV-induced CD4$^+$ T cell loss despite persistent viremia. Moreover, when Dual-CAR T cells were protected from HIV infection through expression of a C34-CXCR4 fusion inhibitor these cells significantly reduced acute phase viremia, as well as accelerated HIV suppression in the presence of ART. The C34-CXCR4 fusion inhibitor contained a D97N mutation in the CXCR4 protein. Collectively, these studies demonstrate the enhanced immunity of a novel Dual-CAR T cell product, highlighting the therapeutic potential of engineered T cells to effectively treat HIV infection. Accordingly, in some embodiments, the methods include administered to a subject in need thereof a Dual-CAR T cell as described herein, comprising a C34-CXCR4 fusion protein as described herein.

In some embodiments of any of the methods above, the methods result in a measurable evidence of disease or disease progression, complete response, partial response, stable disease, increase or elongation of progression free survival, increase or elongation of overall survival, or reduction in toxicity.

In one embodiment, the CAR of the invention comprises an antigen binding domain, a transmembrane domain, and an intracellular signaling domain. In some embodiments, the intracellular signaling domain comprises one or more costimulatory signaling domains and an immunoreceptor tyrosine activation motif-containing signaling domain. In further embodiments, the immunoreceptor tyrosine activation motif-containing signaling domain comprises a CD3 zeta signaling domain.

In some embodiments, the one or more costimulatory signaling domains comprise the intracellular domain of a costimulatory molecule selected from the group consisting of CD27, CD28, 4-1BB (CD137), OX40, CD30, CD40, PD-1, ICOS, lymphocyte function-associated antigen-1 (LFA-1), CD2, CD7, LIGHT, NKG2C, B7-H3, and a ligand that specifically binds with CD83.

The CAR of the invention can be engineered to comprise an extracellular domain having an antigen binding domain that targets HIV fused to an intracellular signaling domain comprising the T cell antigen receptor complex zeta chain (e.g., CD3 zeta). In some aspects, CARs comprise: (1) a domain targeting HIV, (2) a transmembrane domain, (3) one or more costimulatory domains, and (4) an ITAM-containing signaling domain such as CD3-zeta. In some embodiments, the domain targeting HIV is CD4 or a fragment thereof. In one embodiment, the CAR of the invention is a CD4-based CAR., such as the CD4-based CAR described in Leibman, R. S., et al. Supraphysiologic control over HIV-1 replication mediated by CD8 T cells expressing a re-engineered CD4-based chimeric antigen receptor. *PLoS Pathog* 13, e1006613 (2017).

In one embodiment, the CAR of the invention comprises a CD137 (4-1BB) signaling domain. For example, inclusion of the CD137 (4-1BB) signaling domain significantly increased CAR mediated activity and in vivo persistence of CAR T cells compared to an otherwise identical CAR T cell not engineered to express CD137 (4-1BB). However, the invention is not limited to a specific CAR. Rather, any CAR that targets a desired antigen, for example HIV, can be used in the present invention. Compositions and methods of making and using CARs have been described in PCT/US11/64191, which is incorporated by reference in its entirety herein.

The present invention provides a T cell genetically modified to express a chimeric antigen receptor (CAR) comprising an extracellular and intracellular domain. Compositions and methods of making CARs have been described in PCT/US11/64191, which is incorporated in its entirety by reference herein.

The extracellular domain comprises a target-specific binding element otherwise referred to as an antigen binding domain. In some embodiments, the extracellular domain also comprises a hinge domain. In one embodiment, the intracellular domain comprises a costimulatory signaling domain and a CD3 zeta chain portion. The costimulatory signaling domain refers to a portion of the CAR comprising the intracellular domain of a costimulatory molecule. Costimulatory molecules are cell surface molecules other than antigen receptors or their ligands that are required for an efficient response of lymphocytes to antigen.

Between the extracellular domain and the transmembrane domain of the CAR, or between the cytoplasmic domain and the transmembrane domain of the CAR, there may be incorporated a spacer domain. In this context, the term "spacer domain" generally means any oligo- or polypeptide that functions to link the transmembrane domain to, either the extracellular domain or, the cytoplasmic domain in the polypeptide chain. A spacer domain may comprise up to 300 amino acids, preferably 10 to 100 amino acids and most preferably 25 to 50 amino acids.

The present invention includes retroviral and lentiviral vector constructs expressing a CAR that can be directly transduced into a cell. The present invention also includes an RNA construct that can be directly transfected into a cell. A method for generating mRNA for use in transfection involves in vitro transcription (IVT) of a template with specially designed primers, followed by polyA addition, to produce a construct containing 3' and 5' untranslated sequence ("UTR"), a 5' cap and/or Internal Ribosome Entry Site (IRES), the gene to be expressed, and a polyA tail, typically 50-2000 bases in length. RNA so produced can efficiently transfect different kinds of cells. In one embodiment, the template includes sequences for the CAR.

Preferably, the CAR comprises an extracellular domain, a transmembrane domain and a cytoplasmic domain. The extracellular domain and transmembrane domain can be derived from any desired source of such domains. In some instances, the hinge domain of the CAR of the invention comprises the CD8a hinge domain.

In one embodiment, the CAR of the invention comprises a target-specific binding element otherwise referred to as an antigen binding domain. The choice of moiety depends upon the type and number of ligands that define the surface of a target cell. For example, the antigen binding domain may be chosen to recognize a ligand that acts as a marker on targets associated with a particular disease state (e.g., HIV). Thus examples of markers that may act as ligands for the antigen moiety domain in the CAR of the invention include those associated with HIV (e.g., an HIV outer envelope glycoprotein).

In one embodiment, the CAR of the invention can be engineered to target a disease associated antigen of interest by way of engineering a desired antigen binding domain that specifically binds to an antigen on HIV.

Depending on the desired antigen to be targeted, the CAR of the invention can be engineered to include an appropriate antigen-binding moiety specific to the desired target, e.g., HIV.

The antigen-binding domain can be any domain that specifically binds to the antigen including but not limited to monoclonal antibodies, polyclonal antibodies, synthetic antibodies, human antibodies, humanized antibodies, and fragments thereof. In some instances, it is beneficial for the antigen-binding domain to be derived from the same species in which the CAR will ultimately be used. For example, for use in humans, it may be beneficial for the antigen-binding domain of the CAR to comprise a human antibody or fragment thereof. Thus, in one embodiment, the antigen biding domain portion comprises a human antibody or a fragment thereof. Alternatively, in some embodiments, a non-human antibody is humanized, where specific sequences or regions of the antibody are modified to increase similarity to an antibody naturally produced in a human. In one embodiment, the antigen-binding domain is CD4 or a portion thereof.

In one embodiment of the present invention, a plurality of types of CARs is expressed on the surface of a T cell. The different types of CAR may differ in their antigen-binding domain. That is, in one embodiment, the different types of CARs each bind a different antigen. In one embodiment, the different antigens are markers for HIV. For example, in one embodiment, the different types of CARs each bind to a different antigen, where each antigen is expressed on a specific type of HIV.

In some embodiments, the CAR comprises a transmembrane domain that is fused to the extracellular domain of the CAR. In one embodiment, the transmembrane domain that naturally is associated with one of the domains in the CAR is used. In some instances, the transmembrane domain can be selected or modified by amino acid substitution to avoid binding of such domains to the transmembrane domains of the same or different surface membrane proteins to minimize interactions with other members of the receptor complex.

The transmembrane domain may be derived either from a natural or a synthetic source. Where the source is natural, the domain may be derived from any membrane-bound or transmembrane protein. Transmembrane regions of particular use in this invention may be derived from (i.e. comprise at least the transmembrane region(s) of) the alpha, beta or zeta chain of the T-cell receptor, CD28, CD3 epsilon, CD45, CD4, CD5, CD8, CD9, CD16, CD22, CD33, CD37, CD64, CD80, CD86, CD134, CD137, CD154, ICOS. Alternatively the transmembrane domain may be synthetic, in which case it will comprise predominantly hydrophobic residues such as leucine and valine. Preferably a triplet of phenylalanine, tryptophan and valine will be found at each end of a synthetic transmembrane domain. Optionally, a short oligo- or polypeptide linker, preferably between 2 and 10 amino acids in length may form the linkage between the transmembrane domain and the cytoplasmic signaling domain of the CAR. A glycine-serine doublet provides a particularly suitable linker.

The cytoplasmic domain or otherwise the intracellular signaling domain of the CAR of the invention is responsible for activation of at least one of the normal effector functions of the immune cell in which the CAR has been placed in. The term "effector function" refers to a specialized function of a cell. Effector function of a T cell, for example, may be cytolytic activity or helper activity including the secretion of cytokines. Thus the term "intracellular signaling domain" refers to the portion of a protein which transduces the effector function signal and directs the cell to perform a specialized function. While usually the entire intracellular signaling domain can be employed, in many cases it is not necessary to use the entire domain. To the extent that a truncated portion of the intracellular signaling domain is used, such truncated portion may be used in place of the intact signaling domain as long as it transduces the effector function signal. The term intracellular signaling domain is thus meant to include any truncated portion of the intracellular signaling domain sufficient to transduce the effector function signal.

In one embodiment, the effector function of the cell is dependent upon the binding of a plurality of types of CARs to their targeted antigen. For example, in one embodiment, binding of one type of CAR to its target is not sufficient to induce the effector function of the cell.

Primary cytoplasmic signaling sequences regulate activation of the TCR/CD3 complex either in a stimulatory way, or in an inhibitory way. Primary cytoplasmic signaling sequences that act in a stimulatory manner may contain signaling motifs which are known as immunoreceptor tyrosine-based activation motifs or ITAMs.

Examples of ITAM containing primary cytoplasmic signaling sequences that are of particular use in the invention include those derived from TCR zeta, FcR gamma, FcR beta, CD3 gamma, CD3 delta, CD3 epsilon, CD5, CD22, CD79a, CD79b, and CD66d. It is particularly preferred that cytoplasmic signaling molecule in the CAR of the invention comprises a cytoplasmic signaling sequence derived from CD3 zeta.

In one embodiment, the cytoplasmic domain of the CAR comprises the CD3-zeta signaling domain by itself or combined with any other desired cytoplasmic domain(s) useful in the context of the CAR of the invention. For example, the cytoplasmic domain of the CAR can comprise a CD3-zeta chain portion and a costimulatory signaling domain. The costimulatory signaling domain refers to a portion of the CAR comprising the intracellular domain of a costimulatory molecule.

The cytoplasmic signaling sequences within the cytoplasmic signaling portion of the CAR of the invention may be linked to each other in a random or specified order. Optionally, a short oligo- or polypeptide linker, preferably between 2 and 10 amino acids in length may form the linkage. A glycine-serine doublet provides a particularly suitable linker.

In one embodiment, the cytoplasmic domain comprises the signaling domain of CD3-zeta. In another embodiment, the cytoplasmic domain comprises the signaling domain of CD3-zeta and the signaling domain of 4-1BB. In one embodiment of the present invention, a plurality of types of CARs is expressed on a cell, where the different types of CAR may vary in their cytoplasmic domain. In one embodiment, at least one type of CAR comprises the CD3 zeta domain, while at least one type of CAR comprises a costimulatory domain, for example the 4-1BB domain. However, the different types of CARs are not limited by any particular cytoplasmic domain.

In one embodiment, the T cell genetically modified to express a CAR is further engineered or edited using CRISPR/Cas.

Extracellular Domain

In one embodiment, the extracellular domain of the CAR of the invention is the extracellular domain of the CD4-based CAR, as described in Leibman, R. S., et al. Supraphysiologic control over HIV-1 replication mediated by CD8 T cells expressing a re-engineered CD4-based chimeric antigen receptor. *PLoS Pathog* 13, e1006613 (2017).

In another embodiment, the extracellular domain can include any portion of an antibody that binds to antigen including, but not limited to, the antigen binding domain of a synthetic antibody, human antibody, humanized antibody, single domain antibody, single chain variable fragments, and fragments thereof. In some instances, it is beneficial for the extracellular domain to be derived from the same species in which the chimeric membrane protein will ultimately be used in. For example, for use in humans, it may be beneficial for the extracellular domain of the chimeric membrane protein to comprise a human antibody or fragment thereof. Thus, in one embodiment, the extracellular domain portion comprises a human antibody or a fragment thereof.

For in vivo use of antibodies in humans, it may be preferable to use human antibodies. Completely human antibodies are particularly desirable for therapeutic treatment of human subjects. Human antibodies can be made by a variety of methods known in the art including phage display methods using antibody libraries derived from human immunoglobulin sequences, including improvements to these techniques. See, also, U.S. Pat. Nos. 4,444,887 and 4,716,111; and PCT publications WO 98/46645, WO 98/50433, WO 98/24893, WO98/16654, WO 96/34096, WO 96/33735, and WO 91/10741; each of which is incorporated herein by reference in its entirety. A human antibody can also be an antibody wherein the heavy and light chains are encoded by a nucleotide sequence derived from one or more sources of human DNA.

Alternatively, in some embodiments, a non-human antibody is humanized, where specific sequences or regions of the antibody are modified to increase similarity to an antibody naturally produced in a human. In one embodiment, the antigen binding domain portion is humanized.

A humanized antibody has one or more amino acid residues introduced into it from a source which is nonhuman. These nonhuman amino acid residues are often referred to as "import" residues, which are typically taken from an "import" variable domain. Thus, humanized antibodies comprise one or more CDRs from nonhuman immunoglobulin molecules and framework regions from human. Humanization of antibodies is well-known in the art and can essentially be performed following the method of Winter and co-workers (Jones et al., Nature, 321:522-525 (1986); Riechmann et al., Nature, 332:323-327 (1988); Verhoeyen et al., Science, 239:1534-1536 (1988)), by substituting rodent CDRs or CDR sequences for the corresponding sequences of a human antibody, i.e., CDR-grafting (EP 239,400; PCT Publication No. WO 91/09967; and U.S. Pat. Nos. 4,816, 567; 6,331,415; 5,225,539; 5,530,101; 5,585,089; 6,548, 640, the contents of which are incorporated herein by reference herein in their entirety). In such humanized chimeric antibodies, substantially less than an intact human variable domain has been substituted by the corresponding sequence from a nonhuman species. In practice, humanized antibodies are typically human antibodies in which some CDR residues and possibly some FR residues are substituted by residues from analogous sites in rodent antibodies. Humanization of antibodies can also be achieved by veneering or resurfacing (EP 592,106; EP 519,596; Padlan, 1991, Molecular Immunology, 28(4/5):489-498; Studnicka et al., Protein Engineering, 7(6):805-814 (1994); and Roguska et al., PNAS, 91:969-973 (1994)) or chain shuffling (U.S. Pat. No. 5,565,332), the contents of which are incorporated herein by reference herein in their entirety.

The choice of human variable domains, both light and heavy, to be used in making the humanized antibodies is to reduce antigenicity. According to the so-called "best-fit" method, the sequence of the variable domain of a rodent antibody is screened against the entire library of known human variable-domain sequences. The human sequence which is closest to that of the rodent is then accepted as the human framework (FR) for the humanized antibody (Sims et al., J. Immunol., 151:2296 (1993); Chothia et al., J. Mol. Biol., 196:901 (1987), the contents of which are incorporated herein by reference herein in their entirety). Another method uses a particular framework derived from the consensus sequence of all human antibodies of a particular subgroup of light or heavy chains. The same framework may be used for several different humanized antibodies (Carter et al., Proc. Natl. Acad. Sci. USA, 89:4285 (1992); Presta et al., J. Immunol., 151:2623 (1993), the contents of which are incorporated herein by reference herein in their entirety).

Antibodies can be humanized with retention of high affinity for the target antigen and other favorable biological properties. According to one aspect of the invention, humanized antibodies are prepared by a process of analysis of the parental sequences and various conceptual humanized products using three-dimensional models of the parental and humanized sequences. Three-dimensional immunoglobulin models are commonly available and are familiar to those skilled in the art. Computer programs are available which illustrate and display probable three-dimensional conformational structures of selected candidate immunoglobulin sequences. Inspection of these displays permits analysis of the likely role of the residues in the functioning of the candidate immunoglobulin sequence, i.e., the analysis of residues that influence the ability of the candidate immunoglobulin to bind the target antigen. In this way, FR residues can be selected and combined from the recipient and import sequences so that the desired antibody characteristic, such as increased affinity for the target antigen, is achieved. In general, the CDR residues are directly and most substantially involved in influencing antigen binding.

A "humanized" antibody retains a similar antigenic specificity as the original antibody. However, using certain methods of humanization, the affinity and/or specificity of binding of the antibody for human CD3 antigen may be increased using methods of "directed evolution," as described by Wu et al., J. Mol. Biol., 294:151 (1999), the contents of which are incorporated herein by reference herein in their entirety.

In one embodiment, the antibody is a synthetic antibody, human antibody, a humanized antibody, single chain variable fragment, single domain antibody, an antigen binding fragment thereof, and any combination thereof.

Intracellular Domain

The intracellular domain or cytoplasmic domain comprises a costimulatory signaling domain. The costimulatory signaling domain refers to an intracellular domain of a costimulatory molecule. Costimulatory molecules are cell surface molecules other than antigen receptors or their ligands that are required for an efficient response of lymphocytes to antigen.

Other Domains of the Chimeric Antigen Receptor

Between the extracellular domain and the transmembrane domain of the chimeric antigen receptor, or between the cytoplasmic domain and the transmembrane domain of the chimeric antigen receptor, there may be incorporated a spacer domain.

In some embodiments, the chimeric membrane protein further comprises a transmembrane domain. In some embodiments, the chimeric membrane protein further comprises a hinge domain. In one embodiment, the RNA encoding the chimeric membrane protein further comprises a transmembrane and hinge domain, such as a CD28 transmembrane domain and a CD8alpha hinge domain.

Therapy

The engineered cells described herein (e.g., cells expressing a fusion protein comprising a peptide fusion inhibitor and a CXCR4 protein with decreased signaling activity) may be included in a composition for therapy either separately or in combination. In some embodiments, the engineered cells also express a chimeric antigen receptor (CAR), such as a CAR that specifically binds HIV or an antigen associated with HIV. The composition may include a pharmaceutical composition and further include a pharmaceutically acceptable carrier. A therapeutically effective amount of the pharmaceutical composition comprising the engineered cells described herein may be administered.

In some embodiments, the engineered cell may be administered with a second agent. In some embodiments, the engineered cell and the second agent are administered to the patient simultaneously or sequentially. In some embodiments, the engineered cell and the second agent are administered to the patient in the same composition. In some embodiments, the engineered cell and the second agent are administered to the patient as separate compositions.

In one aspect, the invention includes a method of suppressing, inhibiting, preventing or treating HIV infection in a subject in need thereof, the method comprising administering to the subject an effective amount of the engineered cells described herein. In some embodiments, the HIV infection is an HIV-1 infection.

In another aspect, the invention includes a method of conferring resistance to HIV infection in a subject in need thereof, the method comprising administering to the subject an effective amount of the engineered cells described herein. In some embodiments, the HIV infection is an HIV-1 infection.

In yet another embodiment, a method of treating a disease or condition associated with HIV (e.g., HIV-1) in a subject comprising administering a population of engineered cells described herein to a subject in need thereof.

The modified T cells generated as described herein possess T cell function. Further, the engineered cells described herein can be administered to a human, to inhibit suppress or suppress an HIV infection. In one aspect, the invention includes treating a condition, such as AIDS, in a subject, comprising administering to the subject a therapeutically effective amount of a pharmaceutical composition comprising a population of modified T cells.

In another embodiment, the engineered cells described herein may be used for the manufacture of a medicament for the treatment of an HIV infection or AIDS in a subject in need thereof. In some embodiments, the HIV infection is an HIV-1 infection.

Cells of the invention can be administered in dosages and routes and at times to be determined in appropriate preclinical and clinical experimentation and trials. Cell compositions may be administered multiple times at dosages within these ranges. Administration of the cells of the invention may be combined with other methods useful to treat the desired disease or condition as determined by those of skill in the art.

The cells of the invention to be administered may be autologous or allogenic with respect to the subject undergoing therapy.

The administration of the cells or compositions of the invention may be carried out in any convenient manner known to those of skill in the art. The cells or compositions of the present invention may be administered to a subject by injection, transfusion, implantation or transplantation. The compositions described herein may be administered to a patient transarterially, subcutaneously, intradermally, intratumorally, intranodally, intramedullary, intramuscularly, by intravenous (i.v.) injection, or intraperitoneally. In other instances, the cells of the invention are injected directly into a site of inflammation in the subject, a local disease site in the subject, a lymph node, an organ, and the like.

The cells or compositions described herein can also be administered using any number of matrices. The present invention utilizes such matrices within the novel context of acting as an artificial lymphoid organ to support, maintain, or modulate the immune system, typically through modulation of T cells. Accordingly, the present invention can utilize those matrix compositions and formulations which have demonstrated utility in tissue engineering. Accordingly, the type of matrix that may be used in the compositions, devices and methods of the invention is virtually limitless and may include both biological and synthetic matrices. In one particular example, the compositions and devices set forth by U.S. Pat. Nos. 5,980,889; 5,913,998; 5,902,745; 5,843,069; 5,787,900; or 5,626,561 are utilized, as such these patents are incorporated herein by reference in their entirety. Matrices comprise features commonly associated with being biocompatible when administered to a mammalian host. Matrices may be formed from natural and/or synthetic materials. The matrices may be non-biodegradable in instances where it is desirable to leave permanent structures or removable structures in the body of an animal, such as an implant; or biodegradable. The matrices may take the form of sponges, implants, tubes, telfa pads, fibers, hollow fibers, lyophilized components, gels, powders, porous compositions, or nanoparticles. In addition, matrices can be designed to allow for sustained release of seeded cells or produced cytokine or other active agent. In certain embodiments, the matrix of the present invention is flexible and elastic, and may be described as a semisolid scaffold that is permeable to substances such as inorganic salts, aqueous fluids and dissolved gaseous agents including oxygen.

A matrix is used herein as an example of a biocompatible substance. However, the current invention is not limited to matrices and thus, wherever the term matrix or matrices appears these terms should be read to include devices and other substances which allow for cellular retention or cellular traversal, are biocompatible, and are capable of allowing traversal of macromolecules either directly through the substance such that the substance itself is a semi-permeable membrane or used in conjunction with a particular semi-permeable sub stance.

CRISPR

In some embodiments of the invention, an endogenous CCR5 of the engineered cell has been knocked out using a CRISPR-related system. In some embodiments of the invention, an endogenous CCR5 of the engineered cell has been knocked down using a CRISPR-related system. In some embodiments, the CRISPR-related system is a CRISPR/Cas9 system.

In some embodiments of the invention, an endogenous CCR4 of the engineered cell has been knocked out using a CRISPR-related system. In some embodiments of the invention, an endogenous CCR4 of the engineered cell has been knocked down using a CRISPR-related system. Also provided are some embodiments with a CRISPR-related system-mediated knock-in of the designed expression cassette into relevant loci to make the introduced construct the exclusive source of CXCR4 expressed in a cell. In some embodiments, the designed expression cassette is encoded in a donor template. In some embodiments, the donor template is encoded in a viral vector. In some embodiments the viral vector is an adeno-associated viral vector. In further embodiments, the adeno-associated viral vector is AAV6. In some embodiments, the CRISPR-related system is a CRISPR/Cas9 system. In some embodiments, the endogenous CCR5 and/or endogenous CXCR4 is knocked out or knocked down using a CRISPR system, for example a CRISPR/Cas9 system, with non-homologous end joining or homologous recombination where designed construct serves a donor template molecule.

Provided is an engineered immune cell or engineered immune cell precursor cell, comprising: an insertion in a gene locus, wherein the insertion comprises a first polynucleotide comprising a constitutive promoter operably linked to a nucleic acid encoding at least one fusion protein, wherein the fusion protein comprises a peptide fusion inhibitor and a CXCR4 protein with decreased signaling activity. In some embodiments, the peptide fusion inhibitor is C34.

Pharmaceutical Compositions

Pharmaceutical compositions of the present invention may comprise an engineered immune cell as described herein, in combination with one or more pharmaceutically or physiologically acceptable carriers, diluents, adjuvants or excipients. Such compositions may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives. Compositions of the present invention are preferably formulated for intravenous administration.

Pharmaceutical compositions of the present invention may be administered in a manner appropriate to the disease to be treated (or prevented). The quantity and frequency of administration will be determined by such factors as the condition of the patient, and the type and severity of the patient's disease, although appropriate dosages may be determined by clinical trials.

When "an immunologically effective amount", "an anti-immune response effective amount", "an immune response-inhibiting effective amount", or "therapeutic amount" is indicated, the precise amount of the compositions of the present invention to be administered can be determined by a physician with consideration of individual differences in age, weight, immune response, and condition of the patient (subject). It can generally be stated that a pharmaceutical composition comprising the modified T cells described herein may be administered at a dosage of $10^4$ to $10^9$ cells/kg body weight, preferably $10^5$ to $10^6$ cells/kg body weight, including all integer values within those ranges. T cell compositions may also be administered multiple times at these dosages. The cells can be administered by using infusion techniques that are commonly known in immunotherapy (see, e.g., Rosenberg et al., New Eng. J. of Med. 319:1676, 1988). The optimal dosage and treatment regime for a particular patient can readily be determined by one skilled in the art of medicine by monitoring the patient for signs of disease and adjusting the treatment accordingly.

In certain embodiments, it may be desired to administer activated T cells to a subject and then subsequently redraw blood (or have an apheresis performed), activate T cells therefrom according to the present invention, and reinfuse the patient with these activated and expanded T cells. This process can be carried out multiple times every few weeks. In certain embodiments, T cells can be activated from blood draws of from 10 ml to 400 ml. In certain embodiments, T cells are activated from blood draws of 20 ml, 30 ml, 40 ml, 50 ml, 60 ml, 70 ml, 80 ml, 90 ml, or 100 ml. Not to be bound by theory, using this multiple blood draw/multiple reinfusion protocol, may select out certain populations of T cells.

In certain embodiments of the present invention, cells expanded and modified using the methods described herein, or other methods known in the art where T cells are expanded to therapeutic levels, are administered to a patient in conjunction with (e.g., before, simultaneously or following) any number of relevant treatment modalities, including but not limited to treatment with agents such as antiviral therapy The dosage of the above treatments to be administered to a patient will vary with the precise nature of the condition being treated and the recipient of the treatment. The scaling of dosages for human administration can be performed according to art-accepted practices.

Human dosage amounts can initially be determined by extrapolating from the amount of compound used in mice, as a skilled artisan recognizes it is routine in the art to modify the dosage for humans compared to animal models. In certain embodiments it is envisioned that the dosage may include an effective amount from between about 0.001 mg compound/Kg body weight to about 100 mg compound/Kg body weight; or from about 0.05 mg/Kg body weight to about 75 mg/Kg body weight or from about 0.1 mg/Kg body weight to about 50 mg/Kg body weight; or from about 0.5 mg/Kg body weight to about 40 mg/Kg body weight; or from about 0.1 mg/Kg body weight to about 30 mg/Kg body weight; or from about 1 mg/Kg body weight to about 20 mg/Kg body weight. In other embodiments, the effective amount may be about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, 50, 55, 60, 65, 70, 75, 80, 85, 90, 95, or about 100 mg/Kg body weight. In other embodiments, it is envisaged that effective amounts may be in the range of about 2 mg compound to about 100 mg compound. In other embodiments, the effective amount may be about 1, 2, 3, 4, 5, 6, 7, 8, 9, 10, 11, 12, 13, 14, 15, 16, 17, 18, 19, or 20 mg per single dose. In another embodiment, the effective amount comprises less than about 2, 3, 4, 5, 6, 7, 8, 9, 10, 15, 20, 25, 30, 35, 40, 45, 50, 55, 60, 65, 70, 75, 80, 85, 90, 95 mg daily. In an exemplary embodiment, the effective amount comprises less than about 50 mg daily. Of course, the single dosage amount or daily dosage amount may be adjusted upward or downward, as is routinely done in such treatment protocols, depending on the results of the initial clinical trials and the needs of a particular patient.

The precise determination of what would be considered an effective dose is based on factors individual to each subject, including their size, age, sex, weight, and condition of the particular subject. Dosages can be readily ascertained by those skilled in the art from this disclosure and the knowledge in the art.

Optionally, the methods of the invention provide for the administration of a composition of the invention to a suitable animal model to identify the dosage of the composition(s), concentration of components therein and timing of administering the composition(s), which elicit tissue repair, reduce cell death, or induce another desirable biological response. Such determinations do not require undue experimentation, but are routine and can be ascertained without undue experimentation.

The biologically active agents can be conveniently provided to a subject as sterile liquid preparations, e.g., isotonic aqueous solutions, suspensions, emulsions, dispersions, or viscous compositions, which may be buffered to a selected pH. Cells and agents of the invention may be provided as liquid or viscous formulations. For some applications, liquid formations are desirable because they are convenient to administer, especially by injection. Where prolonged contact with a tissue is desired, a viscous composition may be preferred. Such compositions are formulated within the appropriate viscosity range. Liquid or viscous compositions can comprise carriers, which can be a solvent or dispersing medium containing, for example, water, saline, phosphate buffered saline, polyol (for example, glycerol, propylene glycol, liquid polyethylene glycol, and the like) and suitable mixtures thereof.

Sterile injectable solutions are prepared by suspending talampanel and/or perampanel in the required amount of the appropriate solvent with various amounts of the other ingredients, as desired. Such compositions may be in admixture with a suitable carrier, diluent, or excipient, such as sterile water, physiological saline, glucose, dextrose, or the like. The compositions can also be lyophilized. The compositions can contain auxiliary substances such as wetting, dispersing, or emulsifying agents (e.g., methylcellulose), pH buffering agents, gelling or viscosity enhancing additives, preservatives, flavoring agents, colors, and the like, depending upon the route of administration and the preparation desired. Standard texts, such as "REMINGTON'S PHARMACEUTICAL SCIENCE", 17th edition, edited by Alfonso R. Gennaro, Mack Publication Co., Easton, PA, 1985, incorporated herein by reference, may be consulted to prepare suitable preparations, without undue experimentation.

Various additives which enhance the stability and sterility of the compositions, including antimicrobial preservatives, antioxidants, chelting agents, and buffers, can be added. Prevention of the action of microorganisms can be ensured by various antibacterial and antifungal agents, for example, parabens, chlorobutanol, phenol, sorbic acid, and the like. Prolonged absorption of the injectable pharmaceutical form can be brought about by the use of agents delaying absorption, for example, aluminum monostearate and gelatin. According to the present invention, however, any vehicle, diluent, or additive used would have to be compatible with the cells or agents present in their conditioned media.

The compositions can be isotonic, i.e., they can have the same osmotic pressure as blood and lacrimal fluid. The desired isotonicity of the compositions of this invention may be accomplished using sodium chloride, or other pharmaceutically acceptable agents such as dextrose, boric acid, sodium tartrate, propylene glycol or other inorganic or organic solutes. Sodium chloride is preferred particularly for buffers containing sodium ions.

Viscosity of the compositions, if desired, can be maintained at the selected level using a pharmaceutically acceptable thickening agent, such as methylcellulose. Other suitable thickening agents include, for example, xanthan gum, carboxymethyl cellulose, hydroxypropyl cellulose, carbomer, and the like. The choice of suitable carriers and other additives will depend on the exact route of administration and the nature of the particular dosage form, e.g., liquid dosage form (e.g., whether the composition is to be formulated into a solution, a suspension, gel or another liquid form, such as a time release form or liquid-filled form). Those skilled in the art will recognize that the components of the compositions should be selected to be chemically inert.

It should be understood that the method and compositions that would be useful in the present invention are not limited to the particular formulations set forth in the examples. The following examples are put forth so as to provide those of ordinary skill in the art with a complete disclosure and description of how to make and use the cells, expansion and culture methods, and therapeutic methods of the invention, and are not intended to limit the scope of what the inventors regard as their invention.

The practice of the present invention employs, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", fourth edition Green, M. R. & Sambrook, J., Cold Spring Harbor Laboratory Press, 2012); "Oligonucleotide Synthesis" (Paselk R. A., edited by Gait, M. J., IRL Press, Oxford, 1984); "Culture of Animal Cells" Freshney, R. I., John Wiley & Sons, Inc., 2010); "Methods in Enzymology" (Vol. 152, Guide to Molecular Cloning Techniques, Berger and Kimmel, Eds., San Diego: Academic Press, Inc., 1987); "Handbook of Experimental Immunology" (Herzenberg L. A., Weir, D. M., Blackwell, C., Wiley, 1997); "Gene Transfer Vectors for Mammalian Cells" (Miller and Calos, eds., Cold Spring Harbor Laboratory, Cold Spring Harbor, 1987); "Short Protocols in Molecular Biology" (Ausubel, F. M., et al., ed., John Wiley & Sons, 2002); "Polymerase Chain Reaction: Principles, Applications and Troubleshooting", (Babar, M. E., publisher VDM Verlag Dr. Müller, 2011); "Current Protocols in Immunology" (Colligan, J. E., et al., ed., Greene Pub. Associates and Wiley-Interscience, 2002). These techniques are applicable to inter alia the production of the polynucleotides and polypeptides of the invention, and, as such, may be considered in making and practicing the invention. Particularly useful techniques for particular embodiments will be discussed in the sections that follow.

EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Example 1

C34-CXCR4 Signaling Mutants

Figure 2:
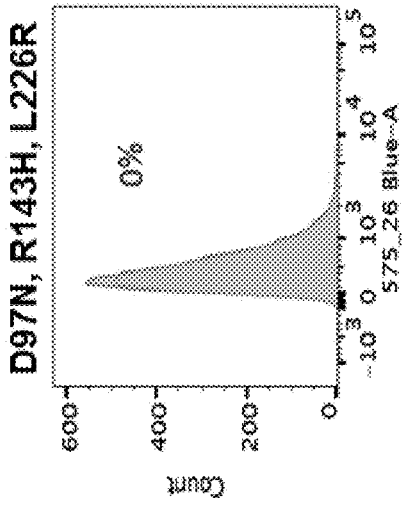
FIG. 2 shows results of a SDF-1 Response Assay (D97N, L86P, D97N, R134H, L226R).
Figure 2:
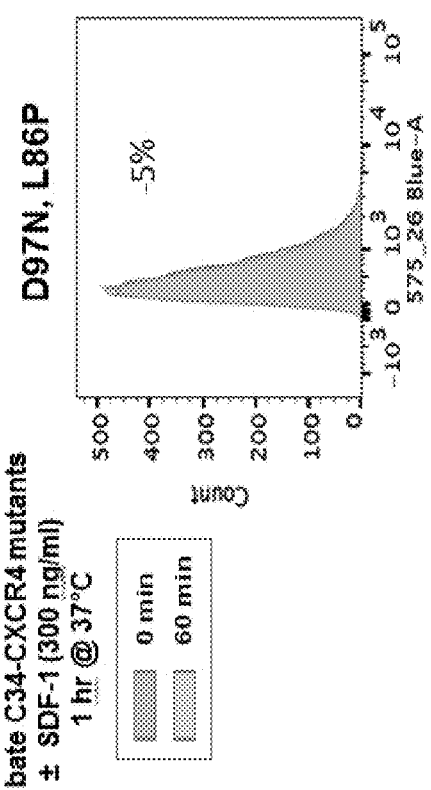

FIGS. 1-2 show assessment of SDF-1 induced down regulation of CXCR4 and C34-CXCR4. Cell lines expressing C34-CXCR4 mutants were incubated±SDF-1 (300 ng/ml) for 1 hour at 37° C.

Figure 3:
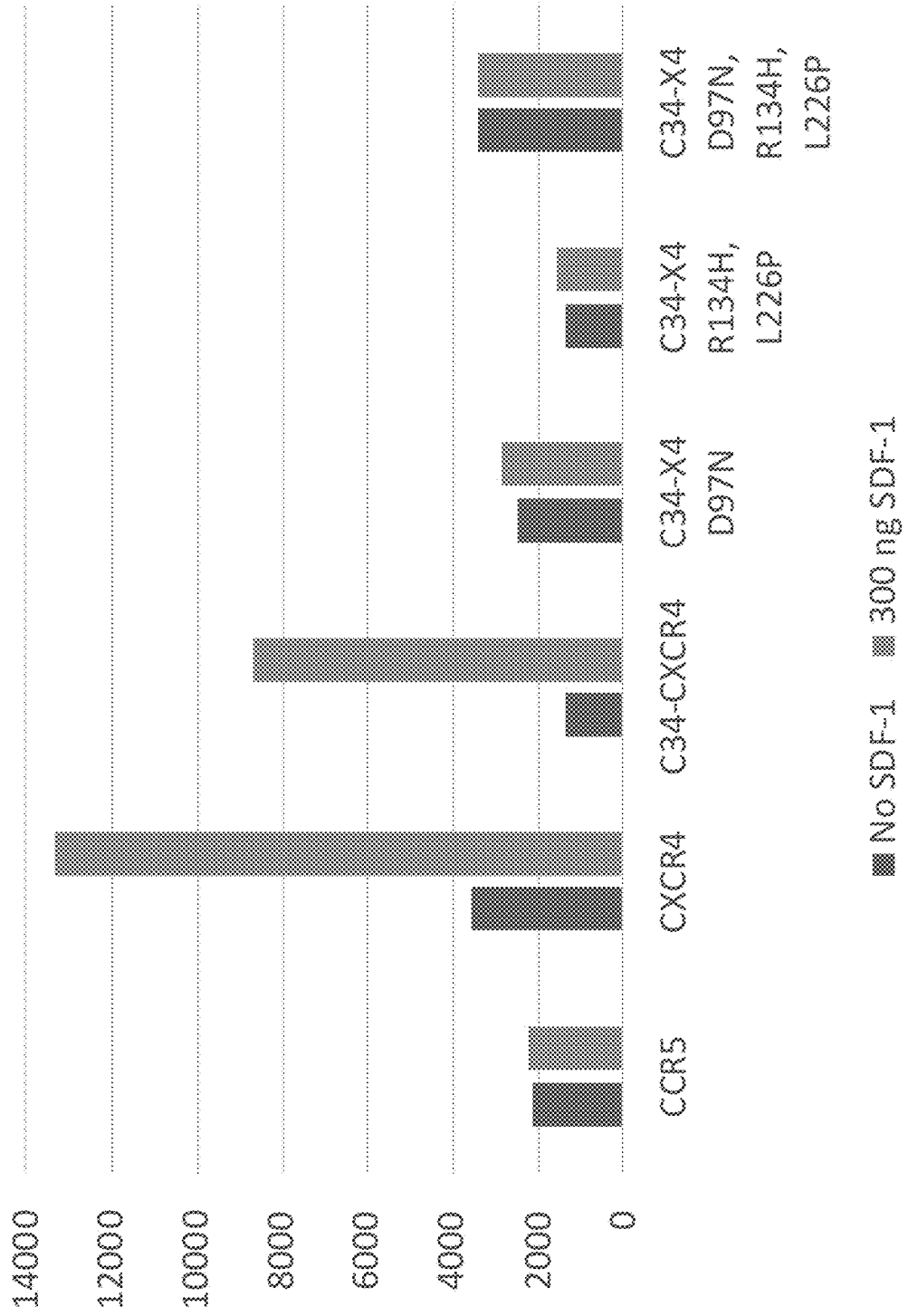
FIG. 3 shows results of a Transwell migration assay.
Figure 4:
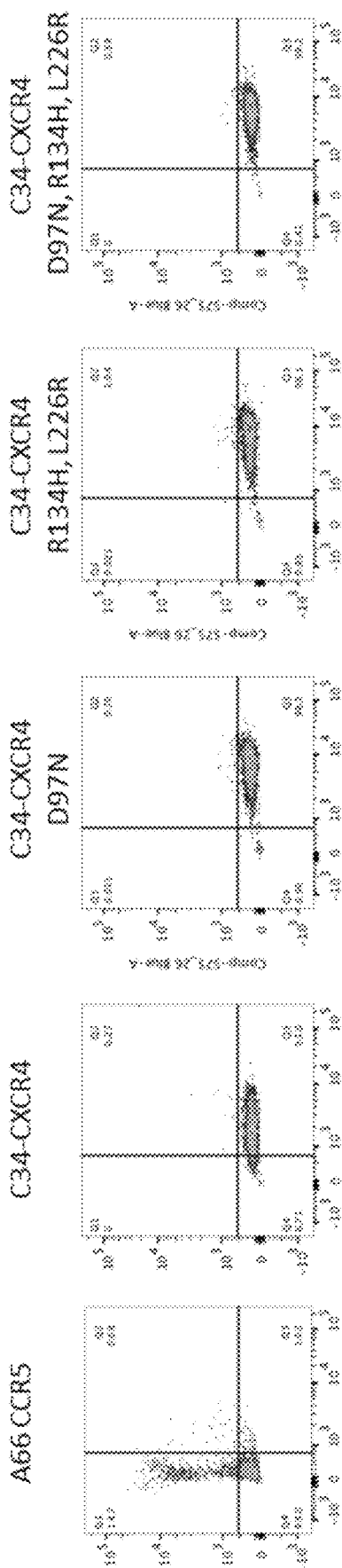
FIG. 4 shows SupT1 A66 cells fully transduced to express either CCR5 or the indicated C34 constructs. The C34 expressing cells (C34-CXCR4; C34-CXCR4 D97N; C34-CXCR4 R134H, L226R; C34-CXCR4 D97N, R134H, L226R) are protected from infection with HIV-1 R3A relative to control cells (A66 CCR5) five days after infection. X axis shows anti-C34 (Alexa Flour 488) and the Y axis is HIV gag p 24 (PE) staining. The data was collected on a flow cytometer.
Figure 5:
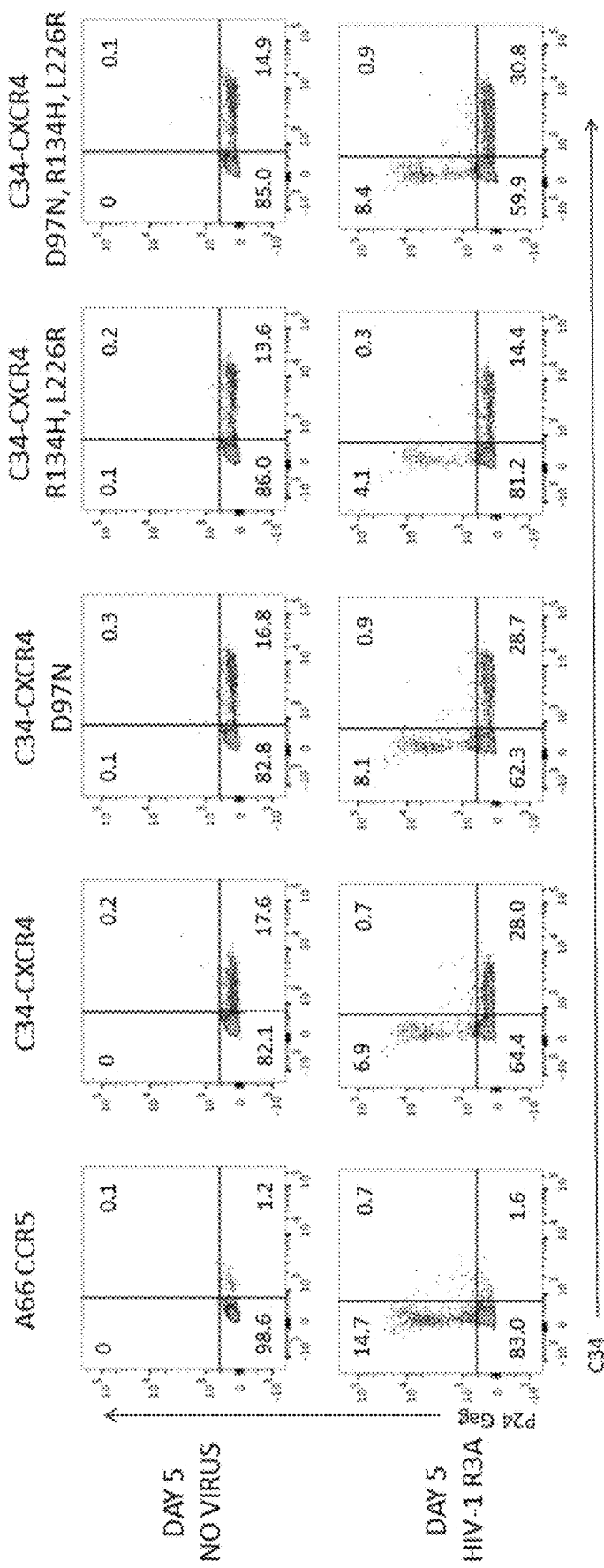
FIGS. 5-7 show a ⅕ mixture of the indicated SupT1 A66 expressing C34 constructs and CCR5 and non-C34 expressing SupT1 A66 expressing CCR5. The top row of each figure shows C34 (Alexa Flour 488) and HIV gag p24 (PE) staining of samples that were mock infected and the bottom row depicts cells that were infected with HIV-1$_{R3A}$.
Figure 6:
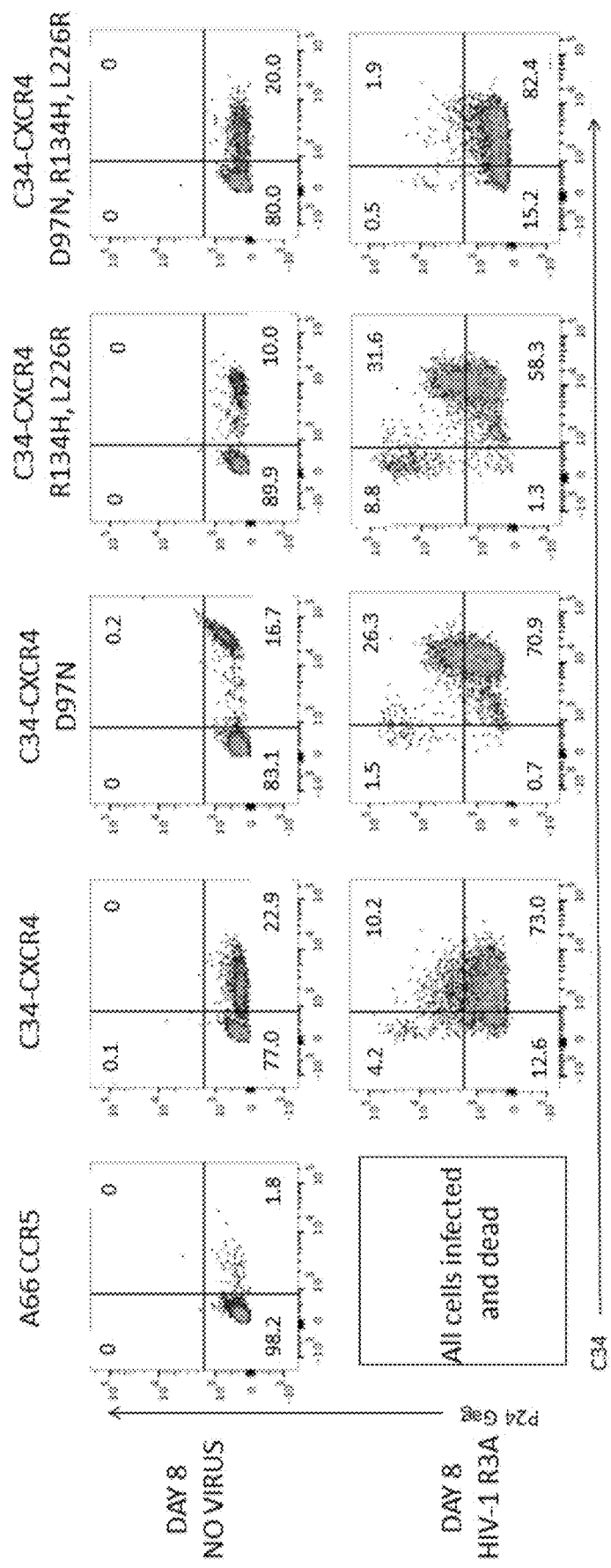
Figure 7:
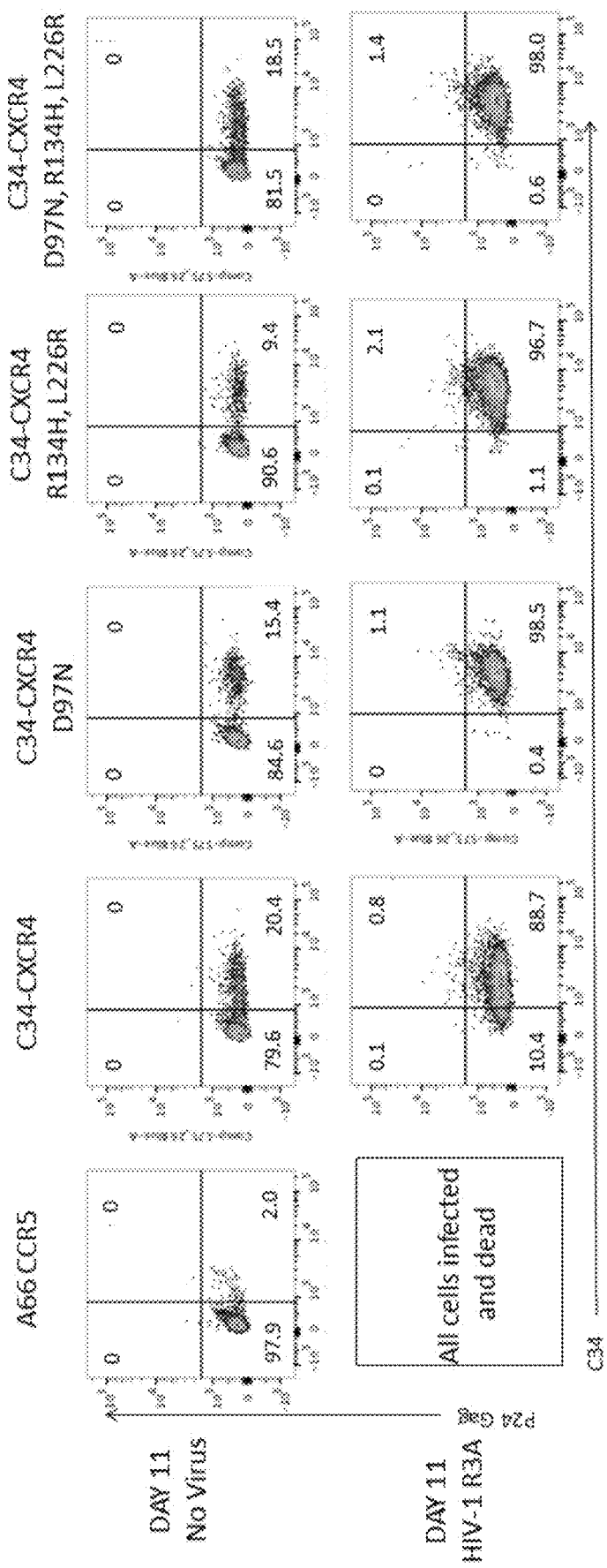

FIG. 3 shows results of a Transwell migration assay of cells with the genetic background as shown in the figure (n=3). The Transwell migration assay was performed as follows:
1. Add RPMI with 300 ng/ml SDF-1 to bottom chamber of Transwell plate.
2. Add $5*10^5$ cells to Transwell insert chamber with 3 µM pores.
3. Incubate cells overnight.
4. Count number of cells that migrated through pores into lower chamber (via FACS w time constant 180 sec).

FIGS. 4-7 show survival and an enrichment of C34+ T-cells in an in vitro infection assay. At day 11 (FIG. 7) enrichment of C34 expressing cells is significant.

Figure 8:
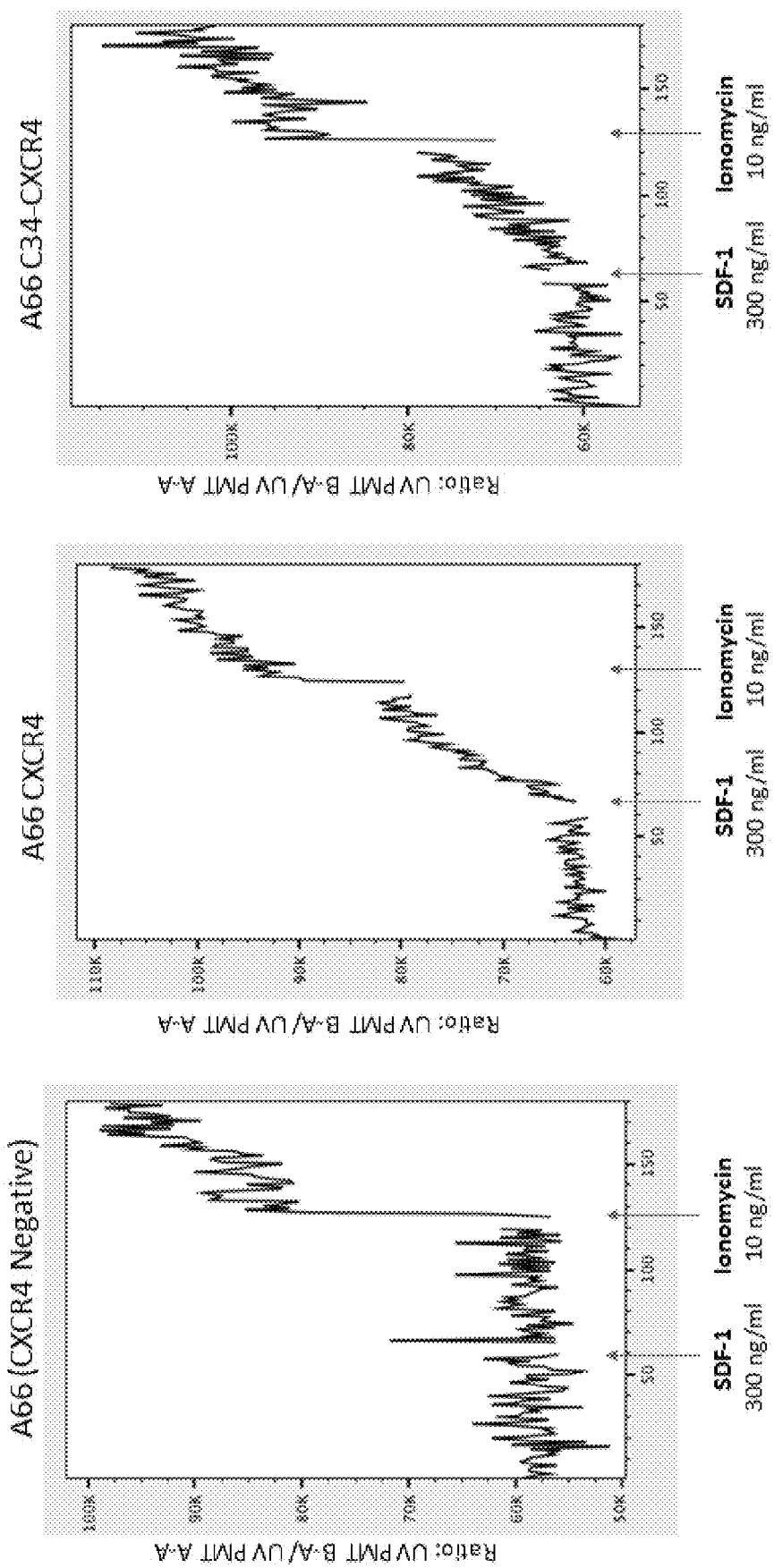
FIG. 8 shows calcium flux in transduced SupT1 cell lines (A66 (CXCR4 negative); A66 CXCR4; A66 C34-CXCR4) with SDF-1 (CXCL12) and Ionomycin.
Figure 9:
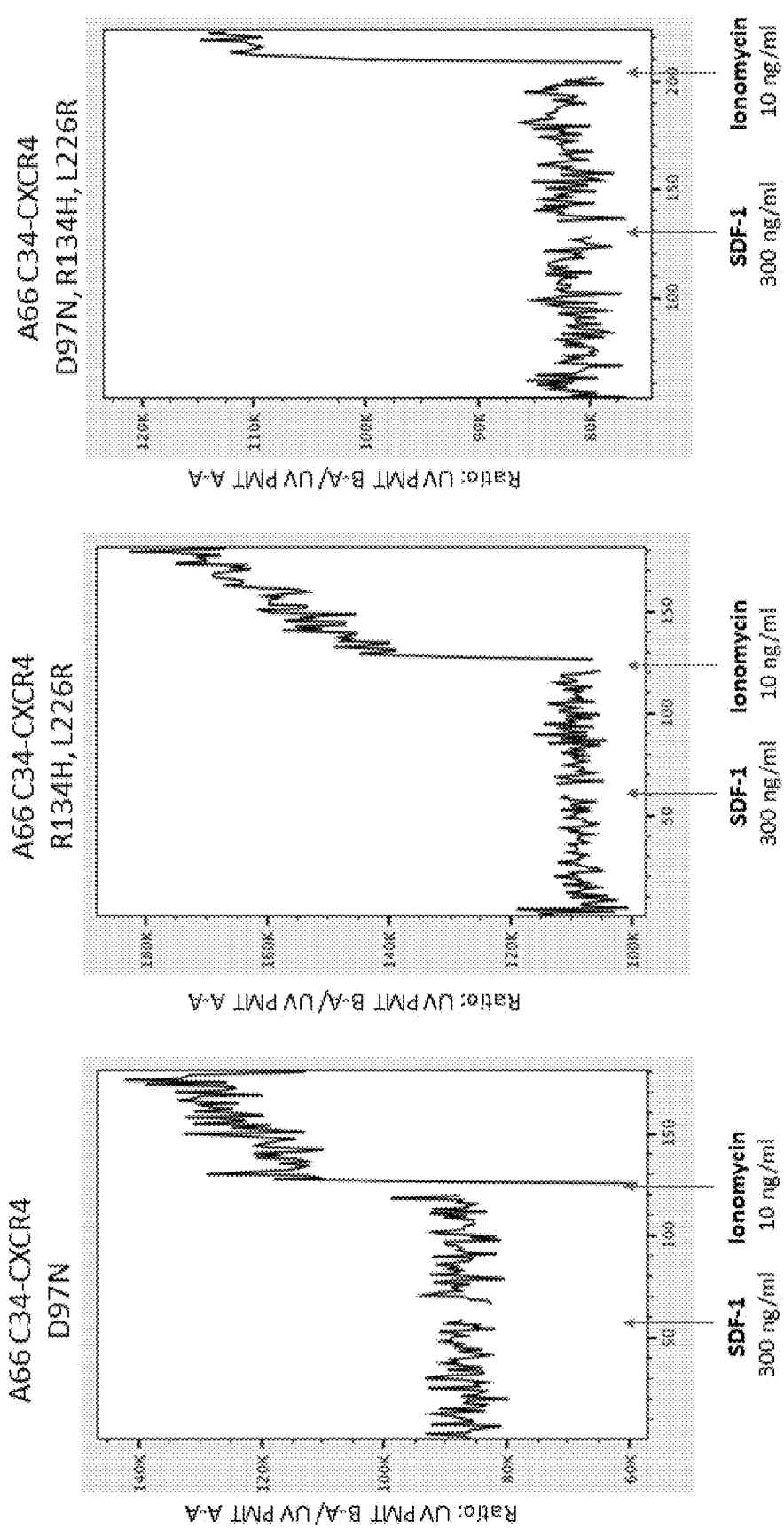
FIG. 9 shows calcium flux in transduced SupT1 cell lines (A66 C34-CXCR4 D97N; A66 C34-CXCR4 R134H, L226R; A66 C34-CXCR4, D97N, R134H, L226R) with SDF-1 (CXCL12) and Ionomycin.

FIGS. 8-9 show calcium flux in transduced SupT1 cell lines treated with SDF-1 (CXCL12) and Ionomycin (n=3).

Example 2

HIV-Resistant Dual Receptor Armed CAR T Cells Mitigate HIV Replication and Disease Pathogenesis In Vivo Chimeric Antigen Receptor (CAR) T cell immunotherapies have induced durable remissions for treatment-refractory malignancies by infusing engineered, cancer-specific effector T cells (June, C. H. & Sadelain, M. Chimeric Antigen Receptor Therapy. *N Engl J Med* 379, 64-73 (2018)). In contrast, less progress has been made developing a successful CAR T cell therapy for HIV infection, despite the fact that next-generation CAR T cells may be uniquely equipped to overcome many of the mechanisms by which HIV undermines host immunity, including epitope escape through rapid evolution, T cell exhaustion, and waning $CD4^+$ T cell-help (Riley, J. L. & Montaner, L. J. Cell-Mediated Immunity to Target the Persistent Human Immunodeficiency Virus Reservoir. *J Infect Dis* 215, S160-S171 (2017); Maldini, C. R., Ellis, G. I. & Riley, J. L. CAR T cells for infection, autoimmunity and allotransplantation. *Nat Rev Immunol* 18, 605-616 (2018)). Indeed, a potent and sustained T cell response of the kind that CAR T cells can afford is likely to be essential for the development of an effective HIV cure (Walker, B. & McMichael, A. The T-cell response to HIV. *Cold Spring Harb Perspect Med* 2(2012)).

CARs endow novel immune specificity to patient T cells through expression of an extracellular antigen recognition domain linked to an intracellular T cell costimulatory domain and the CD3-ζ chain (Gross, G., Waks, T. & Eshhar, Z. Expression of immunoglobulin-T-cell receptor chimeric molecules as functional receptors with antibody-type specificity. *Proc Natl Acad Sci USA* 86, 10024-10028 (1989); van der Stegen, S. J., Hamieh, M. & Sadelain, M. The pharmacology of second-generation chimeric antigen receptors. *Nat Rev Drug Discov* 14, 499-509 (2015)). The archetypal costimulatory domains for second-generation CARs are CD28 and 4-1BB, both of which are incorporated into licensed CD19-targeting CAR T cell therapies (Maude, S. L., et al. Chimeric antigen receptor T cells for sustained remissions in leukemia. *N Engl J Med* 371, 1507-1517 (2014); Porter, D. L., et al. Chimeric antigen receptor T cells persist and induce sustained remissions in relapsed refractory chronic lymphocytic leukemia. *Sci Transl Med* 7, 303ra139 (2015)). Preclinical cancer models demonstrate that CD28-costimulated CAR T cells exhibit profound effector function resulting in rapid tumor clearance, but have limited persistence in vivo (Brentjens, R. J., et al. Genetically targeted T cells eradicate systemic acute lymphoblastic leukemia xenografts. *Clin Cancer Res* 13, 5426-5435 (2007); Song, D. G., et al. In vivo persistence, tumor localization, and antitumor activity of CAR-engineered T cells is enhanced by costimulatory signaling through CD137 (4-1BB). *Cancer Res* 71, 4617-4627 (2011)). In contrast, 4-1BB-costimulated CAR T cells have slower antitumor response kinetics, but sustained cellular division and greater long-term survival (Carpenito, C., et al. Control of large, established tumor xenografts with genetically retargeted human T cells containing CD28 and CD137 domains. *Proc Natl Acad Sci USA* 106, 3360-3365 (2009); Milone, M. C., et al. Chimeric receptors containing CD137 signal transduction domains mediate enhanced survival of T cells and increased antileukemic efficacy in vivo. *Mol Ther* 17, 1453-1464 (2009); Cheng, Z., et al. In Vivo Expansion and Antitumor Activity of Coinfused CD28- and 4-1BB-Engineered CAR-T Cells in Patients with B Cell Leukemia. *Mol Ther* 26, 976-985 (2018); Quintarelli, C., et al. Choice of costimulatory domains and of cytokines determines CAR T-cell activity in neuroblastoma. *Oncoimmunology* 7, e1433518 (2018)). Importantly, the distinct signaling pathways used by CD28 and 4-1BB prompt unique metabolic, phenotypic and functional T cell profiles that appear to engender optimal CAR T cell activity for specific diseases (Kawalekar, O. U., et al. Distinct Signaling of Coreceptors Regulates Specific Metabolism Pathways and Impacts Memory Development in CAR T Cells. *Immunity* 44, 380-390 (2016); Neelapu, S. S., et al. Axicabtagene Ciloleucel CAR T-Cell Therapy in Refractory Large B-Cell Lymphoma. *N Engl J Med* 377, 2531-2544 (2017); Maude, S. L., et al. Tisagenlecleucel in Children and Young Adults with B-Cell Lymphoblastic Leukemia. *N Engl J Med* 378, 439-448 (2018); Park, J. H., et al. Long-Term Follow-up of CD19 CAR Therapy in Acute Lymphoblastic Leukemia. *N Engl J Med* 378, 449-459 (2018); Salter, A. I., et al. Phosphoproteomic analysis of chimeric antigen receptor signaling reveals kinetic and quantitative differences that affect cell function. *Sci Signal* 11(2018); Schuster, S. J., et al. Tisagenlecleucel in Adult Relapsed or Refractory Diffuse Large B-Cell Lymphoma. *N Engl J Med* 380, 45-56 (2019)). Hence, great emphasis has been placed on discovering costimulatory signals that fully potentiate CAR T cell function (Abate-Daga, D. & Davila, M. L. CAR models: next-generation CAR modifications for enhanced T-cell function. *Mol Ther Oncolytics* 3, 16014 (2016); Weinkove, R., George, P., Dasyam, N. & McLellan, A. D. Selecting costimulatory domains for chimeric antigen receptors: functional and clinical considerations. *Clin Transl Immunology* 8, e1049 (2019)).

The earliest clinical trials of CAR T cell therapy utilized first-generation, HIV-specific CD4-based CAR T cells expressing the CD3-ζ endodomain, and were ineffective at treating either chronically-infected or antiretroviral therapy (ART)-suppressed individuals (Deeks, S. G., et al. A phase II randomized study of HIV-specific T-cell gene therapy in subjects with undetectable plasma viremia on combination antiretroviral therapy. *Mol Ther* 5, 788-797 (2002); Colovos, C., Villena-Vargas, J. & Adusumilli, P. S. Safety and stability of retrovirally transduced chimeric antigen receptor T cells. *Immunotherapy* 4, 899-902 (2012); Scholler, J., et al. Decade-long safety and function of retroviral-modified chimeric antigen receptor T cells. *Sci Transl Med* 4, 132ra153 (2012)). However, the cancer immunotherapy field has since driven significant developments in CAR technology, which has renewed interest in applying these advances to treatment of HIV. In fact, several recent studies have evaluated the utility of CAR T cells in this disease setting (Ali, A., et al. HIV-1-Specific Chimeric Antigen Receptors Based on Broadly Neutralizing Antibodies. *J Virol* 90, 6999-7006 (2016); Hale, M., et al. Engineering HIV-Resistant, Anti-HIV Chimeric Antigen Receptor T Cells. *Mol Ther* 25, 570-579 (2017); Leibman, R. S., et al. Supraphysiologic control over HIV-1 replication mediated by CD8 T cells expressing a re-engineered CD4-based chimeric antigen receptor. *PLoS Pathog* 13, e1006613 (2017); Zhen, A., et al. Long-term persistence and function of hematopoietic stem cell-derived chimeric antigen receptor T cells in a nonhuman primate model of HIV/AIDS. *PLoS Pathog* 13, e1006753 (2017); Anthony-Gonda, K., et al. Multispecific anti-HIV duoCAR-T cells display broad in vitro antiviral activity and potent in vivo elimination of HIV-infected cells in a humanized mouse model. *Sci Transl Med* 11(2019); Herzig, E., et al. Attacking Latent HIV with convertibleCAR-T Cells, a Highly Adaptable Killing Platform. *Cell* 179, 880-894 e810 (2019)). However, critical knowledge gaps remain in our understanding of the mechanistic underpinnings of successful and failed CAR T cell therapy, particularly in a model system that recapitulates HIV pathogenesis, which would serve to accelerate the development of this strategy for cure initiatives.

Here, a stringent small-animal model of HIV infection was utilized to iteratively test the differential functional consequence of CD28 and 4-1BB costimulation in the context of optimizing HIV-specific (CD4-based) CAR T cell therapy. The BLT (bone marrow, liver, thymus) humanized mouse model develops a human immune system that establishes chronic HIV infection characterized by high viral loads, rapid CD4+ T cell depletion, and T cell exhaustion (Sun, Z., et al. Intrarectal transmission, systemic infection, and CD4+ T cell depletion in humanized mice infected with HIV-1. *J Exp Med* 204, 705-714 (2007); Denton, P. W., et al. Antiretroviral pre-exposure prophylaxis prevents vaginal transmission of HIV-1 in humanized BLT mice. *PLoS Med* 5, e16 (2008); Brainard, D. M., et al. Induction of robust cellular and humoral virus-specific adaptive immune responses in human immunodeficiency virus-infected humanized BLT mice. *J Virol* 83, 7305-7321 (2009); Zhen, A., et al. Targeting type I interferon-mediated activation restores immune function in chronic HIV infection. *J Clin Invest* 127, 260-268 (2017)). The BLT mouse model was leveraged to make stepwise improvements to the HIV-specific CAR T cell product, culminating in HIV-resistant (C34-CXCR4+), dual receptor armed CAR T cells that independently express the CD28/CD3-ζ and 4-1BB/CD3-ζ endodomains on the same cell. Collectively, these data provide extraordinary insight regarding engineered T cell-based therapy including the challenges that exist for CAR T cells in a preclinical animal model of HIV infection, and highlight the functional utility of a novel Dual-CAR T cell product that mitigate HIV-induced disease.

The materials and methods employed in these experiments are now described.

Maldini, C. R. et al., Dual CD4-based CAR T cells with distinct costimulatory domains mitigate HIV pathogenesis in vivo, *Nature Medicine* 26, 1776-1787 (2020) is herein incorporated by reference in its entirety.

Ethics Statement:

Anonymized human fetal tissue was acquired from Advanced Bioscience Resources (ABR, Alameda, CA), and used under Institutional Review Board-approved protocols. Humanized mouse experiments performed at the Ragon Institute of MGH, MIT and Harvard were approved by the Massachusetts General Hospital Institutional Animal Care and Use Committee (IACUC) under the approved protocol 2016N000483. Humanized mouse experiments performed at the University of Pennsylvania were approved by the University of Pennsylvania IACUC under the approved protocol 805606. All animal studies were carried out in accordance with recommendations in the Guide for the Care and Use of Laboratory Animals of the National Institutes of Health. Purified adult human CD3+ and CD4+ T cells were obtained by the University of Pennsylvania Human Immunology Core/CFAR Immunology Core from de-identified healthy donors.

Humanized Mice:

Male and female NOD/SCID/IL2Rγ$^{-/-}$ (NSG) mice (The Jackson Laboratory) were housed at in pathogen-free facilities at either the Ragon Institute of MGH, MIT and Harvard or the University of Pennsylvania. Mice were maintained in microisolator cages and fed autoclaved food and water. BLT humanized mice were generated at the Ragon Institute as previously described (Brainard, D. M., et al. Induction of robust cellular and humoral virus-specific adaptive immune responses in human immunodeficiency virus-infected humanized BLT mice. *J Virol* 83, 7305-7321 (2009); Dudek, T. E., et al. Rapid evolution of HIV-1 to functional CD8(+) T cell responses in humanized BLT mice. *Sci Transl Med* 4, 143ra198 (2012); Claiborne, D. T., et al. Immunization of BLT Humanized Mice Redirects T Cell Responses to Gag and Reduces Acute HIV-1 Viremia. *J Virol* 93(2019)). Briefly, 6 to 8-week-old NSG mice were sublethally whole-body irradiated (2 Gy), anesthetized, and implanted with 1-mm$^3$ fragments of human fetal thymus and liver tissue under the murine kidney capsule. Following, $10^5$ autologous fetal liver tissue derived human CD34+ hematopoietic stem cells (HSCs) were injected intravenously (IV) within 6 hours of tissue transplantation. Human fetal tissues (17 to 19 weeks of gestational age) were made available through Advanced Bioscience Resources (ABR, Alameda, CA). BLT humanized mice were also generated at the University of Pennsylvania as previously described (Pardi, N., et al.

Administration of nucleoside-modified mRNA encoding broadly neutralizing antibody protects humanized mice from HIV-1 challenge. *Nat Commun* 8, 14630 (2017)). Briefly, 1-1.5×10$^5$ human fetal liver-derived CD34$^+$ HSCs were administered IV into 7 to 10-week old NSG mice 24 hours after busulfan (30 mg kg$^{-1}$) conditioning. 3 to 6 days following stem cell transplant, mice were surgically implanted with 3 to 5 fragments of autologous human fetal thymus tissue measuring 3 to 5 mm$^3$ under the murine kidney capsule. For all BLT humanized mice, human immune reconstitution was monitored over 12 to 17 weeks. Mice were generally considered reconstituted and included in experiments when greater than 50% of cells in the lymphocyte gate were human CD45$^+$ and, of those human cells, greater than 40% were CD3$^+$ T cells.

Flow Cytometry and Cell Sorting:

Surface staining was performed in PBS containing 2% fetal calf serum and 2 mM EDTA using anti-human antibodies procured from the following sources: BioLegend: CD45 (HI30 and 2D1), CD19 (HIB19), CD3 (OKT3), CD4 (OKT4), CD8 (RPA-T8), CD45RA (HI100), CD27 (LG.3A10), CCR7 (G043H7), CCR5 (J418F1), CD271 (ME20.4), PD-1 (EH12.2H7), TIGIT (VSTM3), 2B4 (C1.7), CD107a (H4A3); BD Biosciences: CD45 (HI30), CD3 (UCHT1), CD8 (SK1), CD45RA (HI100), CCR7 (3D12); R&D: Human EGFR (Cetuximab Biosimilar, Hu1). Live cells were discriminated by staining with either Fixable Viability Dye eFlour 780 (eBioscience) or LIVE/DEAD Fixable Blue (Invitrogen). Intracellular proteins were stained for with Cell Fixation & Cell Permeabilization Kit (Invitrogen) or True-Nuclear Transcription Factor Buffer Set (BioLegend) in accordance with the manufacture's protocol using antibodies from the following sources: BioLegend: IL-2 (MQH-17H12), Perforin (B-D48); BD Biosciences: TNF (Mab11), IFN-γ (4S.B3), Granzyme B (GB11), MIP-1β (D21-1351), GM-CSF (BVD2-21C11), Active Caspase-3 (C92605); Beckman Coulter: HIV-1 Core Antigen (KC57); eBioscience: T-bet (4B10), EOMES (WD1928), TOX (TXRX10). Flow cytometry data were acquired on a BD LSR II and BD LSRFortessa instruments. Data were analyzed using FlowJo software (TreeStar). Live C34-CXCR4$^+$ and C34-CXCR4$^-$ CAR T cells were sorted from splenocytes after surface staining with the following antibodies from BioLegend: CD45 (2D1), CD3 (OKT3), CD4 (OKT4), CD8 (RPA-T8). Living CAR T cells were discriminated based on staining with Fixable Viability Dye eFlour 780 (FIGS. 33A-33E). Cell sorting was performed on the Aria II from BD Biosciences.

HIV Inoculum Preparation:

Viral stocks of the HIV$_{JRCSF}$ and HIV$_{MJ4}$ molecular clones were generated through transfections of HEK293T cells (ATCC: CRL-3216) and tittered as previously described (Boutwell, C. L., Rowley, C. F. & Essex, M. Reduced viral replication capacity of human immunodeficiency virus type 1 subtype C caused by cytotoxic-T-lymphocyte escape mutations in HLA-B57 epitopes of capsid protein. *J Virol* 83, 2460-2468 (2009)). HIV$_{BAL}$ virus stocks were generated by passage in anti-CD3/CD28 stimulated human CD4$^+$ T cells as previously described (Leibman, R. S., et al. Supraphysiologic control over HIV-1 replication mediated by CD8 T cells expressing a re-engineered CD4-based chimeric antigen receptor. *PLoS Pathog* 13, e1006613 (2017)).

HIV Viral Load Quantitation:

Viral RNA was isolated from plasma using the QiaAmp Viral RNA Mini Kit (Qiagen). Viral Loads were determined by quantitative RT-PCR using the QuantiFast Syber Green RT-PCR kit (Qiagen) as previously described (Boutwell, C. L., Rowley, C. F. & Essex, M. Reduced viral replication capacity of human immunodeficiency virus type 1 subtype C caused by cytotoxic-T-lymphocyte escape mutations in HLA-B57 epitopes of capsid protein. *J Virol* 83, 2460-2468 (2009)). The limit of quantification for this assay is 1.81 log copies RNA mL$^{-1}$ plasma.

Plasmid Construction:

The amino acid sequence for the CD4-based CAR constructs containing the intracellular signaling domains: CD3-ζ, 4-1BB/CD3-ζ and CD28/CD3-ζ are described elsewhere (Leibman, R. S., et al. Supraphysiologic control over HIV-1 replication mediated by CD8 T cells expressing a re-engineered CD4-based chimeric antigen receptor. *PLoS Pathog* 13, e1006613 (2017)). In this study, each CAR was amplified from their original plasmid with 5'-CACGTCCTAG-GATGGCCTTACCAGTG (SEQ ID NO: 4) and 5'-GTGGTCGACTTATGCGCTCCTGCTGAAC (SEQ ID NO: 5) and inserted into the AvrII and SalI restriction enzyme sites of the pTRPE plasmid. In this orientation, the CAR is downstream of GFP, mCherry or iRFP670 and a T2A linker that permits expression of both proteins. To construct the plasmids for CAR T cell selection, double-stranded DNA fragments (IDT) encoding NGFR (CD271) and truncated EGFR were custom synthesized, flanked with suitable restriction enzyme sites and cloned into the second position of the pTRPE plasmid preceded by the CAR-BBζ and CAR-28ζ gene and T2A linker (Johnson, D., et al. Expression and structure of the human NGF receptor. *Cell* 47, 545-554 (1986); Wang, X., et al. A transgene-encoded cell surface polypeptide for selection, in vivo tracking, and ablation of engineered cells. *Blood* 118, 1255-1263 (2011)). The amino acid sequence for the C34-CXCR4 construct is described elsewhere (Leslie, G. J., et al. Potent and Broad Inhibition of HIV-1 by a Peptide from the gp41 Heptad Repeat-2 Domain Conjugated to the CXCR4 Amino Terminus. *PLoS Pathog* 12, e1005983 (2016)). A single Asp mutation was introduced in CXCR4 (D97N), which has been previously described to impair SDF-1 binding and limits receptor internalization (Leslie et al. manuscript in preparation) (Brelot, A., Heveker, N., Montes, M. & Alizon, M. Identification of residues of CXCR4 critical for human immunodeficiency virus coreceptor and chemokine receptor activities. *J Biol Chem* 275, 23736-23744 (2000)).

Lentivirus Production and Transfection:

To generate lentiviral particles, expression vectors encoding VSV or Cocal glycoprotein, HIV Rev, HIV Gag and Pol (pTRPE pVSV-g, pCocal-g, pTRPE.Rev, and pTRPE g/p, respectively) were synthesized by DNA 2.0 or ATUM (Newark, CA) and transfected into HEK293T cells with pTRPE transfer vectors using Lipofectamine 2000 (Life Technologies) as previously described (Leibman, R. S., et al. Supraphysiologic control over HIV-1 replication mediated by CD8 T cells expressing a re-engineered CD4-based chimeric antigen receptor. *PLoS Pathog* 13, e1006613 (2017); Richardson, M. W., et al. Mode of transmission affects the sensitivity of human immunodeficiency virus type 1 to restriction by rhesus TRIM5alpha. *J Virol* 82, 11117-11128 (2008)). Transfected HEK293T cell supernatant was collected at 24 and 48 hours, filtered through a 0.45 μm nylon syringe filter and concentrated by ultracentrifugation for 2.5 hours at 25,000 rpm at 4° C. Supernatant was aspirated and virus pellet was resuspend in 800 μL total volume and stored at -80° C.

Cell Culture and Selection:

For preparation of CAR T cells: T cells from healthy adult human donors were purified by negative selection using RosetteSep Human CD3+ Enrichment Cocktails (Stem-Cell Technologies) according to the manufacturer's protocol. T cells from BLT humanized mice were purified by creating single-cell suspensions from spleen, bone marrow, and liver. Mononuclear cells were isolated by density gradient centrifugation using Lymphoprep (Stem-Cell Technologies). Human CD2+ cells were purified by CD2 Microbeads (Miltenyi Biotec) according to the manufacturer's protocol. T cells were cultured at $10^6$ cells mL$^{-1}$ in either complete RPMI: RPMI 1640, 1% Penicillin-Streptomycin, 2 mM GlutaMax and 25 mM HEPES buffer from Life Technologies, and 10% fetal calf serum (Seradigm), or CTS OpTmizer T-Cell Expansion SFM (Gibco) with 1% Penicillin-Streptomycin, 2 mM GlutaMax and 25 mM HEPES buffer. T cell expansion medium was supplemented with 10 ng mL$^{-1}$ human IL-7 (R&D) and 5 ng mL$^{-1}$ human IL-15 (BioLegend). T cells were stimulated with anti-CD3/CD28 coated Dynabeads (Life Technologies) at a 3:1 bead-to-cell ratio at 37° C., 5% $CO_2$ and 95% humidity incubation conditions. 18 hours after stimulation half of the medium was removed and replaced with 200 to 300 μL of the appropriate lentivirus supernatant for CAR transduction. On day 5, the Dynabeads were removed from cell culture by magnetic separation. Medium was changed every other day throughout cell culture spanning 8 to 10 days, or as necessary to adjust cell counts to $0.5 \times 10^6$ cells mL$^{-1}$.

Two-step immunomagnetic selection of CAR T cells during manufacturing: On day 4 after initial T cell activation, anti-CD3/CD28 Dynabeads were removed by magnetic bead separation. T cells were counted and then incubated at a 1:2 cell-to-bead ratio with CELLection Biotin Binder Dynabeads (Life Technologies) conjugated to anti-EGFR (Cetuximab) antibody. Truncated EGFR+ T cells were isolated according to the manufacturer's protocol. The cell concentration was adjusted to $0.5 \times 10^6$ cells mL$^{-1}$ with medium and expanded as described above. On day 7 after initial activation, EGFRt+ T cells were counted and incubated with CD271 Microbeads (Miltenyi Biotec) to positively select for NGFR+ T cells according to the manufacturer's instructions. The eluted fraction of T cells contained 85% to 95% EGFR+NGFR+ T cells. The T cells were placed in culture for one more day at the adjusted cell concentration prior to infusion into BLT humanized mice.

HIV Treatment and ART Discontinuation Mouse Model:

For the study described in FIGS. 12A-12L, BLT humanized mice were administered 2 mg of medroxyprogesterone (McKesson) subcutaneously 1 week prior to intravaginal challenge with 20,000 TCID$_{50}$ HIV$_{JRCSF}$ in 20 μL total volume. 75 to 100 mL of blood was obtained through puncture of the retro-orbital sinus weekly to quantify viral load and immunophenotype circulating blood cells. 3 weeks post-HIV challenge all infected mice were administered daily IP injections of antiretroviral therapy (ART) consisting of 10 mg kg$^{-1}$ EFdA (4'-ethynyl-2-fluoro-2'-deoxyadenosine, LeadGen Labs) and 50 mg kg$^{-1}$ Dolutegravir (Sigma) for 1 week and then every second day thereafter. Following 2 weeks of ART, four treatment groups were defined based on normalization of plasma viral load, body weight, and human reconstitution percentages. Group 1 (G1; n=6) and group 3 (G3; n=10) are treatment groups that were infused with $10^7$ CAR-BBζ T cells, while group 2 (G2; n=6) and group 4 (G4; n=9) are control groups that were infused with $10^7$ CAR-BBΔζ T cells that express a defective CD3-ζ endodomain. T cells were administered in a 300 ΔL volume via tail vein injection. ART was interrupted immediately after adoptive T cell transfer for G1 and G2, while ART discontinuation was delayed for 3 weeks in G3 and G4. At necropsy, 17 weeks after HIV challenge, various tissues were collected to analyze the CAR.

Figure 15A:
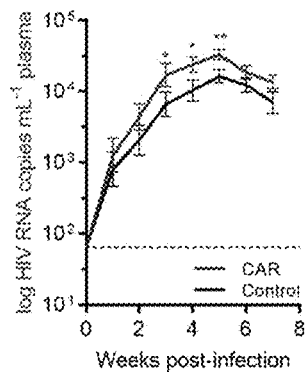
Figure 15B:
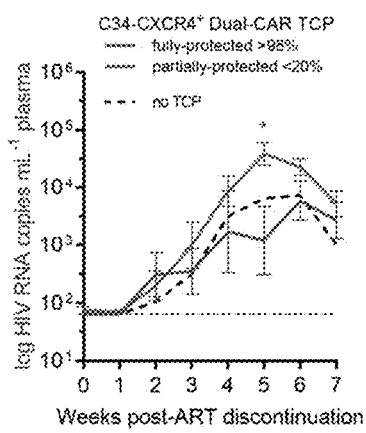

For the study described in FIG. 15B, BLT humanized mice were infected via the intraperitoneal (IP) route with 20,000 TCID$_{50}$ HIV$_{MJ4}$. At 3 weeks post-infection, all mice received ART and either an HIV-resistant (C34-CXCR4+) Dual-CAR T cell product (n=9), an HIV-resistant Dual-CAR T cell product with further magnetic bead selection to obtain a >98% C34-CXCR4+ transfer product (n=8), or no CAR T cells (n=9). After plasma viremia was fully suppressed in all 3 groups, ART was discontinued and virus rebound was monitored via weekly blood draws from the retro-orbital sinus.

Acute HIV Infection Treatment Model:

BLT humanized mice were challenged with 20,000 TCID$_{50}$ HIV$_{JRCSF}$ or HIV$_{MJ4}$ via IP injection. For the study comparing the replication capacity of HIV$_{JRCSF}$ and HIV$_{MJ4}$ (FIGS. 13A-13L): HIV$_{JRCSF}$-infected mice (n=6) and HIV$_{MJ4}$-infected mice (n=6) were infused with the Dual-CAR T cell product consisting of $2 \times 10^7$ total CAR T cells. The T cells were administered via tail vein injection 48 hours after HIV challenge. Control mice that were infected with HIV$_{JRCSF}$ (n=5) or HIV$_{MJ4}$ (n=6) received no T cells. For the study comparing purified Dual-CAR T cell populations (FIG. 14D): HIV$_{MJ4}$-infected mice were allocated into 4 groups and normalized based on body weight and the absolute count of CD4+ T cells in blood. The groups were infused with $10^6$ purified CAR.BBζ.BBζ (n=5), CAR.28ζ.28ζ (n=5) or CAR.BBζ.28ζ (n=5) T cells via tail vein injection 48 hours after HIV challenge. Control mice did not receive T cells. For the study evaluating efficacy of enriched C34-CXCR4+ (>98%) Dual-CAR T cells (FIG. 15C), HIVMJ4-infected mice were divided into two groups that received either $10^7$ C34-CXCR4-enriched Dual CAR T cell product (TCP) (n=12) or no TCP (n=12). For all studies the mice were bled by retro-orbital puncture 1 day following adoptive T cell transfer, and then weekly thereafter until their respective endpoint and tissue collection.

Figure 15C:
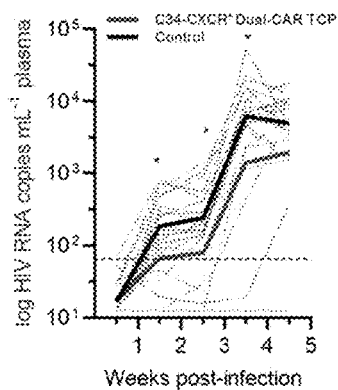
Figure 15D:
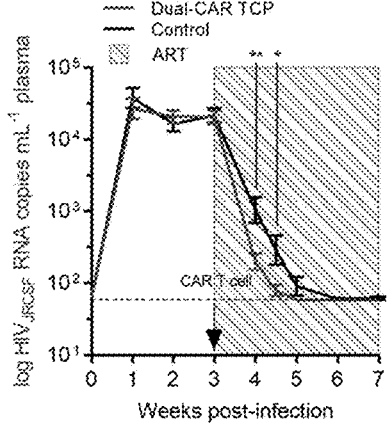

CAR T Cell Therapy and ART Synergy Model:

For the study described in FIG. 15D, BLT humanized mice were challenged with 20,000 TCID$_{50}$HIV$_{JRCSF}$ via IP injection. 3 weeks post-HIV challenge all infected mice were administered low-dose ART consisting of 1 mg kg$^{-1}$ EFdA and 25 mg kg$^{-1}$ Dolutegravir every other day by IP injection for 4 weeks. At the time of ART initiation, HIV-infected mice were allocated into 3 groups. Treated mice (n=12) were infused with an HIV-resistant (C34-CXCR4+) Dual-CAR TCP consisting of $10^7$ total CAR T cells. Control mice were infused $10^7$ total CAR T cells from the HIV-resistant Dual-ΔGAR T cell product which expressed the defective CD3-ζ signaling domains (n=5) or no TCP (n=7). The mice were euthanized and tissues were harvested for analysis 7 weeks post-infection. For the study described in FIG. 15F, BLT humanized mice were challenged with 20,000 TCID$_{50}$HIV$_{BAL}$ via IP injection. 3 weeks post-HIV challenge all infected mice were administered ART consisting of 10 mg kg$^{-1}$ EFdA and 25 mg kg$^{-1}$ Dolutegravir every other day by IP injection for 2 weeks. At the time of ART initiation, HIV-infected mice were allocated into 2 groups. Treated mice (n=6) were infused with an HIV-resistant (C34-CXCR4+) Dual-CAR TCP consisting of $10^7$ total CAR T cells, or no TCP (n=6). On the third week, mice were administered ART every day until they were euthanized and tissues were harvested for analysis.

C34-CXCR4 Protection of CAR T Cells In Vivo:

In FIG. 14B, BLT humanized mice were challenged with 20,000 TCID$_{50}$HIV$_{JRCSF}$ via IP injection. 48 hours after challenge, mice were infused with the HIV-resistant (C34-CXCR4⁺) Dual-CAR T cell product consisting of $2\times10^7$ total CAR T cells. In one week intervals after challenge, mice were euthanized and tissues were collected at necropsy. Splenocytes were prepared and freshly sorted; isolated cells were used to quantify the amount of cell-associated HIV DNA harbored within C34-CXCR4⁺ and C34-CXCR4⁻ CAR T cells as described below.

In Vitro HIV Suppression Assay:

Two days after removing the anti-CD3/CD28 Dynabeads, primary CD4⁺ T cells were infected with CCR5-tropic $HIV_{JRCSF}$ at a multiplicity of infection of 1.0. 24 hours later, HIV-infected CD4⁺ T cells were washed with complete RPMI supplemented with 100 U mL⁻¹ IL-2 and mixed with CAR.ζ or control untransduced (UTD) T cells at effector-to-target (E:T) ratios of 1:12.5, 1:25, 1:50, 1:100 and 1:200. Cell mixtures were plated in triplicate and the spread of HIV replication was assessed by flow cytometry by sampling 100 µL per well for intracellular staining for HIV-1 Core Antigen at 2, 4 and 6 days post-coculture. Fresh media were added to all wells after staining.

HIV-Infected Cell Elimination Assay:

A similar HIV-infected target cell elimination assay was performed as described (Clayton, K. L., et al. Resistance of HIV-infected macrophages to CD8(+) T lymphocyte-mediated killing drives activation of the immune system. *Nat Immunol* 19, 475-486 (2018)). Briefly, HIV-infected CD4⁺ T cells were prepared as detailed above. When 30% of total T cells stained positive for HIV-1 Core Antigen the cells were labeled with CellTrace Violet (CTV) (ThermoFisher) to distinguish target cells from effector cells. CAR-ζ and UTD T cells were cultured with HIV-infected target cells at 0.25:1, 1:1 and 4:1 E:T ratios. After 24 hours, target cells were analyzed for the reduction of HIV-infected cells, and the induction of active Caspase-3 by intracellular staining and flow cytometry. Elimination of HIV-infected cells were measured by the quantitation of live (Fixable Viability Dye eFlour 780-negative) CTV⁺ p24⁺ target cells. The percentage of residual HIV-infected target cells were calculated by dividing the percentage of CTV⁺ p24⁺ target cells at the indicated E:T ratio by the percentage of CTV⁺ p24⁺ target cells at an E:T ratio of 0.

In Vitro Cytotoxicity, CD107a Degranulation and Cytokine Assays:

Functionality of CAR T cells was measured in vitro after stimulating $2\times10^5$ CAR-ζ or untransduced (UTD) T cells with $2\times10^5$ wild-type K562 cells or K562 cells transduced with the $HIV_{YU2}GP160$ (K.Env). Anti-CD107a antibody was added at the start of stimulation followed by the addition of 1× Brefeldin A and Monensin Solution (BioLegend) one hour later. Cells were incubated for a total of 6 hours at 37° C. Cytokine production was assessed by intracellular staining with antibodies specific for human IL-2, IFN-γ, MIP-1β, TNF and GM-CSF, while cytotoxic potential was measured by staining with antibodies specific for granzyme B and perforin. The percentage of cytokine-positive CAR T cells was calculated by correcting for background production of cytokines after stimulation with wild-type K562 cells.

Measurement of CAR T Cell Responses Ex Vivo:

Functionality of CAR T cells from HIV-infected BLT humanized mice was measured after ex vivo stimulation with K562 target cells. Mononuclear cells were isolated by density gradient centrifugation after preparing a single-cell suspension from tissues. Between $0.5-1\times10^6$ mononuclear cells were cultured with $2\times10^5$ K562.WT or K562.Env cells. The assessment of cytotoxic potential, degranulation and cytokine production was performed using the same protocol described above.

Cell-Associated HIV DNA Quantitation:

Mononuclear cell suspensions obtained from spleens were stained and sorted as described above. After sorting, samples were frozen as cell pellets and stored at −80° C. To obtain genomic DNA, cell pellets were thawed and total DNA was extracted using the QIAamp DNA Mini Kit (QIAGEN) per the manufacturer's protocol. Total HIV DNA was measured in each sample using a multiplexed droplet-digital PCR (ddPCR) assay specific for HIV gag and the human RPP30 gene. Gag forward and reverse amplification primer sequences were 5'-AGTGGGGGGACAT-CAAGCAGCCATGCAAAT (SEQ ID NO: 6) and 5'-TGC-TATGTCAGTTCCCCTTGGTTCTCT (SEQ ID NO: 7), respectively. Gag sequence was detected using a 5' HEX-labeled hydrolysis probe (HEX-CCATCAATGAG-GAAGCTGCAGAATGGGA (SEQ ID NO: 8)). RPP30 forward and reverse amplification primer sequences were 5'-GATTTGGACCTGCGAGCG (SEQ ID NO: 9) and 5'-GCGGCTGTCTCCACAAGT (SEQ ID NO: 10), respectively. Human RPP30 sequence was detected with a 5' 6-FAM-labeled hydrolysis probe (6-FAM-CTGACCT-GAAGGCTCT (SEQ ID NO: 11)). The RPP30 primer/probe set has been described previously (Hindson, B. J., et al. High-throughput droplet digital PCR system for absolute quantitation of DNA copy number. *Anal Chem* 83, 8604-8610 (2011)). ddPCR reactions were performed using the manufacturer recommended consumables and the ddPCR supermix for probes (No UTP) (Bio-Rad). Thermal cycling conditions are as follows: 1 cycle of 95° C. for 10 minutes, 45 cycles of 94° C. for 30 seconds followed by 60° C. for 1 minute, 1 cycle of 98 C for 10 minutes. Droplets were generated using a QX100 droplet generator and subsequently analyzed on a QX200 droplet reader (Bio-Rad). All samples were run in duplicate, and positive droplets were added from replicates for final measurements.

Viral Replication Capacity Assay:

In vitro replication assays were performed essentially as previously described (Deymier, M. J., et al. Heterosexual Transmission of Subtype C HIV-1 Selects Consensus-Like Variants without Increased Replicative Capacity or Interferon-alpha Resistance. *PLoS Pathog* 11, e1005154 (2015)). Human PBMCs were isolated from whole blood by density gradient centrifugation using Histopaque-1077 (Sigma). PBMCs were stimulated with 3 µg mL⁻¹ PHA in complete RPMI supplemented with 20 U mL⁻¹ of recombinant human IL-2 at a concentration of $1\times10^6$ cells mL⁻¹. After 72 hours of stimulation, PBMCs were washed twice with complete RPMI, and resuspended in complete RPMI supplemented with 50 U mL⁻¹ IL-2 at a concentration of $5\times10^6$ cells mL⁻¹. Cells were infected by combining 1000 $TCID_{50}$ $HIV_{JRCSF}$ or $HIV_{MJ4}$ with $5\times10^5$ cells and a final concentration of 5 µg mL⁻¹ polybrene in 200 µL total volume. Cells were infected by spinoculuation at 1200 rpm and 25° C. for 2 hours. Cells were then washed 5 times to remove excess virus, and plated in 500 µL of complete RPMI supplemented with 50 U mL⁻¹ IL-2 in a 48-well plate. Infections were incubated at 37° C. and 5% $CO_2$, and 50 µL of media was removed every 2 days and frozen. Gag p24 levels were measured in the supernatant using the Alliance HIV-1 p24 antigen ELISA kit per the manufacturer's instructions (Perkin Elmer). All infections were carried out in triplicate.

Statistical Analysis:

All statistical analysis was performed using JMP Pro, version 12 (SAS Institute Inc., Cary, NC) and GraphPad Prism, version 7 (San Diego, CA). All bivariate continuous correlations were performed using Spearman's rank correlation. One-way comparison of means from unmatched samples was performed using the Wilcoxon rank sum test, comparison of means from matched samples was performed using Wilcoxon matched pairs signed rank test. Kaplan-Meier survival curves were performed using an endpoint defined as the limit of detection of the viral load quantification assay (1.81 log RNA copies $mL^{-1}$), and statistics are generated from the log-rank test. K-means clustering was performed using the JMP Pro version 12 statistical package to generate principal component plots with circles denoting where 90% of the observations would fall. Area under the curve calculations were performed in GraphPad Prism version 7 using cell concentration data normalized to one microliter of blood.

The results of the experiments are now described.

Figure 10A:
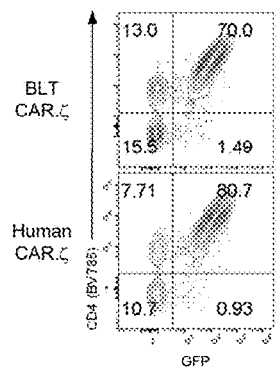
FIGS. 10A-10H: BLT mouse-derived HIV-specific CAR T cells are functionally indistinguishable from human-derived CAR T cells in vitro. Purified human T cells from a BLT mouse and PBMCs from a healthy human donor were activated with aCD3/CD28 Dynabeads and transduced with the HIV-specific (CD4-based) CAR.ζ construct co-expressing GFP.
Figure 10B:
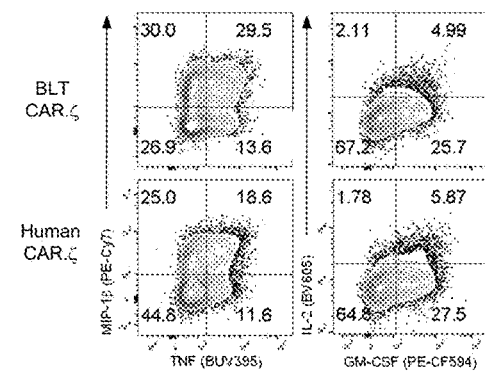
Figure 10C:
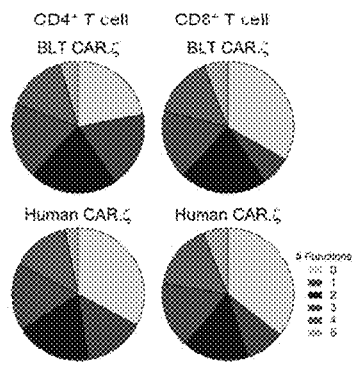
Figure 10D:
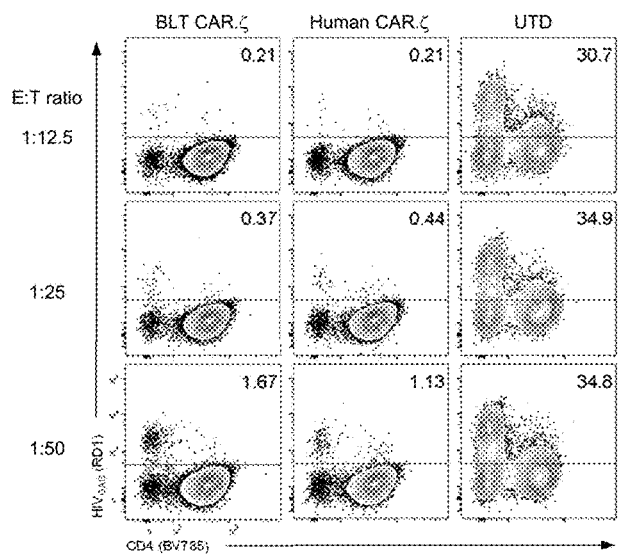
Figure 10E:
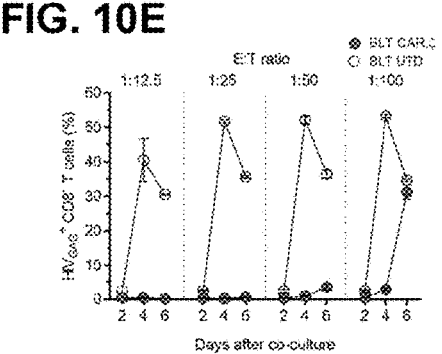
Figure 10F:
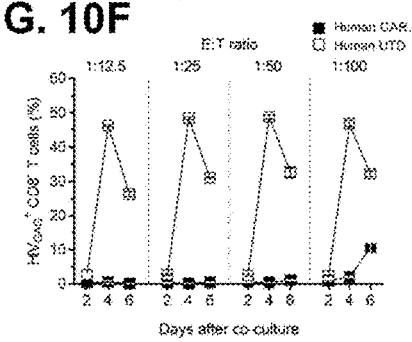
Figure 10G:
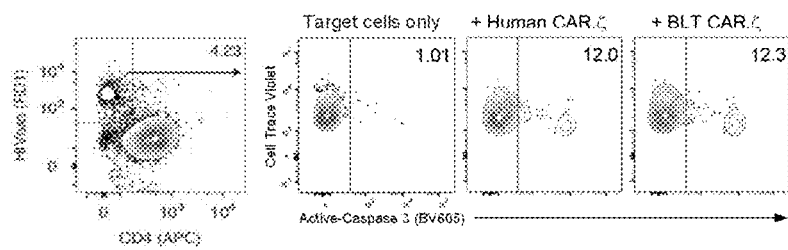
Figure 10H:
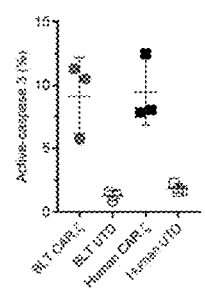
Figure 12L:
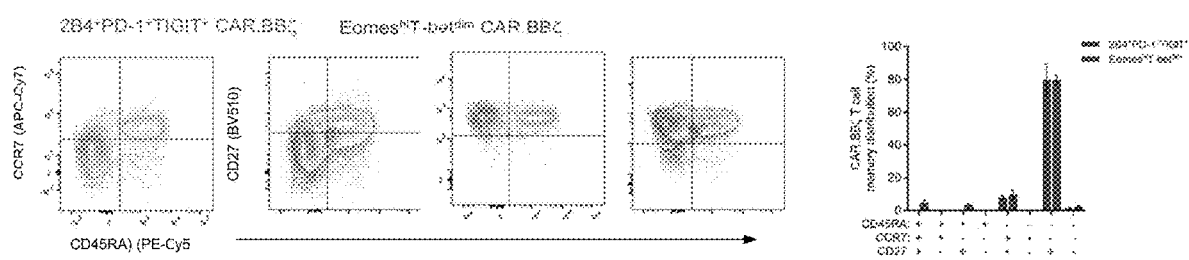
Figure 16H:
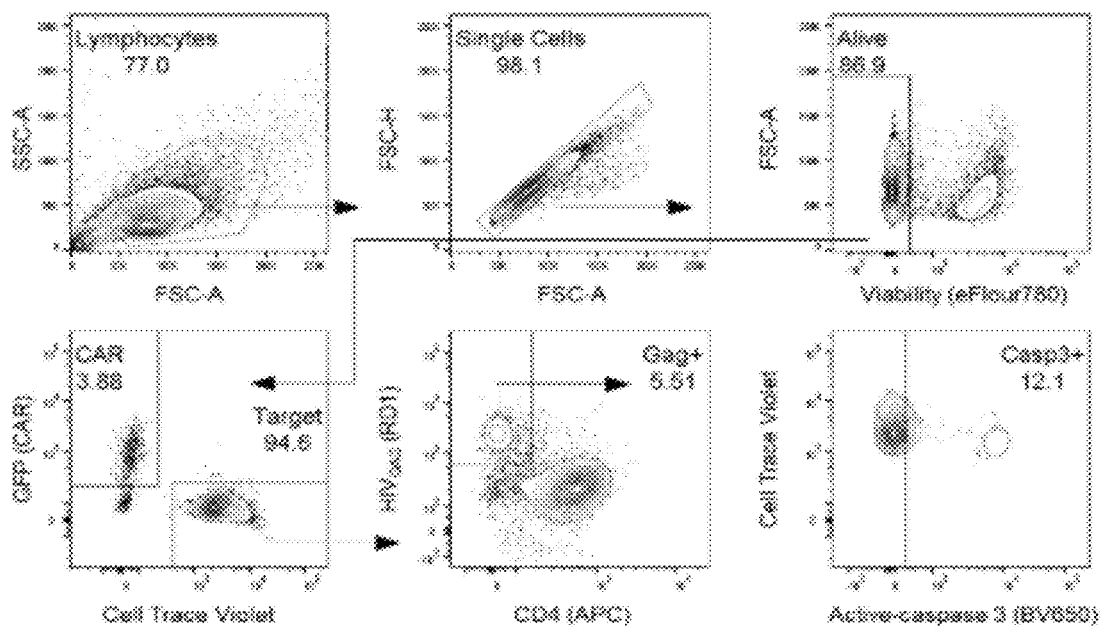

BLT Mouse-Derived CAR T Cells are Multifunctional and Suppress HIV Replication In Vitro To determine whether T cells isolated from BLT mice generate potent CAR T cell products, HIV-specific (CD4-based) CAR T cells expressing the CD3-ζ endodomain (CAR.ζ) from BLT mouse tissues and adult human PBMCs were manufactured using a process similar to one being used in clinical trials (FIG. 16A) (Wang, X. & Riviere, I. Clinical manufacturing of CAR T cells: foundation of a promising therapy. Mol Ther Oncolytics 3, 16015 (2016); Fesnak, A. D., June, C. H. & Levine, B. L. Engineered T cells: the promise and challenges of cancer immunotherapy. Nat Rev Cancer 16, 566-581 (2016)). BLT mouse- and human-derived CAR.ζ T cells exhibited comparable in vitro expansion kinetics and CAR surface expression levels (FIG. 16B and FIG. 10A). Antigen-specific stimulation with K562 cells expressing $HIV_{YU2}GP160$ (K.Env) induced similar cytokine expression and polyfunctionality profiles between the CAR T cell sources (FIGS. 10B-10C and FIGS. 16C-16E). Furthermore, CAR.ζ T cells from both donors suppressed viral outgrowth down to a 1:50 effector-to-target ratio in vitro (FIGS. 10D-10F), and induced similar levels of cleaved caspase 3 in HIV-infected $CD4^+$ T cells (FIGS. 10G-10H). This combined with the upregulation of granzyme B and perforin indicate that suppression of virus replication likely occurred via granule-mediated cytolysis (FIGS. 16F-16G). In total, the in vitro functional profile of BLT mouse-derived CAR.ζ T cells was indistinguishable from that of human-derived CAR.ζ T cells, demonstrating that highly functional engineered CAR T cells can be manufactured from BLT mice.

Costimulation Modulates CAR T Cell Persistence and Function In Vivo

Figure 17:
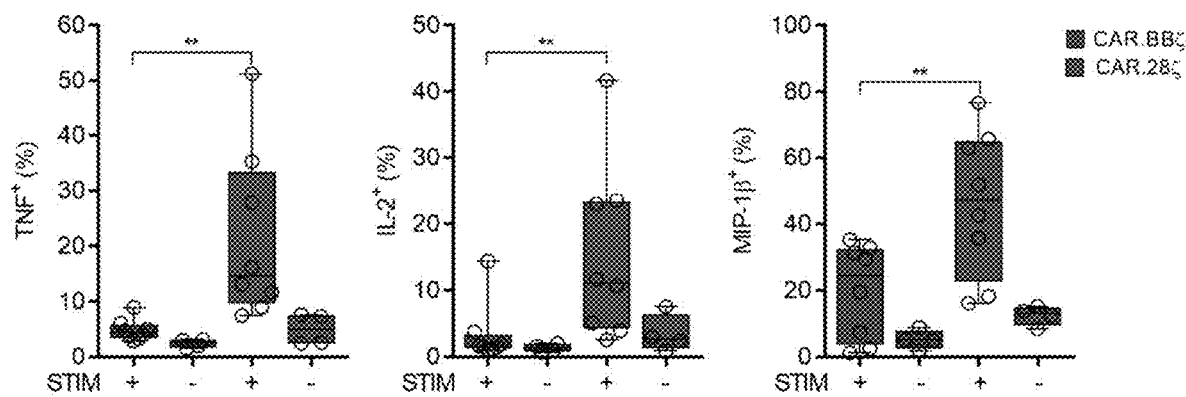
FIG. 17: CD28 costimulation enhances the effector function of CAR T cells ex vivo. HIV uninfected BLT mice were infused with an equal mixture of HIV-specific (CD4-based) CAR T cells expressing either CD3-ζ, 4-1BB/CD3-ζ (red) and CD28/CD3-ζ costimulatory domains linked to unique fluorescent proteins to facilitate identification in vivo as described in FIGS. 11A-11J. Cumulative data indicating the frequency of TNF$^+$, IL-2$^+$ and MIP-1β$^+$ CAR.BBζ and CAR.28ζ T cells within the same mice after ex vivo stimulation with K.Env (stim) or wild-type K562 (unstim) cells. Data represents the aggregate of cytokine producing cells from liver and terminal blood (n=8). CAR.ζ T cells were too infrequent for analysis. Data shows box and whisker plots and bars indicate min and max values. Significance was calculated using Wilcoxon matched-pairs signed rank test (**P<0.01).
Figure 18A:
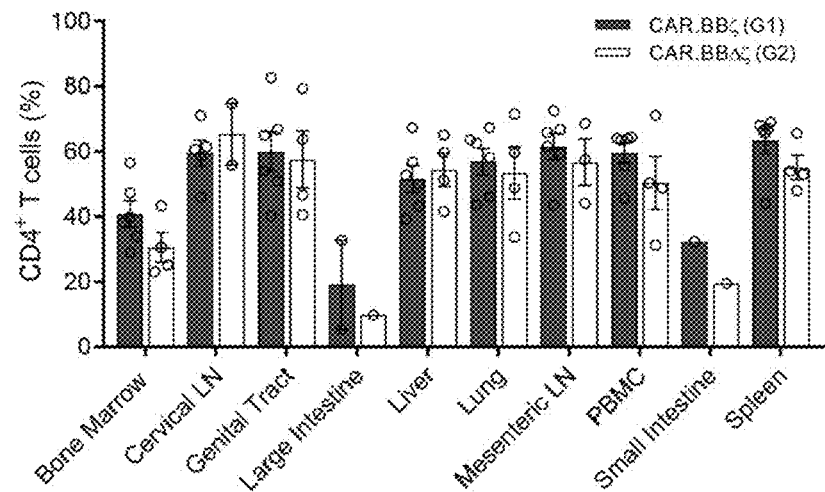
Figure 18B:
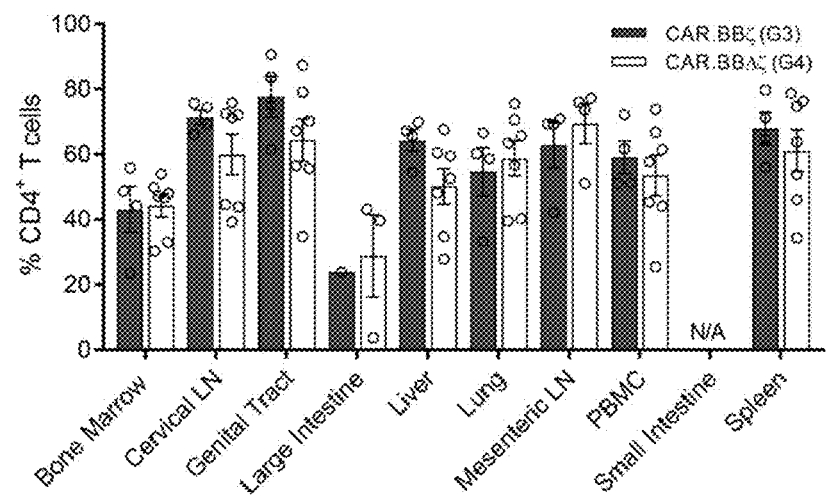

The generation of an effective cell-mediated immune response against HIV requires the long-term persistence of functional T cells (Riley, J. L. & Montaner, L. J. Cell-Mediated Immunity to Target the Persistent Human Immunodeficiency Virus Reservoir. J Infect Dis 215, S160-S171 (2017); Walker, B. & McMichael, A. The T-cell response to HIV. Cold Spring Harb Perspect Med 2(2012)). To this end, we compared the contribution of costimulatory domains to in vivo engraftment of T cells by creating an infusion product comprising equal frequencies of HIV-specific CD3-ζ (ζ), 4-1BB/CD3-ζ (BBζ), and CD28/CD3-ζ (28ζ) CAR T cells, each of which was linked to a distinct fluorescent protein (FIG. 11A). After infusion, CAR.BBζ T cells exhibited significantly greater survival in the absence of HIV antigen (FIGS. 11A-11C), and constituted approximately 80% of total CAR T cells across numerous tissues (FIG. 11D). Consistent with reports from the cancer field, CAR.BBζ T cells also demonstrated superior in vivo antigen-driven proliferation upon infusion of irradiated K.Env target cells (FIG. 11E) (Carpenito, C., et al. Control of large, established tumor xenografts with genetically retargeted human T cells containing CD28 and CD137 domains. Proc Natl Acad Sci USA 106, 3360-3365 (2009); Milone, M. C., et al. Chimeric receptors containing CD137 signal transduction domains mediate enhanced survival of T cells and increased antileukemic efficacy in vivo. Mol Ther 17, 1453-1464 (2009); Cheng, Z., et al. In Vivo Expansion and Antitumor Activity of Coinfused CD28- and 4-1BB-Engineered CAR-T Cells in Patients with B Cell Leukemia. Mol Ther 26, 976-985 (2018); Quintarelli, C., et al. Choice of costimulatory domains and of cytokines determines CAR T-cell activity in neuroblastoma. Oncoimmunology 7, e1433518 (2018)). In contrast, CAR.28ζ T cells only exhibited a transient expansion followed by a progressive decline, and CAR.ζ T cells were seemingly non-responsive. Notably, however, CAR.28ζ T cells exhibited greater effector ex vivo functions, upregulating more MIP-1β, TNF and IL-2, and co-expressing greater levels of granzyme B and perforin than CAR.BBζ T cells from the same mice (FIGS. 11F-11G and FIG. 17). Finally, we confirmed the in vivo cytotoxic potential of BLT mouse-derived CAR T cells by infusing CD19-specific CAR.BBζ T cells into recipient mice. We observed rapid and profound B cell aplasia in the blood (FIG. 11H) with significant clearance of B cells from the spleen, lung, liver, and bone marrow, consistent with a sustained cytotoxic CAR T cell response (FIG. 11I, FIG. 11J). Together, these data demonstrate the suitability of BLT mice for studying in vivo CAR T cell function, and the degree to which costimulation can differentially modulate CAR T cell activity.

CAR.BBζ T Cells Fail to Control HIV Rebound Upon ART Discontinuation

After determining that the 4-1BB/CD3-ζ endodomain confers superior in vivo antigen-driven CAR T cell expansion and persistence, we set out to test the therapeutic potential of CAR.BBζ T cells in the context of ART-suppressed HIV infection. To do so, we infected BLT mice with CCR5-tropic $HIV_{JRCSF}$ and after 3 weeks initiated combination ART. Two weeks later ART-suppressed mice were allocated into groups that received an infusion of either active CAR.BBζ T cells (G1 and G3), or inactive control CAR.BBΔζ T cells (G2 and G4), which express a truncated CD3-ζ chain. In G1 and G2, ART was ceased immediately after infusion, whereas in G3 and G4 ART was continued for an additional 3 weeks to test whether the timing of ART cessation impacted the efficacy of CAR T cell therapy. In all groups, HIV rebounded within 2 weeks after treatment interruption, regardless of timing, and there were no observable differences in the kinetics or magnitude of viremia in CAR.BBζ-treated mice compared to matched control mice (FIG. 12A). Moreover, CAR.BBζ T cell therapy did not prevent memory $CD4^+$ T cell loss in peripheral blood or tissues (FIGS. 12B-12C and FIGS. 18A-18B), which in BLT mice represent the $CD4^+$ T cell subset preferentially infected and depleted by HIV due to high levels of CCR5 expression (FIGS. 19A-19B). Together, these data indicate that CAR.BBζ T cell therapy did not impact HIV progression.

CAR.BBζ T Cells Display Features of T Cell Exhaustion During Uncontrolled HIV Replication Despite the lack of efficacy following ART discontinuation, we observed profound CAR.BBζ T cell expansion during viral recrudescence with a median 75-fold increase (range 1.56-344 fold) in the blood (FIGS. 12D-12E). As expected, the inactive control T cells did not expand in response to viral rebound (FIGS. 12D-12E), and the CAR.BBζ T cells were substantially more abundant throughout the body 12 weeks after infusion (FIG. 12F). These findings suggested that the inability of CAR.BBζ T cells to control viremia and HIV pathogenesis was not the result of poor proliferation, persistence, or lack of migration to relevant anatomical compartments of virus replication (Boritz, E. A., et al. Multiple Origins of Virus Persistence during Natural Control of HIV Infection. *Cell* 166, 1004-1015 (2016); Estes, J. D., et al. Defining total-body AIDS-virus burden with implications for curative strategies. *Nat Med* 23, 1271-1276 (2017); Ventura, J. D., et al. Longitudinal bioluminescent imaging of HIV-1 infection during antiretroviral therapy and treatment interruption in humanized mice. *PLoS Pathog* 15, e1008161 (2019); Rabezanahary, H., et al. Despite early antiretroviral therapy effector memory and follicular helper CD4 T cells are major reservoirs in visceral lymphoid tissues of SIV-infected macaques. *Mucosal Immunol* 13, 149-160 (2020)).

Figure 20A:
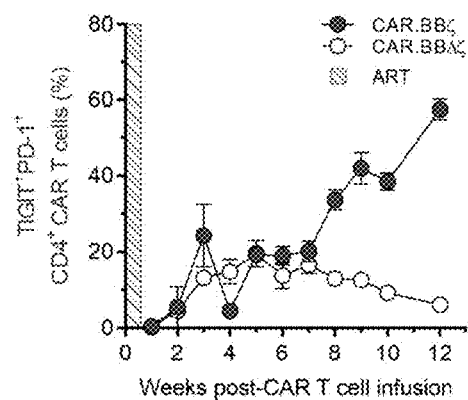
FIGS. 20A-20F: CAR.BBζ T cells accumulate multiple inhibitory receptors as disease progresses.
Figure 20B:
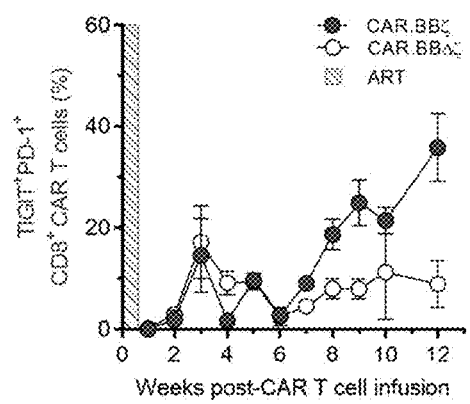
Figure 20C:
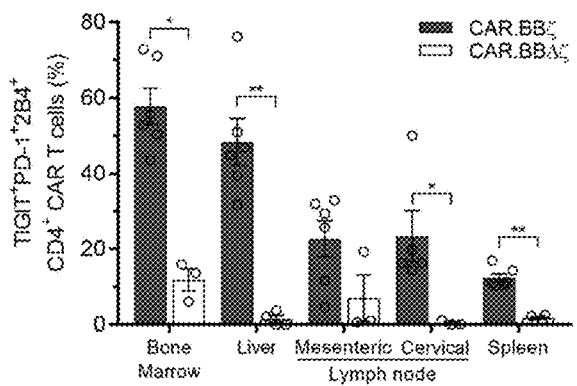
Figure 20D:
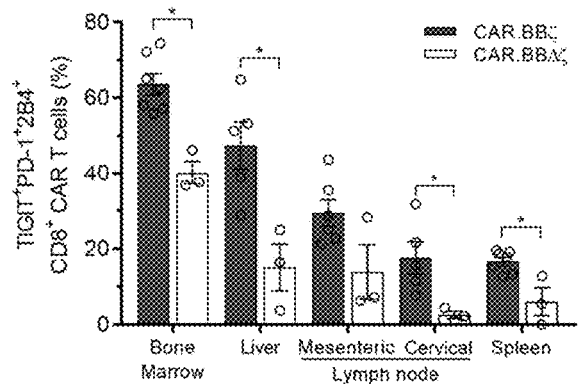
Figure 20E:
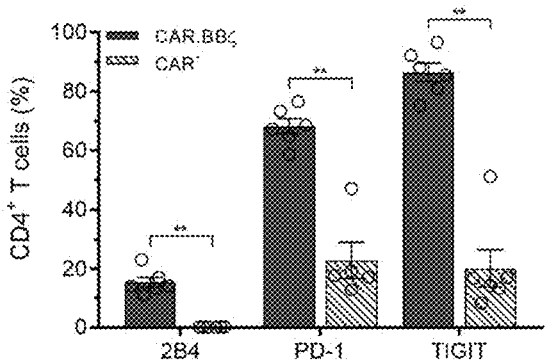
Figure 20F:
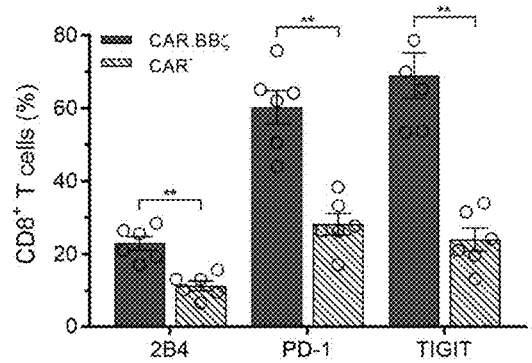
Figure 21A:
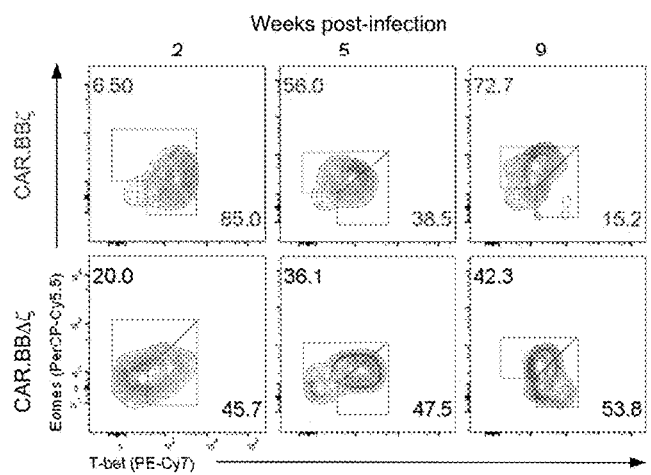
FIGS. 21A-21B: Eomes$^{hi}$T-bet$^{dim}$ CAR.BBz T cells accumulate from acute to chronic phases of infection. BLT mice were infected with HIV$_{JRCSF}$ and infused 48 hours later with either 2×10$^7$ active CAR.BBζ T cells (red; n=5) or inactive control CAR.BBΔζ T cells (white; n=3).
Figure 21B:
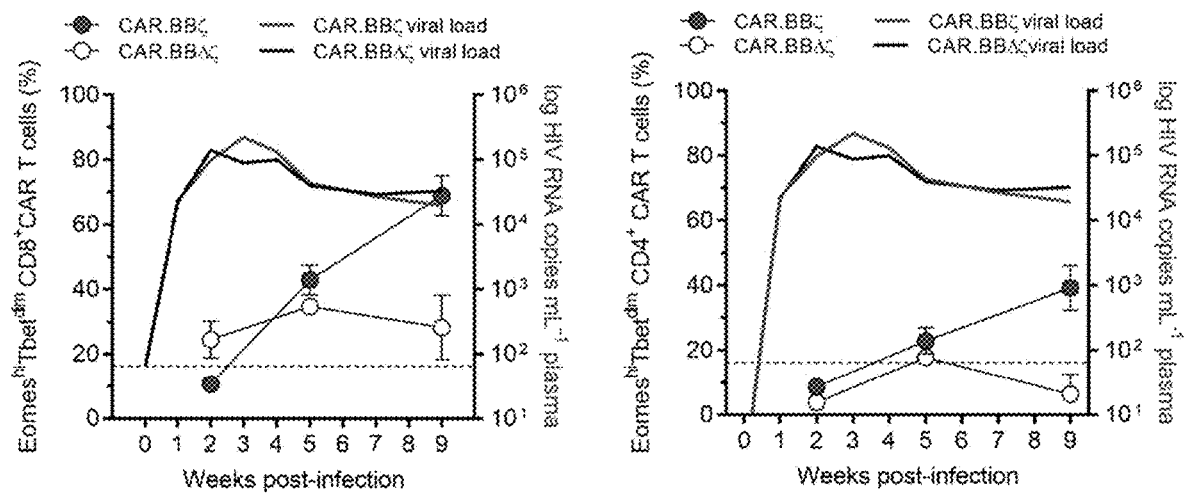

The proliferation of CAR.BBζ T cells was associated with upregulation of inhibitory receptors including PD-1, TIGIT, and 2B4, which increased over time (FIG. 12G and FIGS. 20A-20D). Importantly, these inhibitory receptors were not expressed to the same extent on endogenous CAR⁻ T cells within the same mice, suggesting a CAR T cell-specific effect rather than generalized T cell activation from inflammation or viral load (FIGS. 20E-20F). Notably, elevated inhibitory receptor expression on CAR.BBζ T cells from chronically infected BLT mice was associated with the expression of TOX (FIGS. 12H-12I), a transcription factor that regulates the T cell exhaustion program linked to disease settings (Alfei, F., et al. TOX reinforces the phenotype and longevity of exhausted T cells in chronic viral infection. *Nature* 571, 265-269 (2019); Khan, O., et al. TOX transcriptionally and epigenetically programs CD8(+) T cell exhaustion. *Nature* 571, 211-218 (2019); Scott, A. C., et al. TOX is a critical regulator of tumour-specific T cell differentiation. *Nature* 571, 270-274 (2019); Seo, H., et al. TOX and TOX2 transcription factors cooperate with NR4A transcription factors to impose CD8(+) T cell exhaustion. *Proc Natl Acad Sci USA* 116, 12410-12415 (2019); Yao, C., et al. Single-cell RNA-seq reveals TOX as a key regulator of CD8(+) T cell persistence in chronic infection. *Nat Immunol* 20, 890-901 (2019)). Further supporting the gradual emergence of a dysfunctional CAR T cell phenotype, T-bet expression in CAR.BBζ T cells waned as HIV infection progressed culminating in a population of Eomes$^{hi}$T-bet$^{dim}$ CAR T cells enriched in TOX expression (FIGS. 12J-12K and FIGS. 21A-21B). In addition, expression of multiple inhibitory receptors on CAR.BBζ T cells from chronic infection was linked to a transitional memory state displaying an Eomes$^{hi}$T-bet$^{dim}$ phenotype (FIG. 12L), all of which is congruent with prior studies identifying dysfunctional HIV-specific CD8⁺ T cells within this compartment in chronic human HIV infection (Appay, V., et al. Memory CD8+ T cells vary in differentiation phenotype in different persistent virus infections. *Nat Med* 8, 379-385 (2002); Buggert, M., et al. T-bet and Eomes are differentially linked to the exhausted phenotype of CD8+ T cells in HIV infection. *PLoS Pathog* 10, e1004251 (2014)).

Figure 22A:
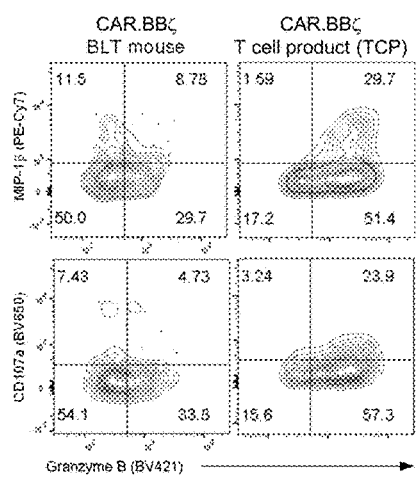
FIGS. 22A-22B: CAR.BBζ T cells from chronic infection exhibit attenuated cytotoxic potential relative to the pre-infusion CAR T cell product. CAR.BBζ T cells (n=14) and control CAR.BBΔζ T cells (n=10) were isolated from the livers of chronically infected mice 12 weeks after infusion, and the pre-infusion CAR.BBζ T cell product (TCP) were stimulated ex vivo with K.Env and wild-type K562 cells.
Figure 22B:
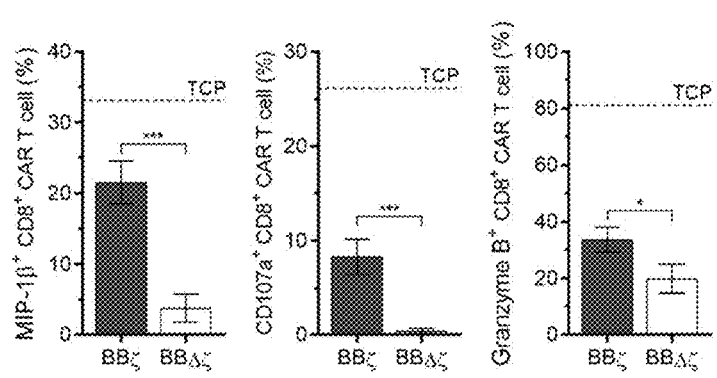

Finally, the ex vivo functional capacity of CAR.BBζ T cells isolated during chronic infection was compared to the pre-infusion CAR T cell product (TCP) and demonstrated that although the CD8⁺ CAR.BBζ T cells from chronic infection retained the ability to express MIP-1β and granzyme B, and degranulate based on CD107a staining, the degree of β-chemokine production and cytotoxic potential was attenuated (FIGS. 22A-22B). Taken together, these data indicate that CAR.BBζ T cells recognize HIV-infected cells, rapidly expand and upregulate markers of cellular activation, but that uncontrolled virus replication ultimately drives an exhaustion program that may attenuate T cell function and subvert efficacy.

Figure 13A:
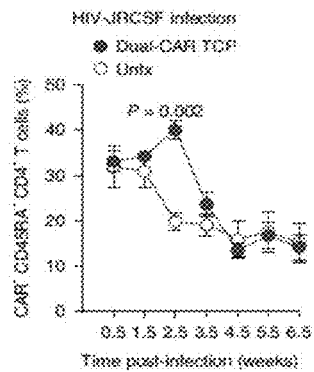
FIGS. 13A-13Q: Dual-CAR T cell product mitigates CD4$^+$ T cell loss during acute HIV infection. Mice were challenged with HIV$_{JRCSF}$ (n=12) or HIV$_{MJ4}$ (n=12) and 48 hours later 6 mice from each group were infused with either Dual-CAR T cell product (TCP; green) or no TCP (white). Dual-CAR TCP comprises CAR.BBζ, CAR.28ζ and Dual-CAR (BBζ.28ζ) T cells.
Figure 13B:
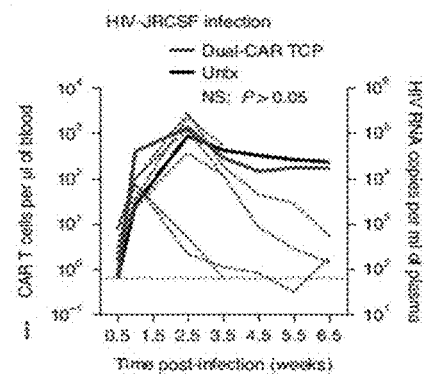
FIGS. 13B and 13D: Concentration of total peripheral CAR T cells in individual mice (green dotted) and group average (green solid) (left y-axis) and mean log plasma viral RNA (copies mL$^{-1}$, black) (right y-axis). Thin dotted line denotes limit of quantification.
Figure 13C:
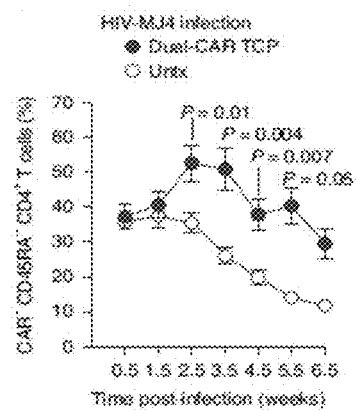
Figure 13D:
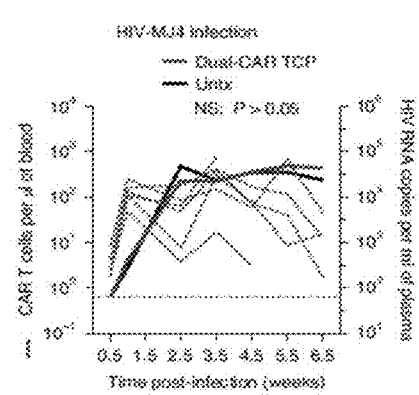
Figure 23A:
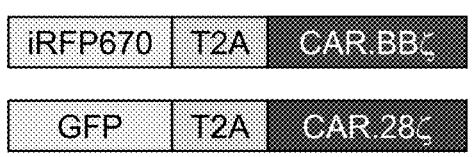
FIGS. 23A-23C: Co-transduction with CAR.BBζ and CAR.28ζ lentivirus yields novel a HIV-specific Dual-CAR T cell product with enhanced function in vitro.
Figure 23B:
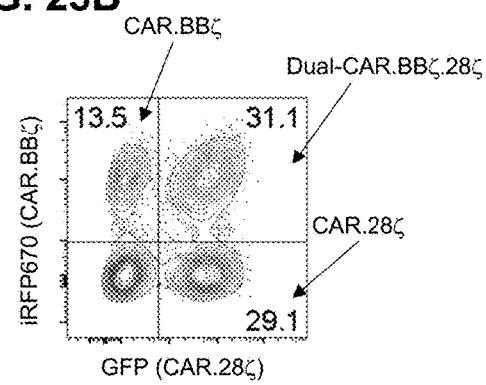
Figure 23C:
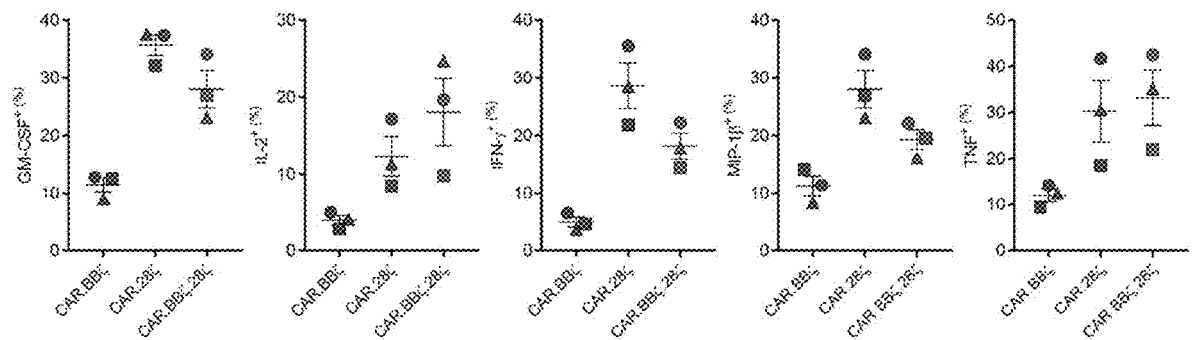
Figure 24A:
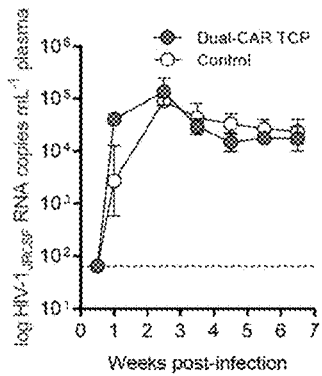
FIGS. 24A-24C: Dual-CAR T cell product transiently delays CD4$^+$ T cell loss despite persistent HIV$_{JRCSF}$ infection. BLT mice received Dual-CAR T cell product (TCP) (green; n=6) 48 hours after HIV$_{JRCSF}$ challenge, while control mice received no TCP (white; n=6).
Figure 24B:
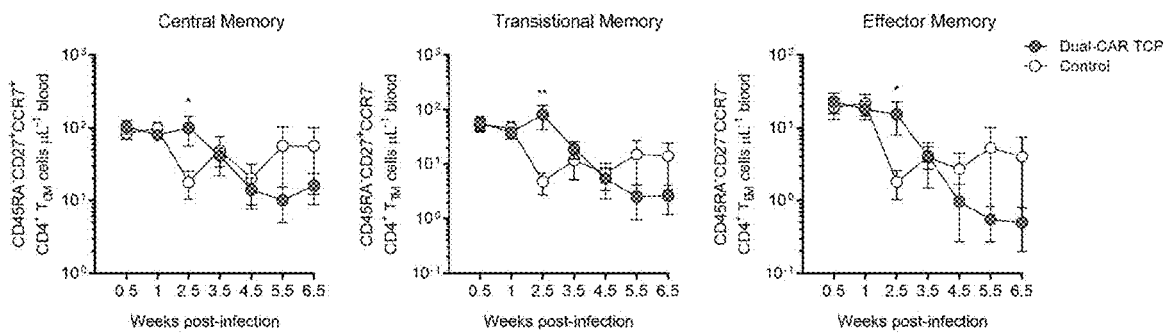

Augmented HIV-Specific CAR T Cell Product Reduces CD4⁺ T Cell Loss During Acute Infection It was hypothesized that combining the superior in vivo expansion and persistence of CAR.BBζ T cells with enhanced effector function could provide the necessary improvement to control HIV replication. To this end, CAR.BBζ T cells were co-transduced with the CD4-based CD28-costimulated CAR that exhibited notable effector function (as shown in FIG. 17) to create a novel dual-transduced CAR (Dual-CAR) TCP. Due to co-transduction probabilities, the Dual-CAR TCP comprises three populations: CAR.BBζ, CAR.28ζ and Dual-CAR (BBζ.28ζ)T cells, the latter of which independently expresses both CARs (FIGS. 23A-23B), which was hypothesized to combine the pro-survival attributes of 4-1BB with the effector functions of CD28 costimulation. Indeed, inclusion of the CD28-costimulated CAR increased cytokine production of Dual-CAR.BBζ.28ζ T cells over 4-1BB-costimulated CAR T cells in vitro (FIG. 23C). To evaluate the Dual-CAR TCP in vivo, we used an acute infection model in which BLT mice received a CAR T cell infusion 48 hours after HIV$_{JRCSF}$ challenge. This approach simulates the previous ART cessation model where CAR T cells are present only after infection is established, but plasma viremia is undetectable, and this provides a rapid model to test therapeutic efficacy. Although we observed no differences in acute viremia between the Dual-CAR TCP-treated and control groups (FIG. 24A), CAR T cell-treated mice exhibited a significant, albeit transient delay in the loss of circulating memory (CD45RA⁻) CD4⁺ T cells, which coincided with peak expansion of total CAR T cells in peripheral blood (FIGS. 13A-13B). Notably, this delay in CD4⁺ T cell loss was observed in central, transitional, and effector memory subsets (FIG. 24B), an effect that was not observed after ART discontinuation in the CAR.BBζ-treated mice in the prior study (FIGS. 12B-12C).

Figures 13E, 13F:
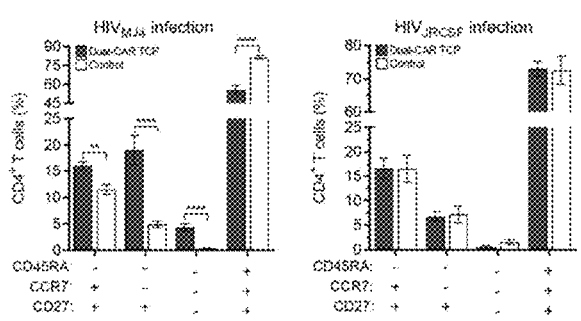
FIG. 13E: Frequency of CD4$^+$ T cell subsets in tissue from HIV$_{MJ4}$
- and FIG. 13F: HIV$_{JRCSF}$-infected mice 8 weeks after CAR T cell infusion.
Figure 13G:
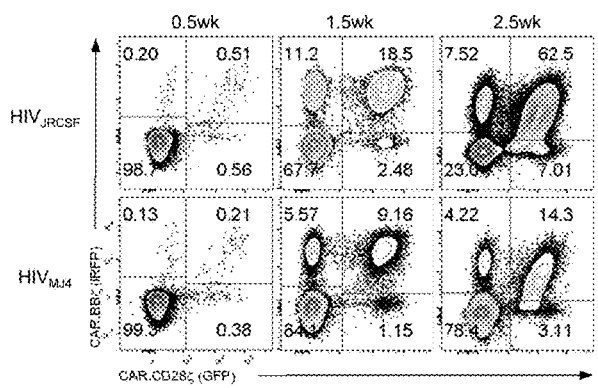
FIG. 13G: Per mouse longitudinal frequency of each of the CAR T cell types present in the Dual-CAR TCP.
Figure 24C:
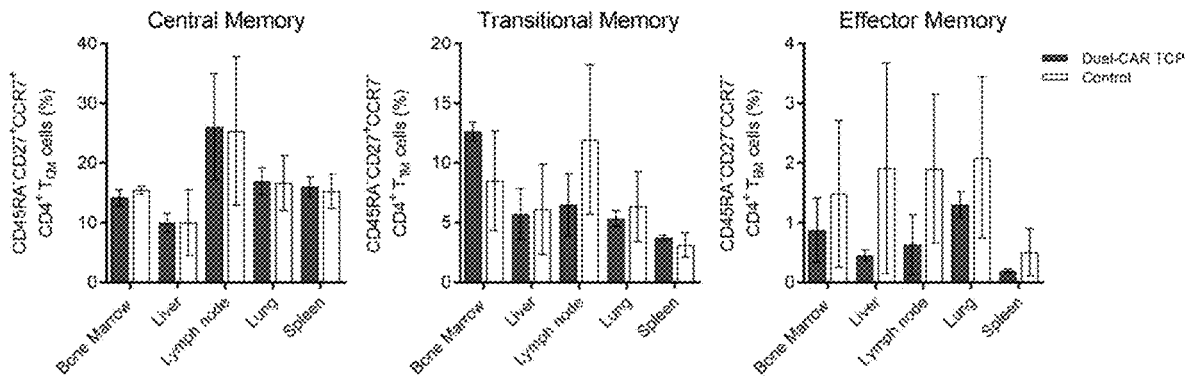
Figure 25A:
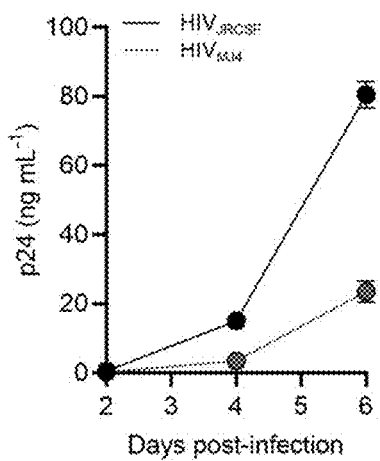
FIGS. 25A-25B: HIV$_{JRCSF}$ and HIV$_{MJ4}$ exhibit different replication kinetics in vitro and in vivo.
Figure 25B:
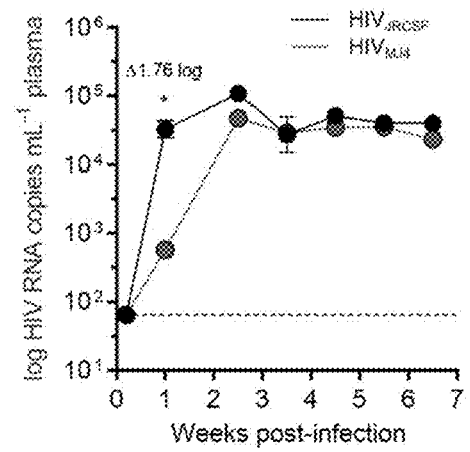
Figure 26A:
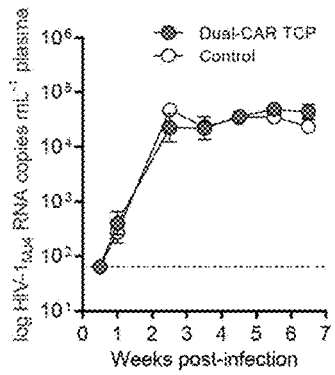
FIGS. 26A-26C: Dual-CAR T cell product prevents CD4$^+$ T cell loss despite persistent HIV$_{MJ4}$ infection. BLT mice were infused with Dual-CAR T cell product (TCP) (green; n=6) 48 hours after HIV$_{MJ4}$ challenge, while control mice received no TCP (white; n=6).
Figure 26B:
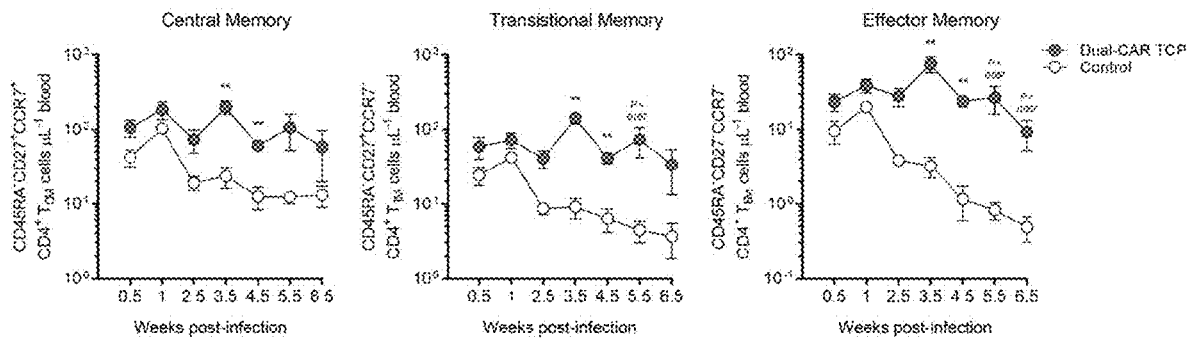
Figure 26C:
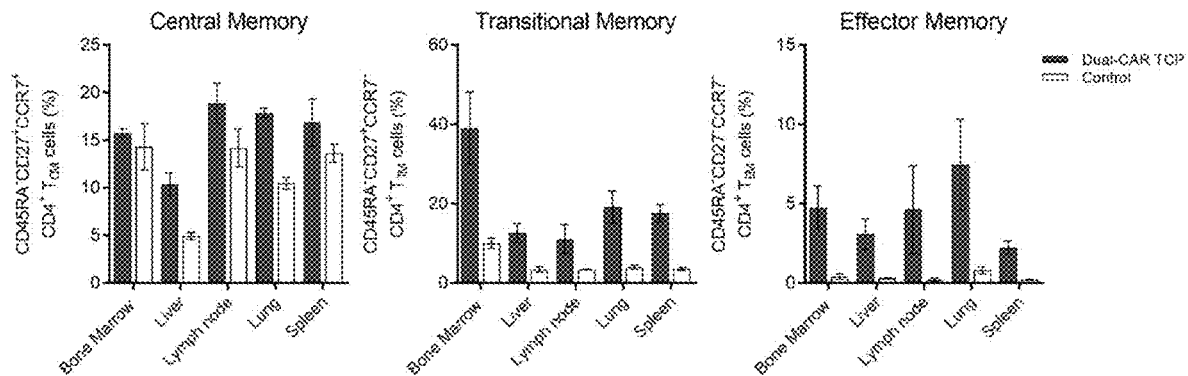

The efficacy of the Dual-CAR TCP was next assessed in the context of a more physiologically relevant strain of HIV. To do so, additional mice from the same cohort as above were infected with HIV$_{MJ4}$, which exhibits slower acute phase replication kinetics than HIV$_{JRCSF}$, but ultimately achieves equivalent set-point viremia (FIGS. 25A-25B). Although the infusion of CAR T cells 48 hours post-infection, again, did not alter viremia (FIG. 26A), more profound CD4⁺ T cell preservation and maintenance of the Dual-CAR TCP in peripheral blood as compared to the CAR T cell-treated mice infected with HIV$_{JRCSF}$ (FIGS. 13C-13D) were now observed. The preservation of CD4⁺ T cells was particularly accentuated in transitional and effector memory populations, which express greater levels of the HIV coreceptor CCR5 (FIG. 26B). Similarly, the percentage of all memory CD4⁺ T cell subsets in the tissues at necropsy were substantially preserved in Dual-CAR TCP-treated compared to control HIV$_{MJ4}$-infected mice (FIG. 13E and FIG. 26C), whereas there was no difference between CAR T cell-treated and control HIV$_{JRCSF}$-infected mice (FIG. 13F and FIG. 24C). These data demonstrate that treatment with the Dual-CAR TCP can effectively limit HIV-induced depletion of memory CD4⁺ T cells and that this effect is modulated by the pathogenicity of the infecting virus.

Figure 13H:
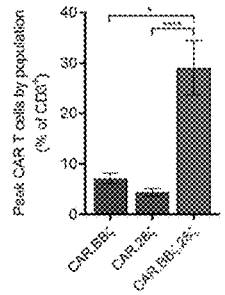
FIG. 13H: Peak peripheral CAR T cell frequency (of total huCD3$^+$ cells)
Figure 13I:
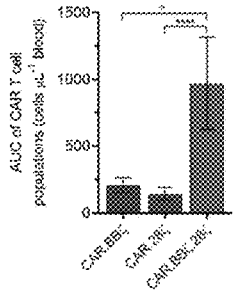
FIG. 13I: cumulative CAR T cell persistence.
Figure 13J:
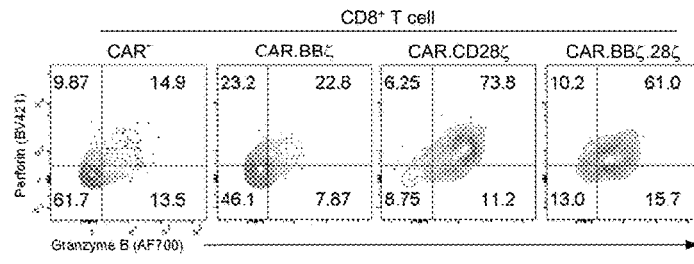
FIG. 13J: Representative FACS plots
Figure 13K:
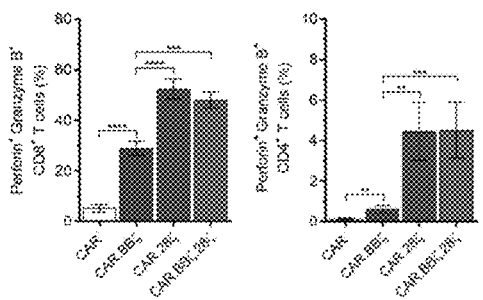
FIG. 13K: cumulative tissue data showing frequency of granzyme B$^+$ and perforin CD8$^+$ and CD4+ CAR T cells in HIV$_{JRCSF}$-infected mice.
Figure 13L:
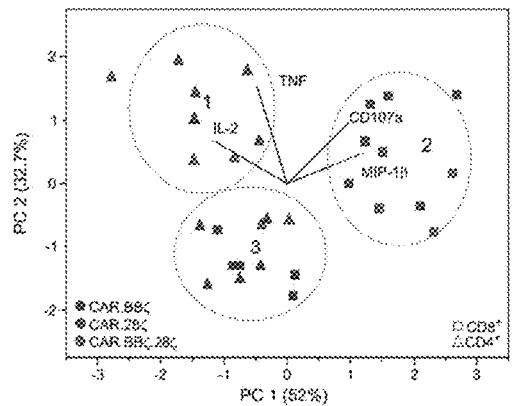
FIG. 13L: Principle Components Analysis (PCA) of IL-2, TNF, MIP-1β, and CD107a expression in individual ex vivo stimulated CD8+ and CD4+ CAR T cells from HIV$_{JRCSF}$-infected mice.
Figure 13M:
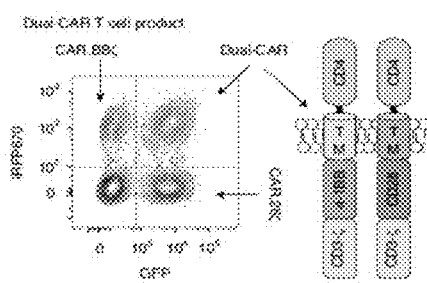
FIG. 13M: Dual-CAR TCP comprises CAR.BBζ, CAR.28ζ and Dual-CAR T cells.
Figure 13N:
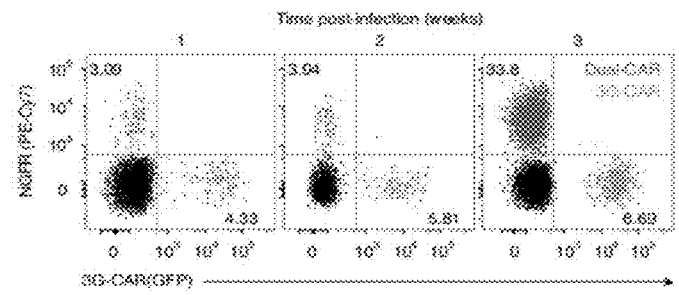
FIG. 13N: Overlaid FACS plots showing frequency of peripheral Dual-CAR (iRFP670+ NGFR+) and 3G-CAR (GFP+) T cells within the same mouse.
Figure 13O:
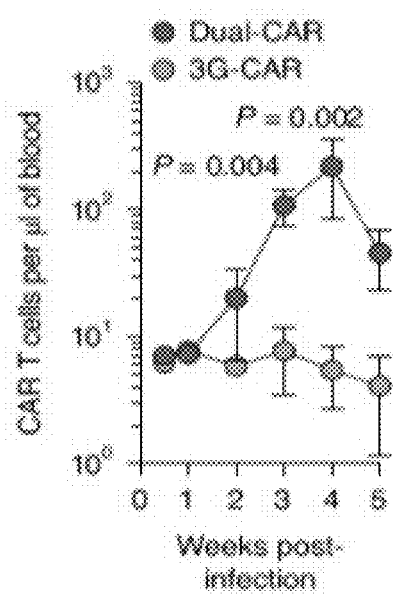
FIG. 13O: Concentration of peripheral CAR T cells.
Figure 13P:
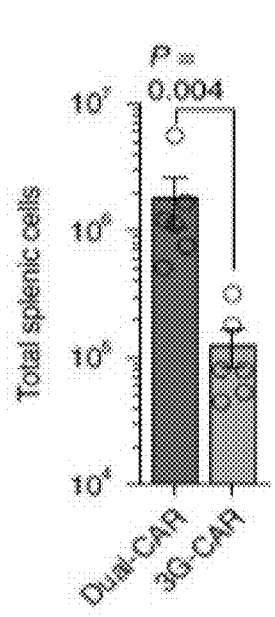
Figure 13Q:
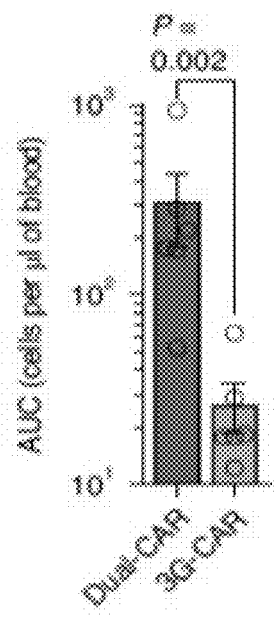
Figure 27A:
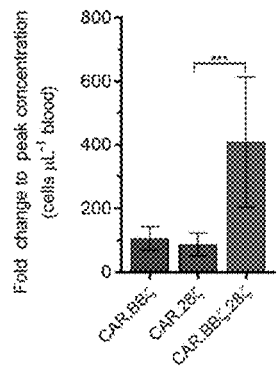
FIGS. 27A-27C: Dual-CAR (BBζ.28ζ) T cells exhibit superior proliferation in vivo and effector function ex vivo.
Figure 27B:
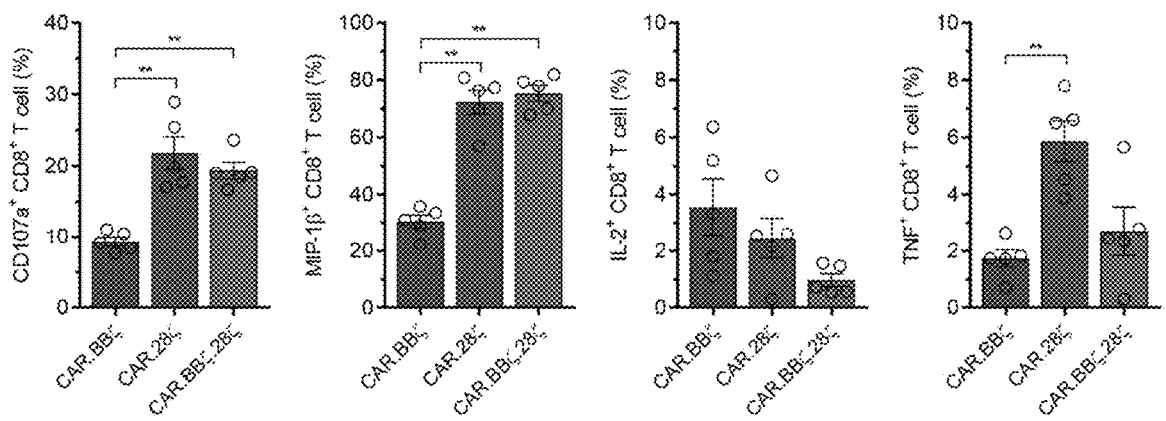
Figure 27C:
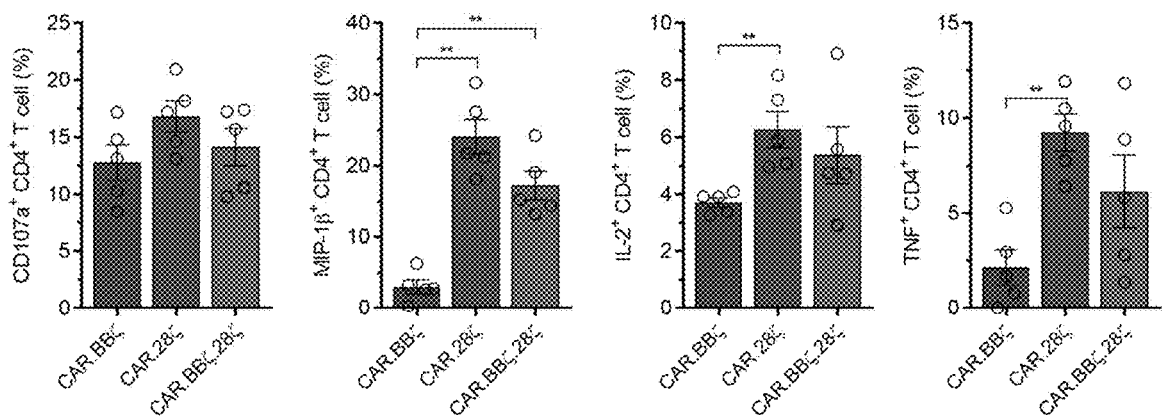

Dual-CAR (BBζ.28ζ) T Cells Exhibit Superior In Vivo Proliferation and Ex Vivo Effector Function Next the specific immunologic response of the three CAR T cell components of the Dual-CAR TCP were interrogated. The linkage of each CAR to a unique fluorescent protein allowed for independent quantification of each CAR T cell type and revealed increased in vivo expansion of Dual-CAR (BBζ.28ζ) T cells relative to either of the single costimulatory domain-expressing CAR T cell types (FIG. 13G), with significant differences observed in peak expansion and cumulative proliferation of Dual-CAR T cells (FIGS. 13H-13I). These differences remained significant after correcting for the baseline absolute count of each population (FIG. 27A). In addition, we consistently observed higher co-expression of granzyme B and perforin in both CD8+ and CD4+ Dual-CAR T cells relative to CAR.BBζ T cells ex vivo, whereas the levels of these cytolytic proteins were indistinguishable from CAR.28ζ T cells (FIGS. 13J-13K). Finally, comparison of IL-2, TNF, MIP-1β and CD107a expression after ex vivo stimulation revealed distinct CAR T cell effector profiles within the Dual-CAR TCP (FIGS. 27B-27C). Dual-CAR and CAR.28ζ T cells clustered in a similar fashion, with CD4+ CAR T cells expressing more TNF and IL-2, and CD8+ CAR T cells upregulating more CD107a and MIP-1β. In contrast, CD4+ and CD8+ CAR.BBζ T cells clustered together and exhibited attenuated levels of effector molecules (FIG. 13L). Together, these findings support our hypothesis that Dual-CAR T cells co-expressing independent 4-1BB/CD3-ζ and CD28/CD3-ζ endodomains represents a novel TCP that accentuates antigen-driven proliferation mediated by 4-1BB costimulation and preserves the effector functions mediated by CD28 costimulation.

Engineering HIV-Resistance Augments CAR T Cell Persistence and Function

Figure 28A:
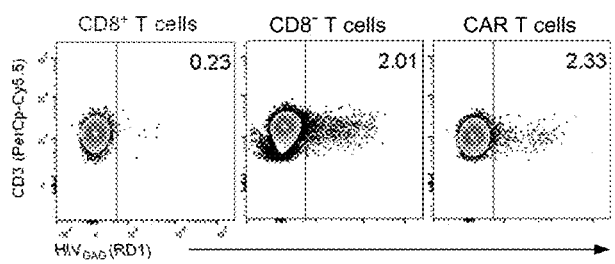
FIGS. 28A-28D: HIV-specific (CD4-based) CAR T cells are susceptible to infection in vivo.
Figure 28B:
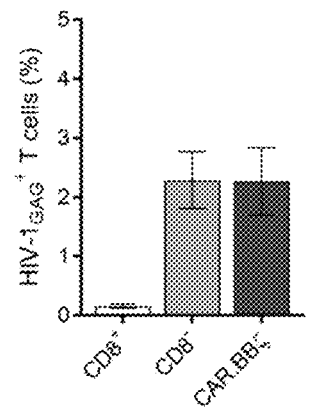
Figure 28C:
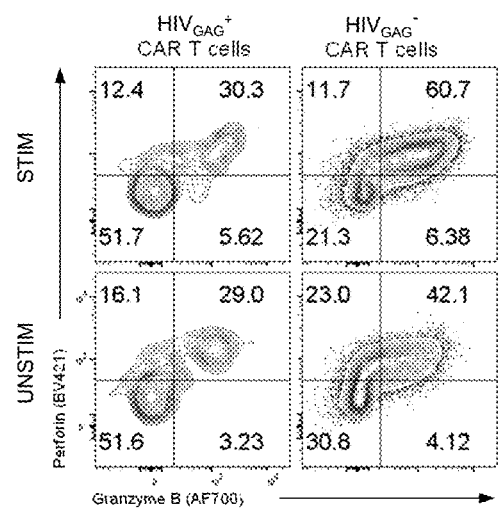
Figure 28D:
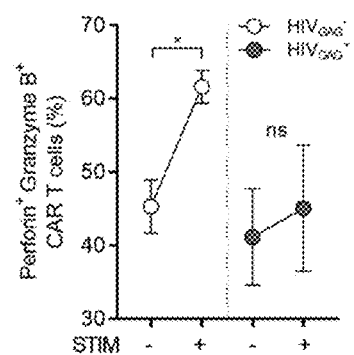
Figure 29A:
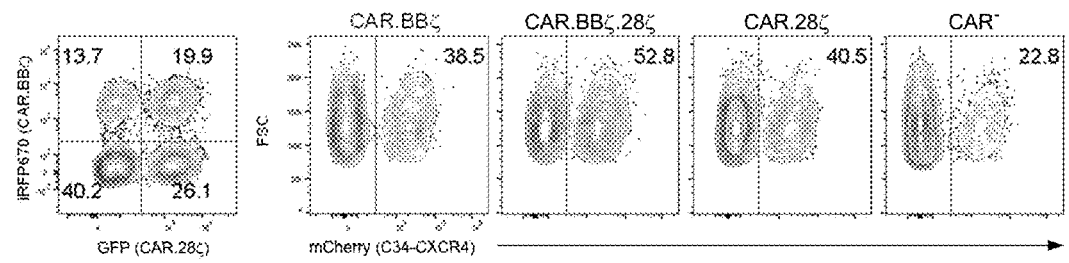
FIGS. 29A-29B: HIV-resistant Dual-CAR T cell product fails to inhibit acute HIV replication.
Figure 29B:
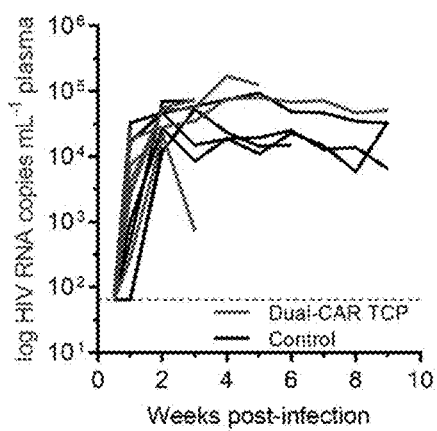
Figure 30A:
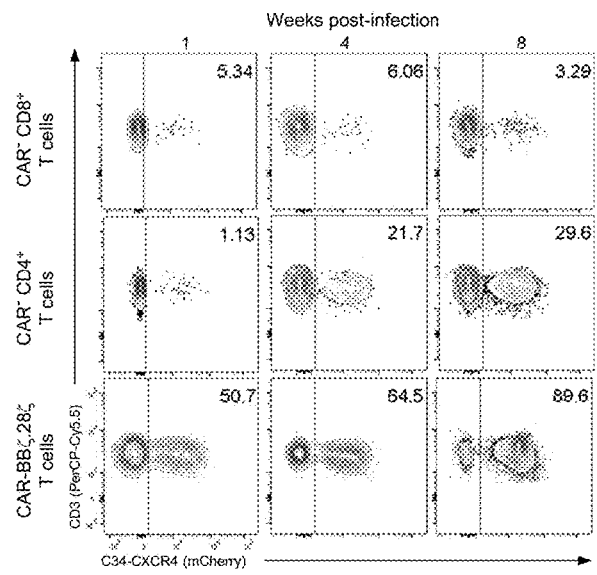
FIGS. 30A-30D: C34-CXCR4⁺ CAR T cells are selected for during chronic infection and exhibit superior effector function ex vivo.
Figure 30B:
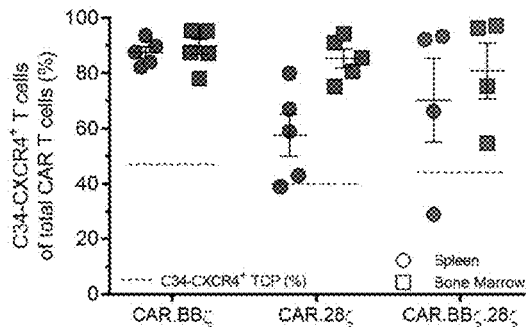
Figure 30C:
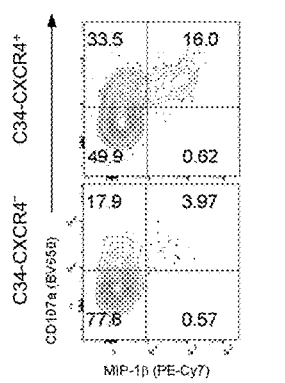
Figure 30D:
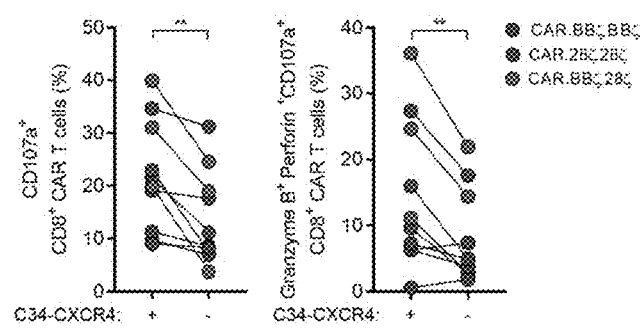

A CD4-based CAR was chosen to target HIV-infected cells because of this CAR's ability to suppress virus replication better than several HIV-specific antibody-based CARs in vitro, and the reduced likelihood for viral escape due to the requirement for HIV to bind CD4 for infection (Leibman, R. S., et al. Supraphysiologic control over HIV-1 replication mediated by CD8 T cells expressing a re-engineered CD4-based chimeric antigen receptor. *PLoS Pathog* 13, e1006613 (2017)). However, this CAR results in the over-expression of CD4 on the T cell surface potentially increasing their susceptibility to infection. Indeed, HIV-infected CAR T cells were detected in vivo, although the extent of total infection appeared to be indistinguishable from endogenous CAR− T cells (FIGS. 28A-28B). More importantly, ex vivo stimulation revealed functional deficits in the capacity of HIV-infected CAR T cells to co-upregulate granzyme B and perforin (FIGS. 28C-28D). To confer HIV resistance, we co-transduced the Dual-CAR TCP with the surface-expressed HIV fusion inhibitor C34-CXCR4 (FIG. 14A and FIG. 29A) and evaluated them in the acute HIV infection model (Leslie, G. J., et al. Potent and Broad Inhibition of HIV-1 by a Peptide from the gp41 Heptad Repeat-2 Domain Conjugated to the CXCR4 Amino Terminus. *PLoS Pathog* 12, e1005983 (2016)). C34-CXCR4 was expressed on up to 50% of cells in the Dual-CAR TCP and provided protective benefit as the C34-CXCR4+ CAR T cells harbored significantly less HIV DNA than their unprotected counterparts (FIG. 14B), and were selected for over time in chronically infected mice (FIGS. 30A-30B). Importantly, C34-CXCR4+ CAR T cells from chronic infection had markedly improved cytotoxic potential and MIP-1β expression relative to unprotected CAR T cells within the same mice (FIGS. 30C-30D). Somewhat paradoxically, however, infusion of a Dual-CAR TCP where 50% of all cells were HIV resistant was still insufficient to reduce in vivo acute virus replication (FIG. 29B). These results demonstrate that CD4-based CAR T cells can be protected from HIV infection by the C34-CXCR4 fusion inhibitor and that such protection can preserve CAR T cell functionality during persistent exposure to HIV.

Figure 14F:
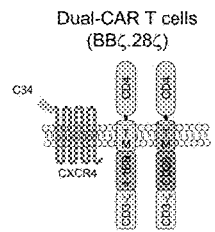
Figure 14F:
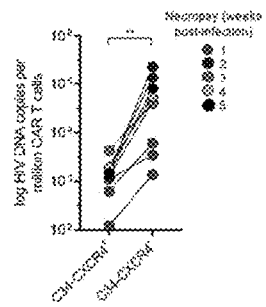
Figure 14F:
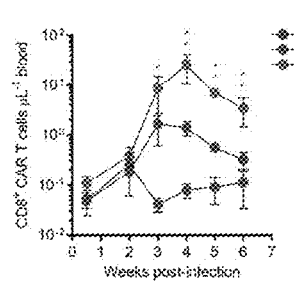
Figure 14F:
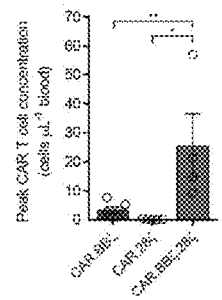
Figure 14F:
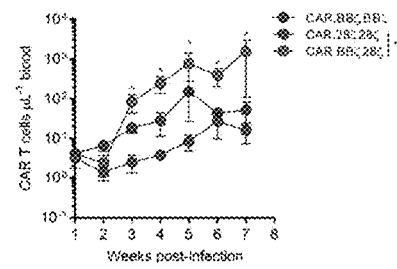
Figure 14E:
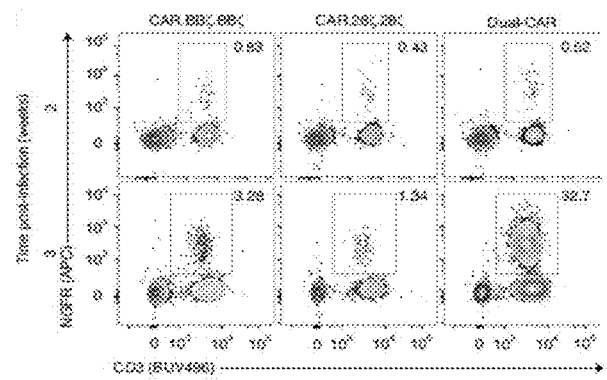
Figure 14G:
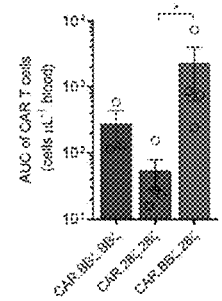
Figure 14N:
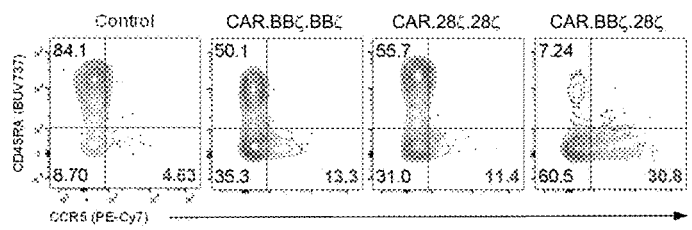
Figure 14N:
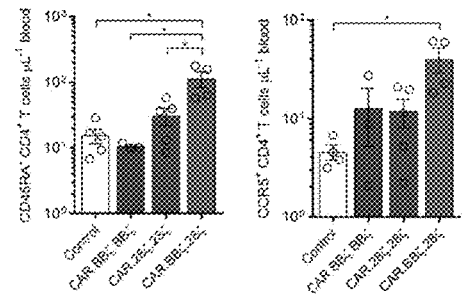
Figure 14N:
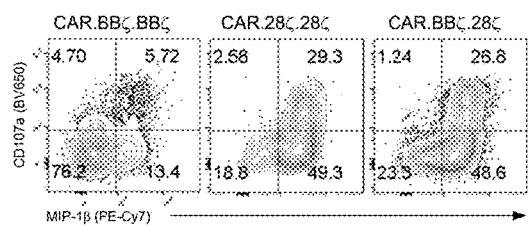
Figure 14N:
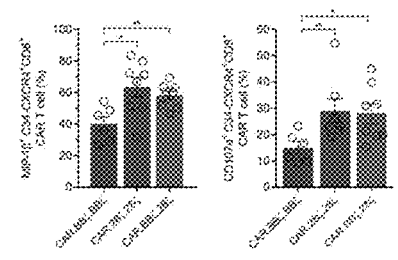
Figure 14N:
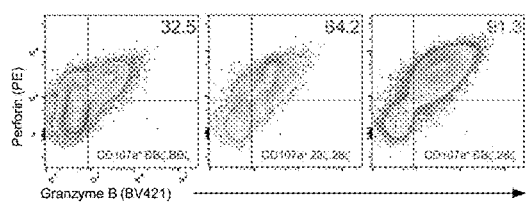
Figure 14N:
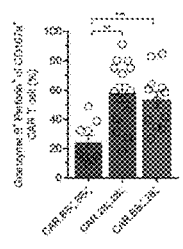
Figure 14N:
Figure 31:
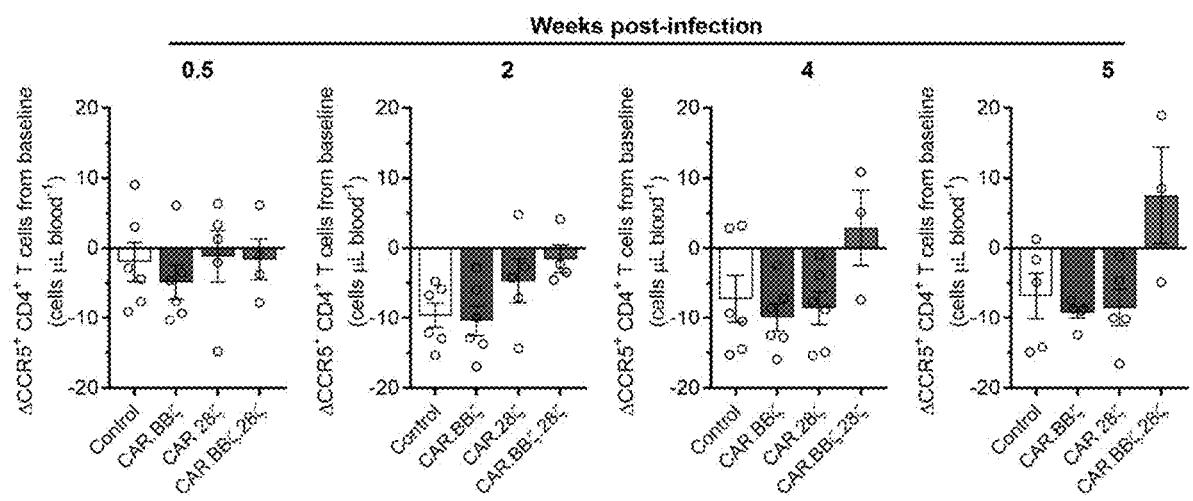
FIG. 31: Low dose Dual-CAR (BBz.28z) T cells mitigate CD4⁺ T cell loss during $HIV_{MJ4}$ infection. $HIV_{MJ4}$-infected mice were infused 48 hours post-challenge with 10⁶ C34-CXCR4⁺, purified CAR T cells containing either CAR.BBζ (red; n=6), CAR.28ζ (purple; n=6) or CAR.BBζ.28ζ (blue; n=4) intracellular domains. For each group of mice, the change in peripheral cell concentration of CCR5+ CD4+ T cells is measured from the indicated time post-infection to pre-infection levels. Bars indicate mean and error bars show±SEM.
Figure 32A:
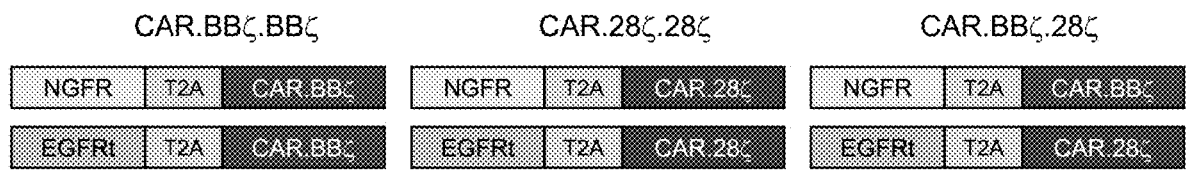
FIGS. 32A-32D: Two-step immunomagnetic selection process yields purified T cells expressing two independent CARs.
Figure 32B:
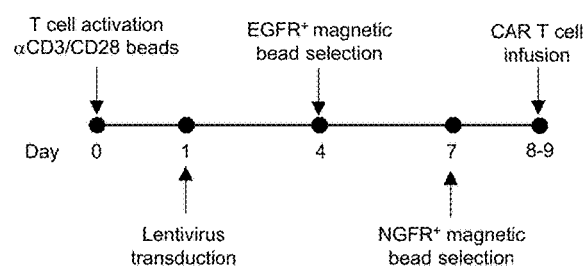
Figure 32C:
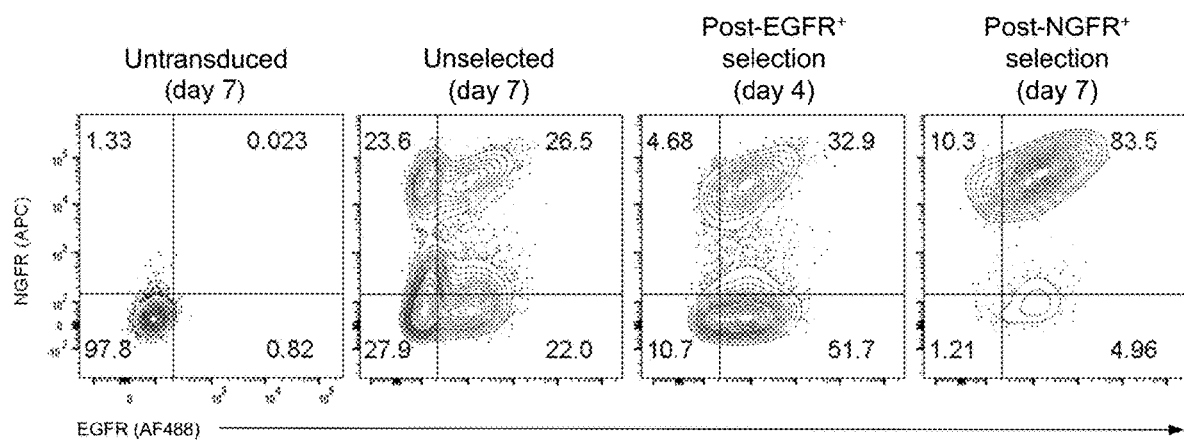
Figure 32D:
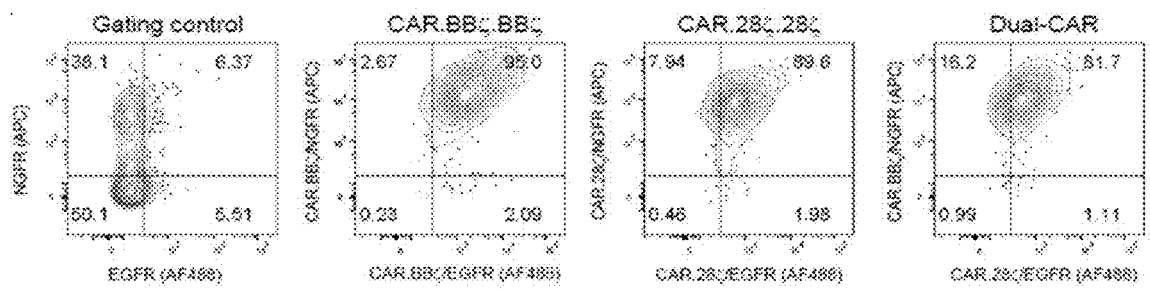
Figure 33A:
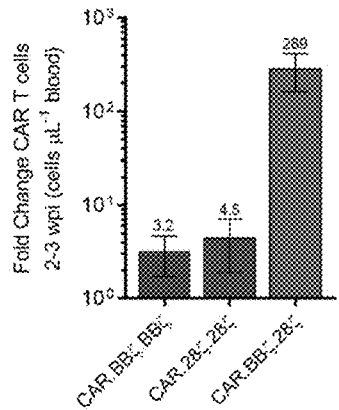
FIGS. 33A-33E: Dual-CAR (BBζ.28ζ) T cells mediate superior expansion and protection of CD4⁺ T cells during HIV infection in vivo. BLT mice were infected with $HIV_{MJ4}$ and 48 hours later received 10⁶ C34-CXCR4⁺ CAR T cells: CAR.BBζ.BBζ (n=5), CAR.28ζ.28ζ (n=5) and Dual-CAR (BBζ.28ζ; n=5).
Figure 33B:
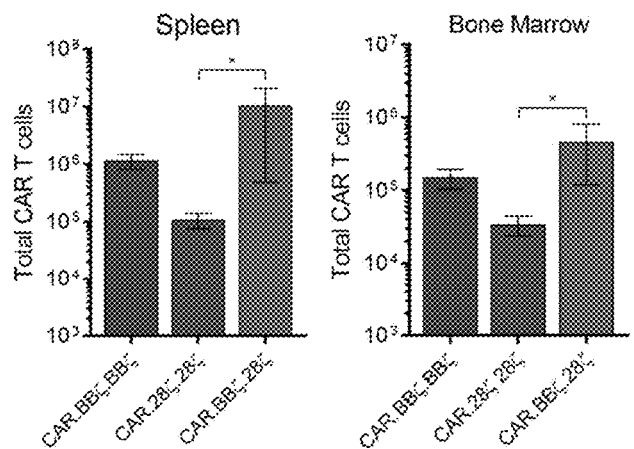

HIV-Resistant Dual-CAR (BBζ.28ζ) T Cells Mediate Superior Virus-Specific Immunity In Vivo The studies next sought to determine whether an infusion product of Dual-CAR (BBζ.28ζ) T cells alone exhibit enhanced virus-specific responses during HIV infection. To do so, first a low dose of HIV-resistant (C34-CXCR4+), purified Dual-CAR T cells, CAR.BBζ and CAR.28ζ were infused into separate groups of $HIV_{MJ4}$-infected mice. Dual-CAR T cells exhibited notable in vivo expansion kinetics that exceeded both single CAR expressing T cells (FIGS. 14C-14D) and mitigated HIV-induced CCR5+ CD4+ T cell loss (FIG. 31). However, in order to more stringently control for CAR surface expression an additional study was performed in a separate cohort of mice where HIV-resistant (C34-CXCR4+), purified Dual-CAR T cells were compared to HIV-resistant, purified CAR.BBζ.BBζ and CAR.28ζ.28ζ T cells (FIGS. 32A-32C). Dual-CAR T cells again demonstrated remarkable sensitivity to acute virus replication expanding 300-fold to represent 30% of total human cells in blood 3 weeks after infection, whereas CAR.BBζ.BBζ and CAR.28ζ.28ζ T cells reached only 3% and 1%, respectively (FIG. 14E and FIG. 33A). In addition, Dual-CAR T cells sustained greater long-term proliferation and maintenance in blood and tissues than their CAR.28ζ.28ζ T cell counterparts (FIGS. 14F-14G and FIG. 33B).

Figure 33C:
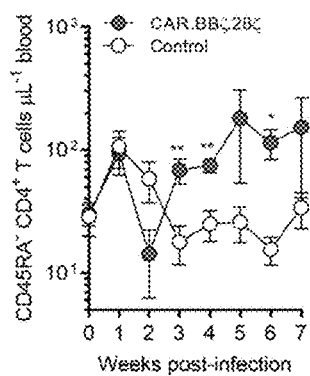
Figure 33D:
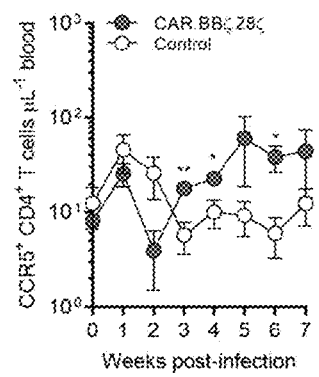
Figure 33E:
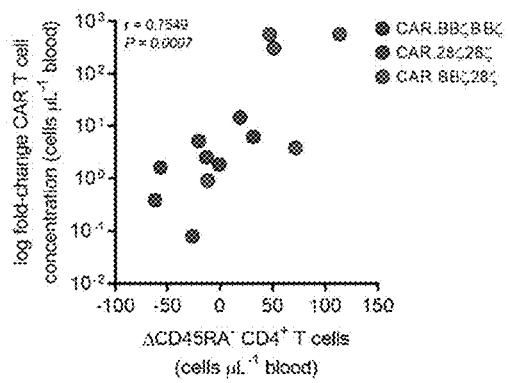
Figure 34A:
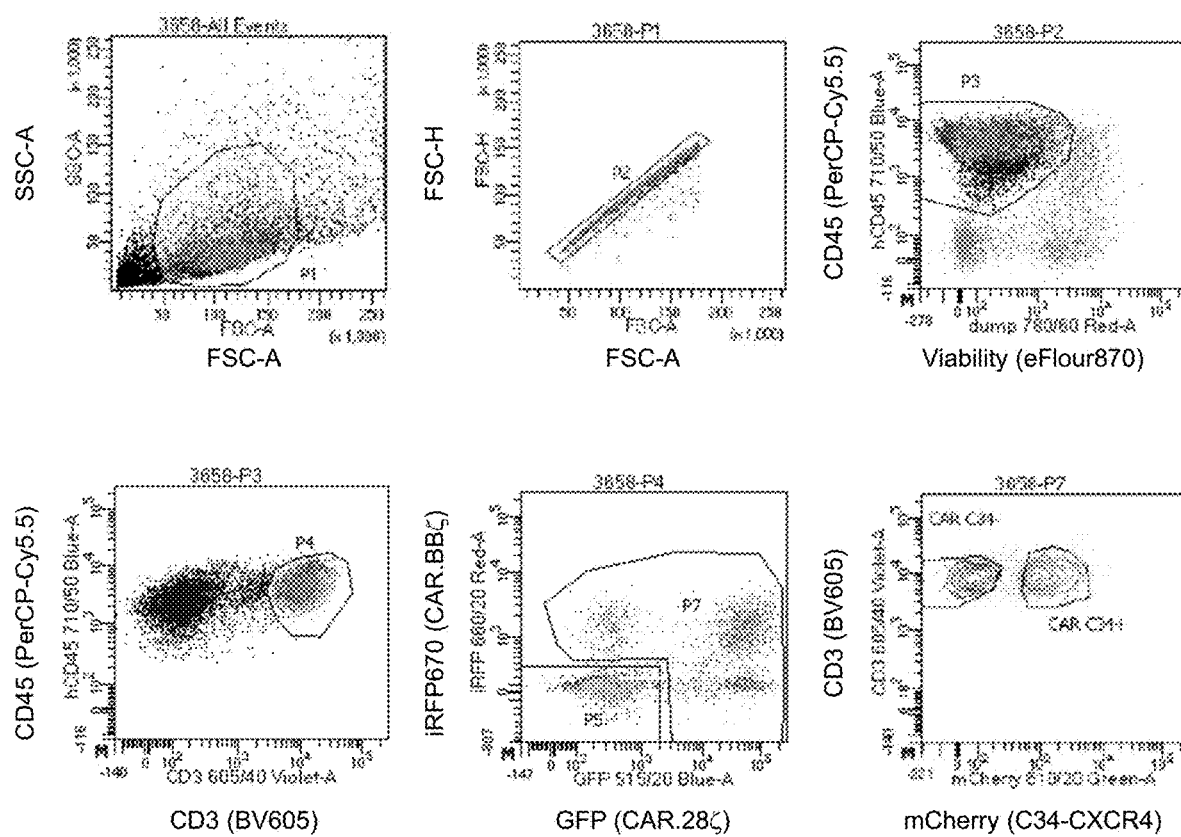
FIGS. 34A-34B: Gating strategy for FACS sorting C34-CXCR4⁺ and C34-CXCR4⁻ CAR T cells.
Figure 34B:
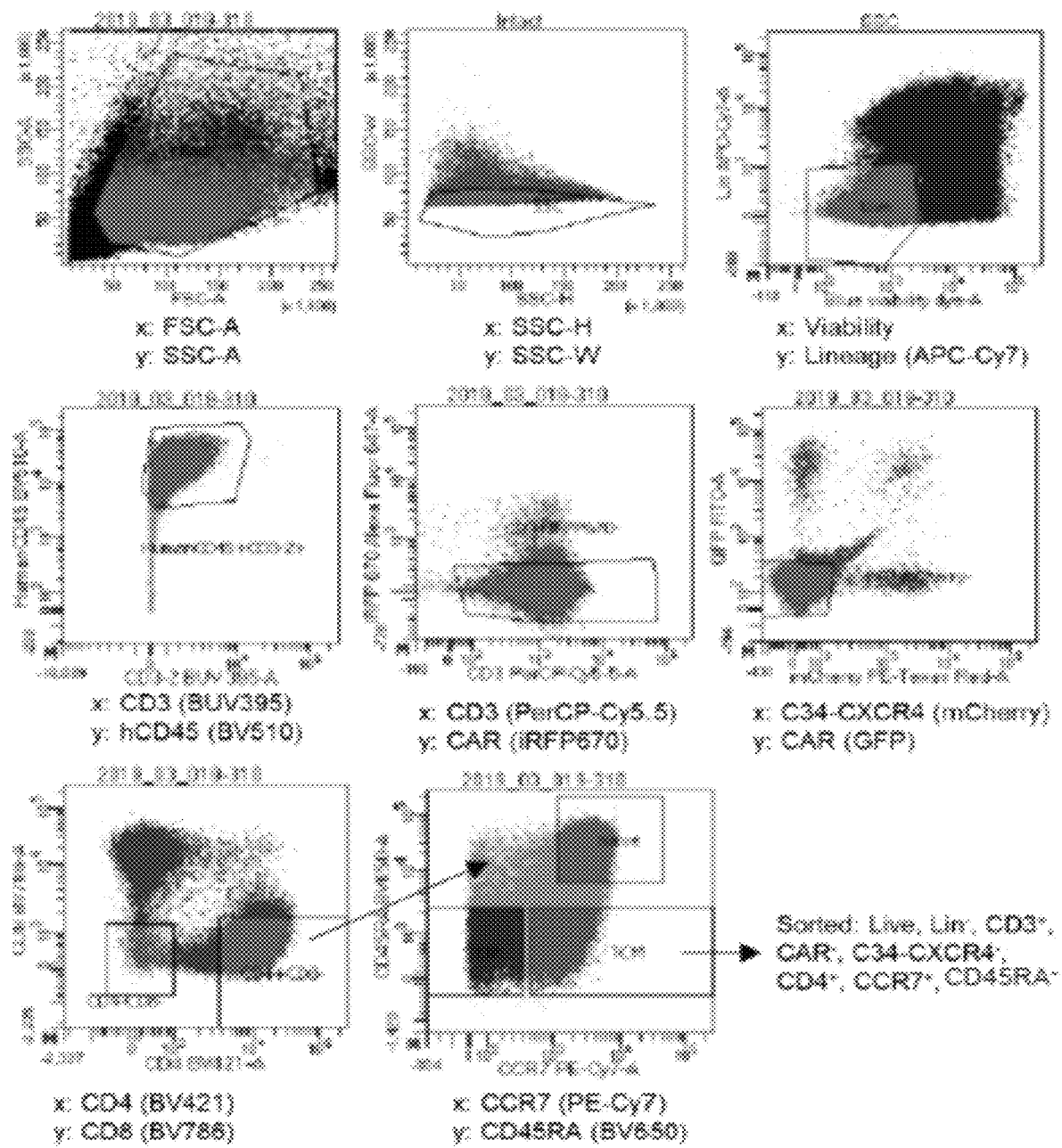
Figure 35:
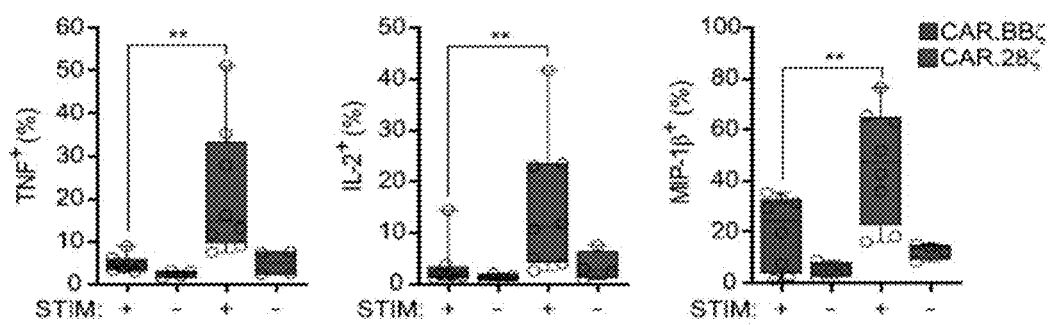
FIG. 35: CD28 costimulation enhances the ex vivo effector function of CAR T cells. HIV-uninfected mice were infused with an equal mixture of CD4-based CAR T cells expressing either CD3-ζ, 4-1BB/CD3-ζ and CD28/CD3-ζ costimulatory domains linked to unique fluorescent proteins to facilitate identification in vivo as described in FIG. 11 legend. Cumulative data indicating the frequency of TNF+, IL-2+ and MIP-1β+ CAR.BBζ and CAR.28ζ T cells within the same mice after ex vivo stimulation with K.Env (+) or K.WT (−) cells. Data represents the aggregate of cytokine producing cells from liver and terminal blood (n=8). CAR. T cells were too infrequent for analysis. Data shows box and whisker plots where the middle line indicates median, bounds of the box show 25th to 75th percentiles, and bars extend to min and max values. Symbols represent biologically independent animals. Significance was calculated using two-sided Wilcoxon matched-pairs signed rank test.
Figure 37A:
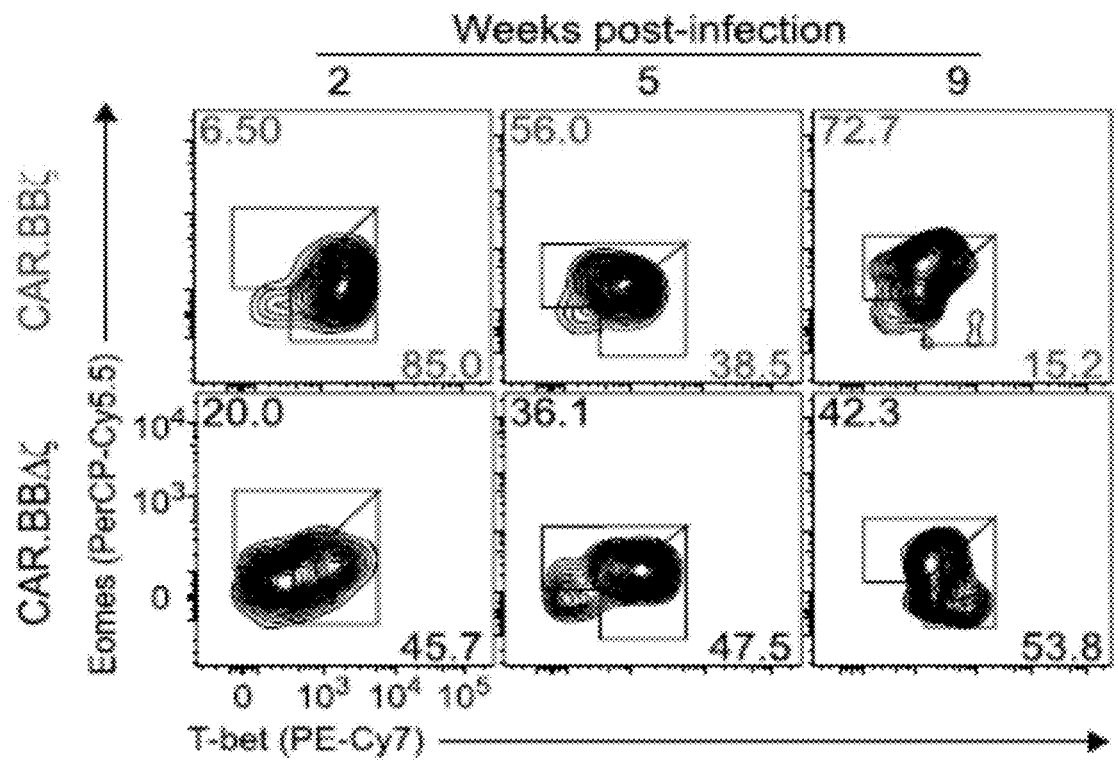
FIGS. 37A-37C: Eomes$^{hi}$T-bet$^{dim}$ CAR.BBζ T cells accumulate from acute to chronic phases of infection. BLT mice were infected with HIVJRCSF and infused 48 h later with either 2×107 CAR.BBζ T cells (n=5) or inactive control CAR.BBΔζ T cells (n=3).
Figure 37B:
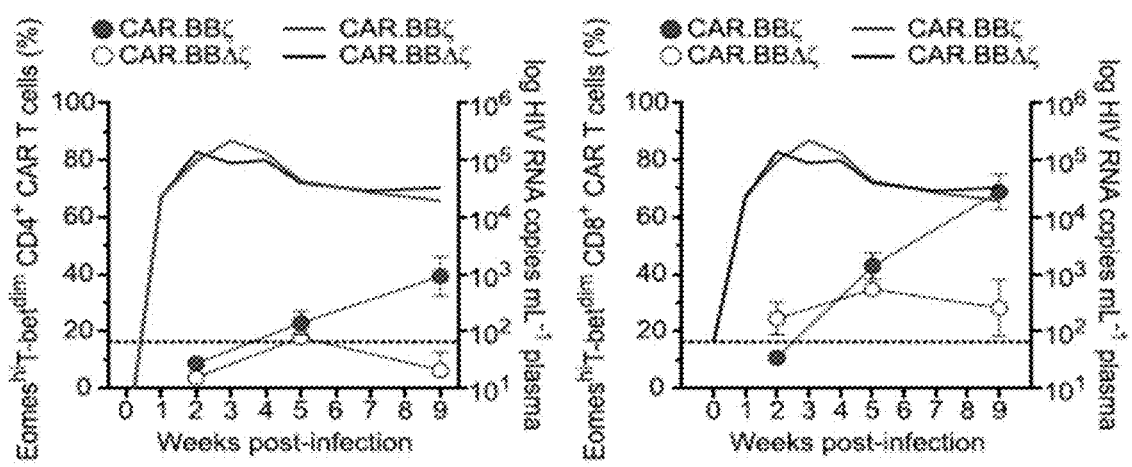
Figure 37C:
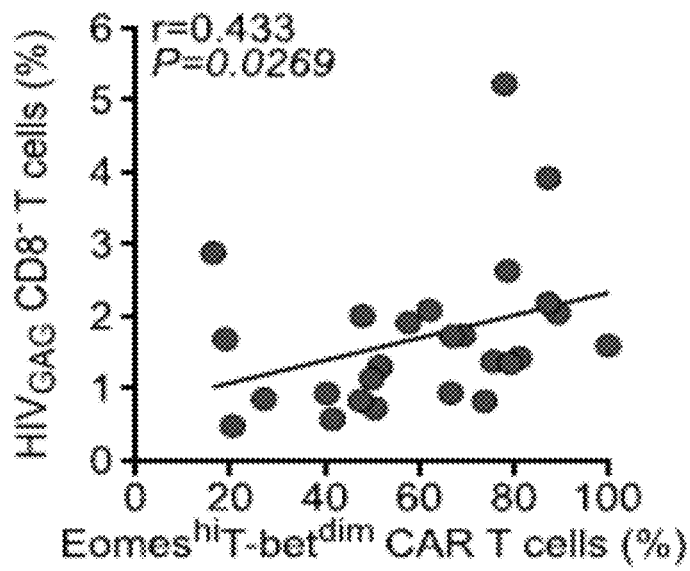
Figure 38A:
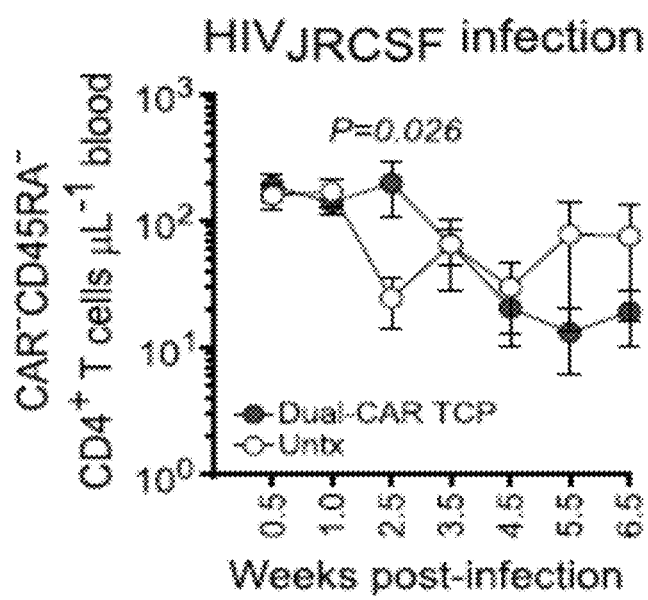
FIGS. 38A-38C: Dual-CAR T cell product transiently delays CD4+ T cell loss despite persistent HIVJRCSF infection. BLT mice received Dual-CAR T cell product (TCP) (n=6) 48 h after HIVJRCSF challenge, while control mice were untreated (Untx) (n=5).
Figure 38B:
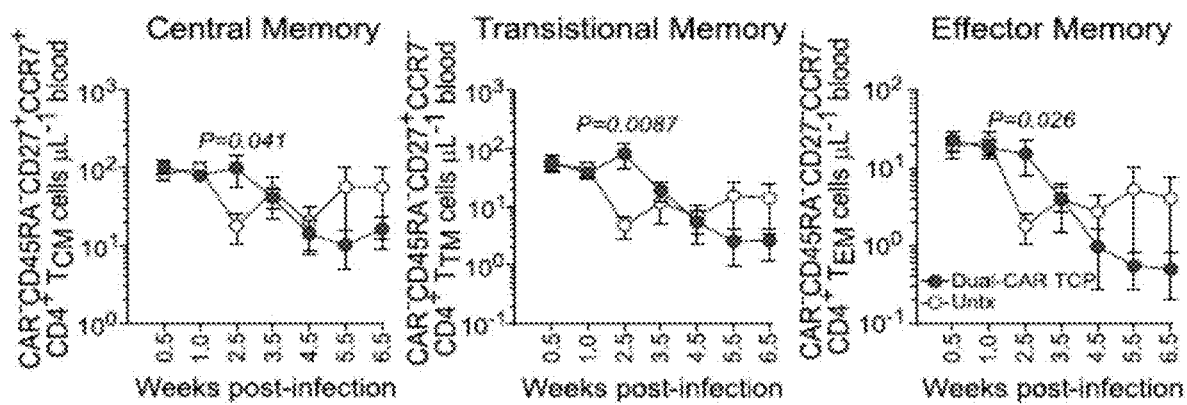
Figure 38C:
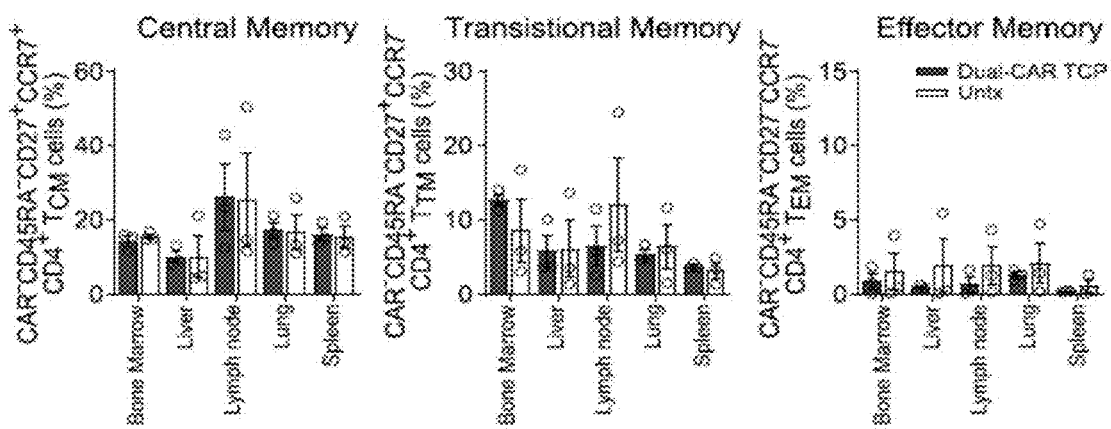
Figure 39A:
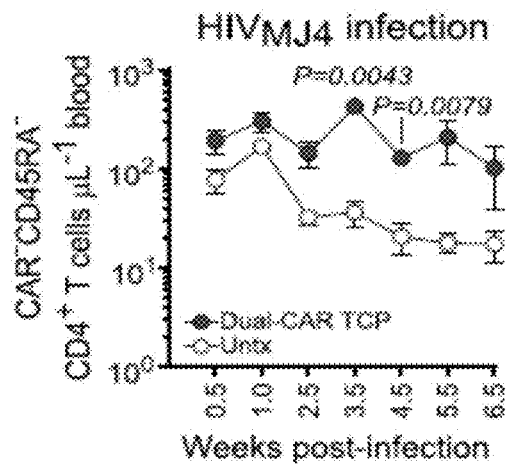
FIGS. 39A-39C: Dual-CAR T cell product prevents CD4+ T cell loss despite persistent HIVMJ4 infection. BLT mice were infused with Dual-CAR T cell product (TCP) (n=6) 48 h post-HIVMJ4 challenge, while control mice were untreated (Untx) (n=6).
Figure 39B:
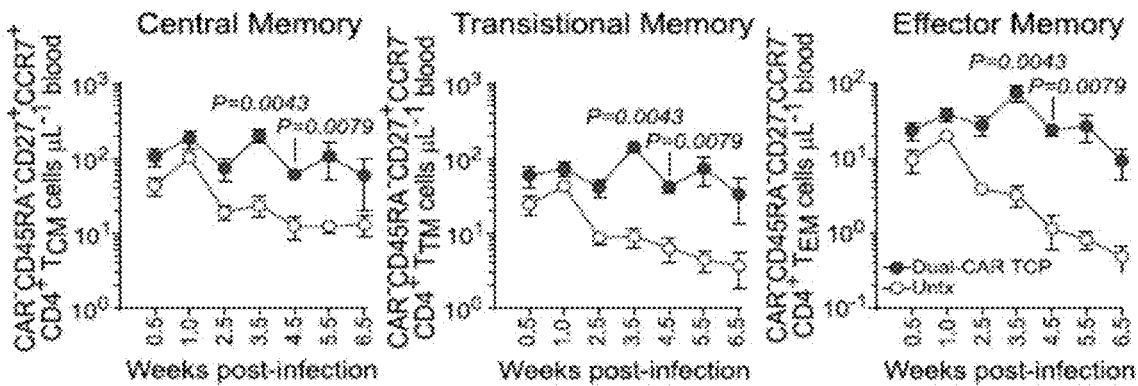
Figure 39C:
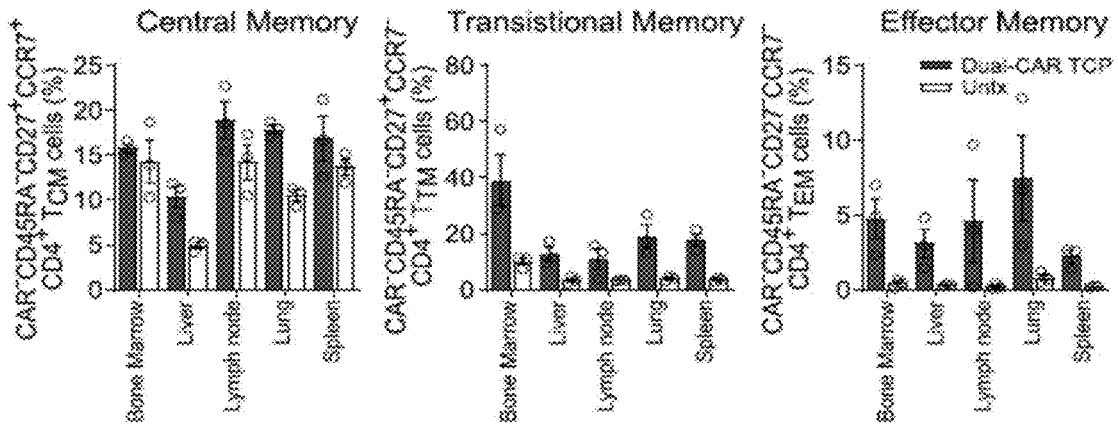
Figure 41A:
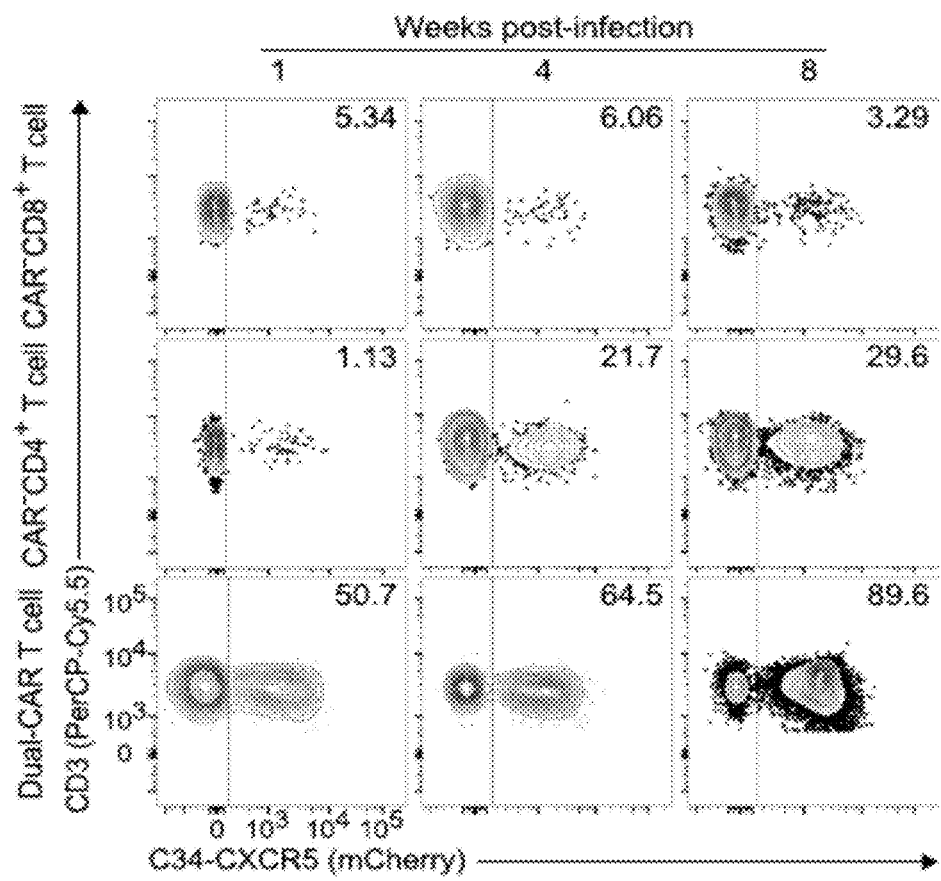
FIGS. 41A-41D: C34-CXCR4+ CAR T cells are selected for during chronic infection and exhibit superior ex vivo effector functions.
Figure 41B:
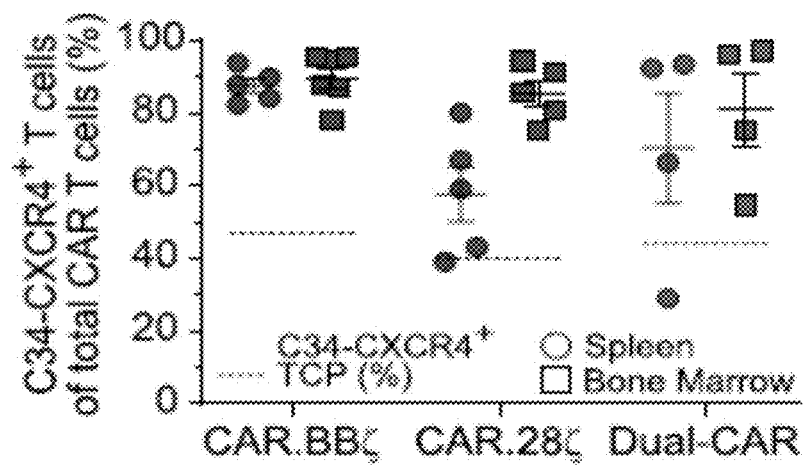
Figure 41C:
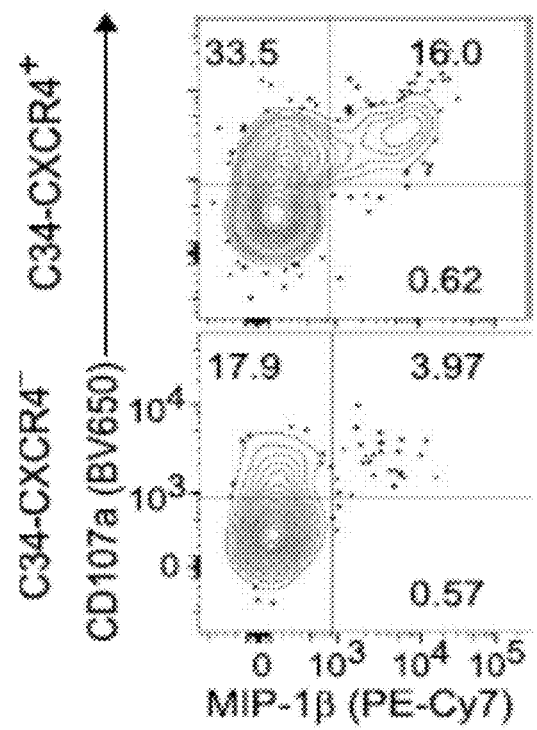
Figure 41D:
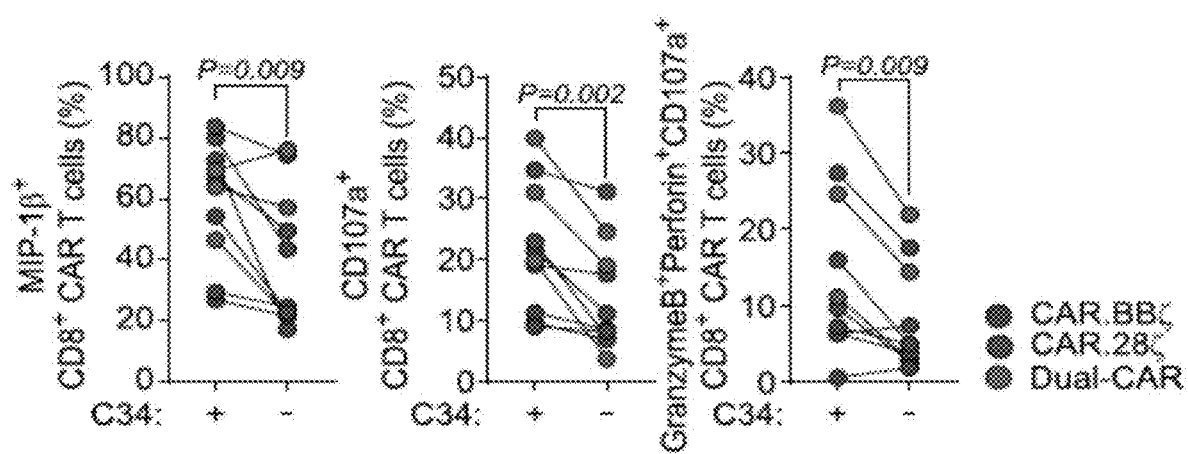
Figure 42A:
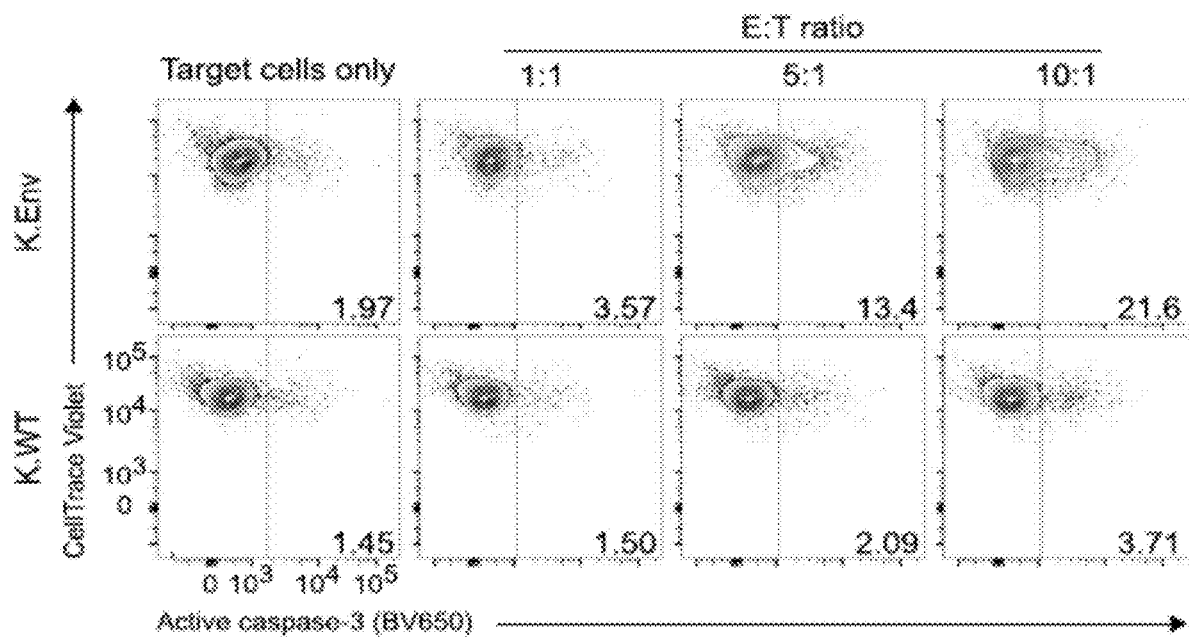
FIGS. 42A-42B: CAR T cells from HIV-infected mice exhibit ex vivo cytotoxic function. HIVJRCSF-infected mice (n=3) treated with the Dual-CAR TCP were euthanized and the bone marrow cells were ex vivo stimulated with K.Env or K.WT cells for 24 h at the indicated E:T ratios.
Figure 42B:
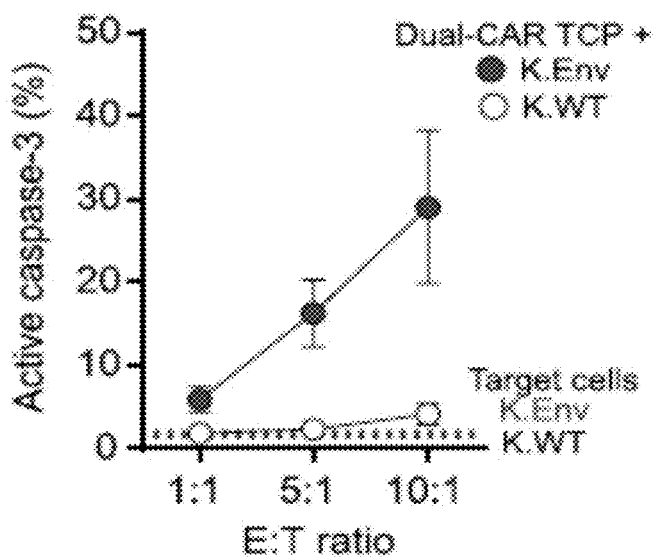
Figure 43A:
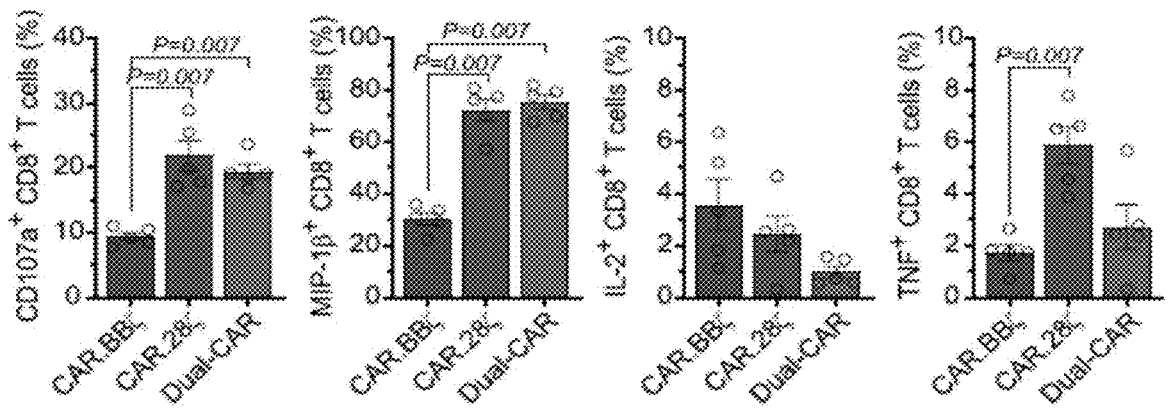
FIGS. 43A-43B: Dual-CAR and CAR.28ζ T cells exhibit similar ex vivo functional profiles, BLT mice were challenged with HIVJRCSF (n=5) and infused with 2×107 Dual-CAR T cell product (TCP) 48-hours post infection.
Figure 43B:
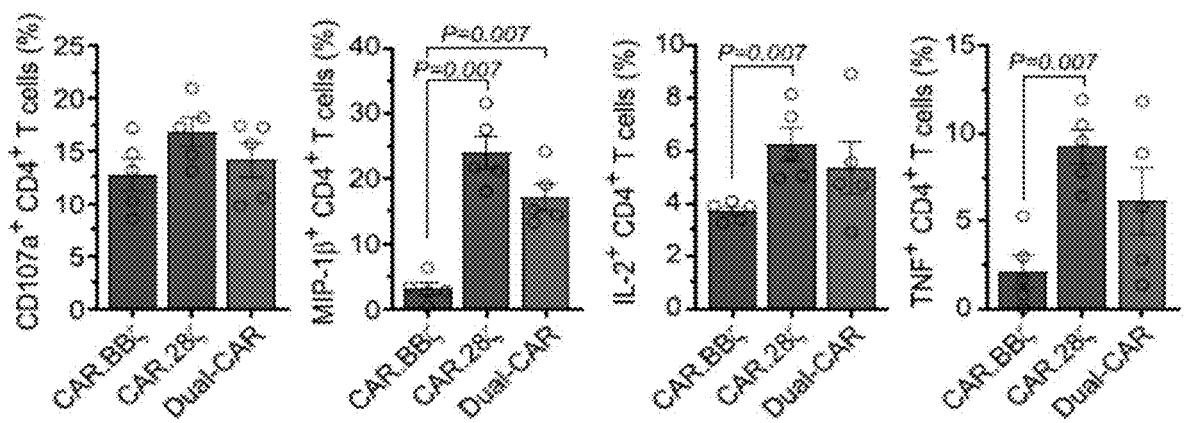
Figures 44A, 44B:
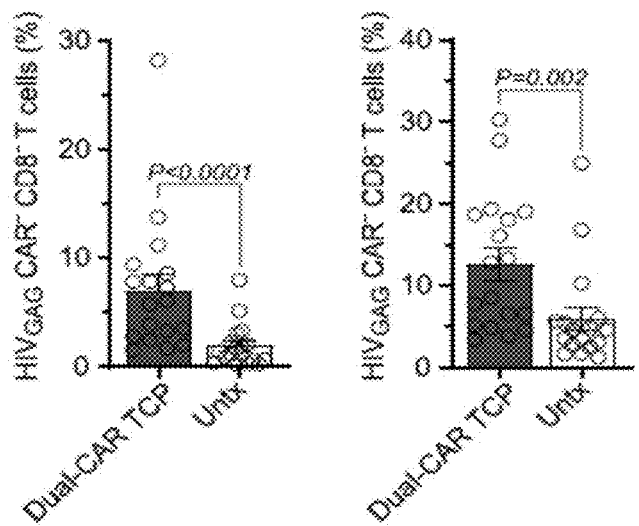
FIGS. 44A-44B: HIV-resistant Dual-CAR TCP reduces virus replication in vivo.

The infusion of Dual-CAR T cells also resulted in the greatest protection against CD4+ T cell loss during $HIV_{MJ4}$ infection (FIGS. 14H-14I), reflected in the preservation of total memory and CCR5+ CD4+ T cells especially late in the infection (FIGS. 33C-33D). Notably, the magnitude of early CAR T cell expansion across all groups, but exemplified by Dual-CAR T cells, was positively correlated with CD4+ T cell preservation (FIG. 33E). Finally, we confirmed that the purified Dual-CAR T cells from chronic infection were equivalent to CAR.28ζ.28ζ T cells and superior to CAR.BBζ.BBζ T cells in their ability to degranulate and produce MIP-1β (FIGS. 14J-14K), and in their ex vivo cytotoxic potential (FIGS. 14L-14M). Together, these findings confirm that HIV-resistant Dual-CAR T cells exhibit an enhanced proliferation, survival, and effector function profile over either 4-1BB- or CD28-costimulated CAR T cells.

Protecting CAR T Cells from HIV Infection Improves Control Over Virus Replication It was hypothesized that the contribution of HIV-infected CAR T cells to viremia may be significant, in that virus secreted from infected CAR T cells could mask reductions in viral load caused by clearing infected CD4+ T cells. Indeed, after aggregating the data from all infection studies, we observed that infusion of unprotected CAR T cells significantly magnifies viremia (FIG. 15A). Thus, to test the extent to which HIV infection of CD4-based CAR T cells negates CAR T cell-mediated reductions in viremia, we compared the outcomes of infusing a fully-protected (>98% C34-CXCR4+) or a partially-protected (<20% C34-CXCR4+) Dual-CAR TCP into $HIV_{MJ4}$-infected, ART-suppressed BLT mice followed by ART cessation. Strikingly, infusion of the partially-protected Dual-CAR TCP increased rebound viremia over untreated mice to an average peak rebound of 4.6 log copies/mL versus 3.8 log copies/mL, whereas the fully-protected Dual-CAR TCP significantly reduced viral load to 3.0 log copies/mL (FIG. 15B). This result was confirmed by infusing the fully-protected, CXCR4+ Dual-CAR TCP into a larger cohort of BLT mice and again observing significant reductions in acute viremia compared to untreated mice (FIG. 15C). Together, these data demonstrate the importance of safeguarding CAR T cells as HIV infection of unprotected CAR T cells can contribute to plasma viremia and potentially overwhelming CAR T cell-mediated control over virus replication.

Figure 15E:
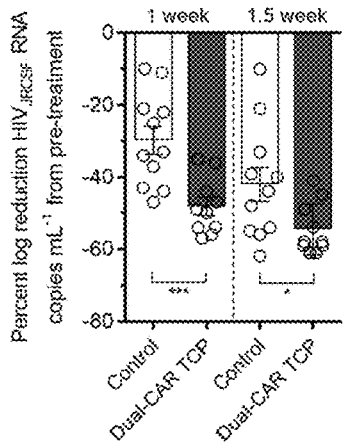
Figure 15F:
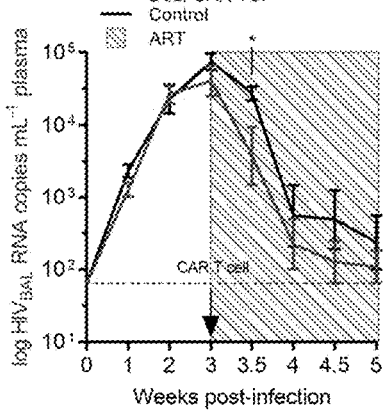
Figure 15G:
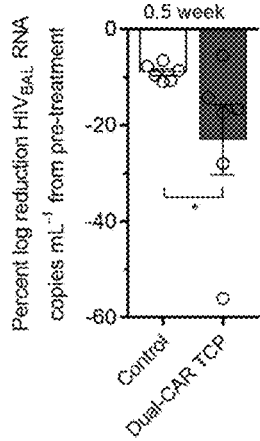
Figure 15H:
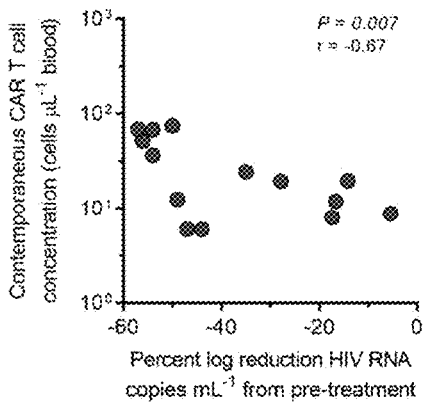
Figure 15I:
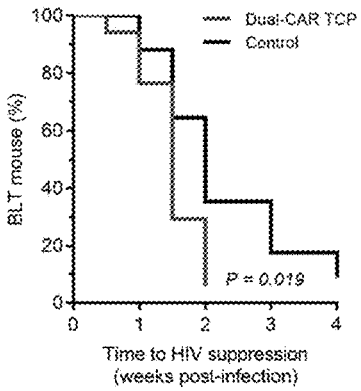

Although C34-CXCR4 reduces HIV infection of CAR T cells, it is shown that the protection is not sterilizing in the presence of persistent viremia (FIG. 14B). Thus, it was hypothesized that providing ART to prevent new rounds of infection at the time of CAR T cell infusion could reveal CAR T cell-mediated viral load reduction. To test this, mice were challenged with $HIV_{JRCSF}$ and initiated combination therapy (ART and Dual-CAR TCP) at peak viremia. After one week of combination therapy, the Dual-CAR TCP-treated mice achieved approximately a 1-log greater reduction in viral load relative to the ART only control group, which corresponded to a 50% reduction in viremia from pre-treatment levels (FIGS. 15D-15E). The suppressive effect of the Dual-CAR TCP was confirmed in a separate cohort of mice infected with a different HIV strain ($HIV_{BAL}$) (FIGS. 15F-15G). Aggregation of the data from the two studies showed that the magnitude of early viral load reduction was associated with the contemporaneous concentration of CAR T cells in peripheral blood (FIG. 15H), and that CAR T cell treatment significantly accelerated full HIV suppression, with nearly all combination therapy-treated mice reaching suppression by 2 weeks after treatment initiation versus 4 weeks for ART-treated mice (FIG. 15I). Together, these findings highlight the potential for the HIV-resistant Dual-CAR TCP to mediate direct antiviral activity to reduce HIV replication and prevent CD4+ T cell depletion.

Discussion

Here, extensive studies using the BLT humanized mouse model of HIV infection to interrogate the therapeutic potential of CD4-based CAR T cells are reported. This model system proved to be stringent and robust, identifying unique challenges presented by HIV infection and facilitating iterative in vivo testing to overcome these hurdles. Initially it was reasoned that long-term stability of CAR T cells would be essential to engender durable control over HIV, given the remarkable persistence of latently-infected cells (Siliciano, J. D., et al. Long-term follow-up studies confirm the stability of the latent reservoir for HIV-1 in resting CD4+ T cells. *Nat Med* 9, 727-728 (2003); Crooks, A. M., et al. Precise Quantitation of the Latent HIV-1 Reservoir: Implications for Eradication Strategies. *J Infect Dis* 212, 1361-1365 (2015)). Congruent with findings from the cancer field, 4-1BB costimulation was integral for in vivo antigen-driven proliferation and survival of CAR T cells (van der Stegen, S. J., Hamieh, M. & Sadelain, M. The pharmacology of second-generation chimeric antigen receptors. *Nat Rev Drug Discov* 14, 499-509 (2015); Song, D. G., et al. In vivo persistence, tumor localization, and antitumor activity of CAR-engineered T cells is enhanced by costimulatory signaling through CD137 (4-1BB). *Cancer Res* 71, 4617-4627 (2011); Milone, M. C., et al. Chimeric receptors containing CD137 signal transduction domains mediate enhanced survival of T cells and increased antileukemic efficacy in vivo. *Mol Ther* 17, 1453-1464 (2009)). However, these cells were insufficient to alter HIV pathogenesis after ART cessation. Notably, failure to control viremia also induced a phenotype of T cell exhaustion similar to virus-specific T cells in the settings of other chronic infections (Wherry, E. J., et al. Molecular signature of CD8+ T cell exhaustion during chronic viral infection. *Immunity* 27, 670-684 (2007); Kahan, S. M., Wherry, E. J. & Zajac, A. J. T cell exhaustion during persistent viral infections. *Virology* 479-480, 180-193 (2015)). Additionally, it was observed that the high expression levels of CD4 on CAR T cells rendered them susceptible to infection, resulting in significant contribution to plasma viremia and deficiencies to their in vivo survival and function. These findings highlight critical hurdles facing CAR T cell immunotherapy in the setting of HIV infection.

To enhance the efficacy of HIV-specific CAR T cells, we created a novel CD4-based CAR T cell that independently expresses both 4-1BB/CD3-ζ and CD28/CD3-ζ costimulated CARs on the same cell. These Dual-CAR (BBζ.28ζ) T cells demonstrated extraordinary sensitivity to virus replication by exhibiting proliferation kinetics superior to those of 4-1BB-costimulated CAR T cells, while the incorporation of the CD28 costimulatory domain conferred cytotoxic potential and cytokine expression profiles consistent with CD28-costimulated CAR T cells. The findings described herein support a mechanism whereby both endodomains contribute individually to CAR T cell costimulation and activation. These findings contrast third-generation CARs, where the costimulatory domain that is proximal to the membrane often has a dominant effect on T cell function (Zhao, Z., et al. Structural Design of Engineered Costimulation Determines Tumor Rejection Kinetics and Persistence of CAR T Cells. *Cancer Cell* 28, 415-428 (2015); Guedan, S., et al. Enhancing CAR T cell persistence through ICOS and 4-1BB costimulation. *JCI Insight* 3(2018); Pule, M. A., et al. A chimeric T cell antigen receptor that augments cytokine release and supports clonal expansion of primary human T cells. *Mol Ther* 12, 933-941 (2005); Hombach, A. A., Heiders, J., Foppe, M., Chmielewski, M. & Abken, H. OX40 costimulation by a chimeric antigen receptor abrogates CD28 and IL-2 induced IL-10 secretion by redirected CD4(+) T cells. *Oncoimmunology* 1, 458-466 (2012)). Furthermore, to address the functional deficits associated with HIV infection of CAR T cells, the fusion inhibitor C34-CXCR4 was co-expressed in Dual-CAR T cells (Leslie, G. J., et al. Potent and Broad Inhibition of HIV-1 by a Peptide from the gp41 Heptad Repeat-2 Domain Conjugated to the CXCR4 Amino Terminus. *PLoS Pathog* 12, e1005983 (2016)). Although not sterilizing, C34-CXCR4 expression resulted in significantly improved in vivo survival of the Dual-CAR T cells during HIV infection and reduced dysfunction in cytokine production and cytotoxic potential. Overall, the tractability of the BLT mouse model of HIV infection allowed iterative testing that led to the engineering of an enhanced HIV-resistant, CD4-based Dual-CAR T cell product with greater potency.

HIV infection is characterized by a steady decline in CD4+ T cells, concomitant with overt immune activation and dysfunction, ultimately leading to a state of profound immunodeficiency (Masur, H., et al. CD4 counts as predictors of opportunistic pneumonias in human immunodeficiency virus (HIV) infection. *Ann Intern Med* 111, 223-231 (1989); Moir, S., Chun, T. W. & Fauci, A. S. Pathogenic mechanisms of HIV disease. *Annu Rev Pathol* 6, 223-248 (2011)). After the infusion of Dual-CAR T cells, striking protection of memory and CCR5+ CD4+ T cells from HIV-induced depletion despite persistent viremia was observed. Interestingly, the extent of CD4+ T cell protection was greatly affected by the viral replication capacity (vRC) of the infecting HIV strain, as CAR T cells were capable of durably preventing CD4+ T cell loss in mice infected with the lower vRC HIV$_{MJ4}$, but not the high vRC isolate HIV$_{JRCSF}$. This is consistent with prior findings that vRC affects many aspects of HIV-associated pathogenesis, including the magnitude of immune activation and the kinetics of CD4+ T cell loss in acute infection (Claiborne, D. T., et al. Replicative fitness of transmitted HIV-1 drives acute immune activation, proviral load in memory CD4+ T cells, and disease progression. *Proc Natl Acad Sci USA* 112, E1480-1489 (2015)). The impact of vRC on CAR T cell efficacy may be an important clinical consideration as the vRC of transmitted/founder viruses can vary by orders of magnitude among infected individuals (Wright, J. K., et al. Influence of Gag-protease-mediated replication capacity on disease progression in individuals recently infected with HIV-1 subtype C. *J Virol* 85, 3996-4006 (2011); Prince, J. L., et al. Role of transmitted Gag CTL polymorphisms in defining replicative capacity and early HIV-1 pathogenesis. *PLoS Pathog* 8, e1003041 (2012); Deymier, M. J., et al. Heterosexual Transmission of Subtype C HIV-1 Selects Consensus-Like Variants without Increased Replicative Capacity or Interferon-alpha Resistance. *PLoS Pathog* 11, e1005154 (2015)).

Although Dual-CAR T cell therapy during HIV infection failed to durably suppress acute viremia, ART-suppressed mice treated with HIV-resistant Dual-CAR T cells exhibited a striking reduction in early post-ART viral rebound when compared to mice treated with a partially-protected CAR T cell product. These data suggested that HIV infection of the CAR T cells themselves may mask reductions in viral load caused by CAR T cell-mediated clearance of infected cells. This concept was supported by the observation that infusion of CAR T cells concomitant with ART initiation, which serves to prevent CAR T cell infection, reproducibly accelerated the kinetics of HIV suppression. Taken together, these results support that Dual-CAR T cells are capable of mediating direct antiviral activity and reducing viremia, but protection of the CAR T cells against HIV infection is essential and may require the development of additional protection modalities such as deletion of CCR5 (Perez, E. E., et al. Establishment of HIV-1 resistance in CD4+ T cells by genome editing using zinc-finger nucleases. *Nat Biotechnol* 26, 808-816 (2008); Holt, N., et al. Human hematopoietic stem/progenitor cells modified by zinc-finger nucleases targeted to CCR5 control HIV-1 in vivo. *Nat Biotechnol* 28, 839-847 (2010); Tebas, P., et al. Gene editing of CCR5 in autologous CD4 T cells of persons infected with HIV. *N Engl J Med* 370, 901-910 (2014); Peterson, C. W., et al. Differential impact of transplantation on peripheral and tissue-associated viral reservoirs: Implications for HIV gene therapy. *PLoS Pathog* 14, e1006956 (2018); Xu, L., et al. CRISPR-Edited Stem Cells in a Patient with HIV and Acute Lymphocytic Leukemia. *N Engl J Med* 381, 1240-1247 (2019)).

BLT humanized mice recapitulate key aspects of HIV infection and pathogenesis, but the model may actually provide an overtly stringent test of CAR T efficacy to control viremia (Sun, Z., et al. Intrarectal transmission, systemic infection, and CD4+ T cell depletion in humanized mice infected with HIV-1. *J Exp Med* 204, 705-714 (2007); Denton, P. W., et al. Antiretroviral pre-exposure prophylaxis prevents vaginal transmission of HIV-1 in humanized BLT mice. *PLoS Med* 5, e16 (2008); Brainard, D. M., et al. Induction of robust cellular and humoral virus-specific adaptive immune responses in human immunodeficiency virus-infected humanized BLT mice. *J Virol* 83, 7305-7321 (2009); Zhen, A., et al. Targeting type I interferon-mediated activation restores immune function in chronic HIV infection. *J Clin Invest* 127, 260-268 (2017)). Most notably, the timing of CAR T therapy and ART initiation in these studies occurred earlier than the development of endogenous HIV-specific T cells (Dudek, T. E., et al. Rapid evolution of HIV-1 to functional CD8(+) T cell responses in humanized BLT mice. *Sci Transl Med* 4, 143ra198 (2012); Claiborne, D. T., et al. Immunization of BLT Humanized Mice Redirects T Cell Responses to Gag and Reduces Acute HIV-1 Viremia. *J Virol* 93(2019)). This together with the general inability of BLT mice to develop affinity-matured antibodies suggests that the CAR T cells are likely functioning without the benefit of robust, endogenous antiviral immunity (Seung, E. & Tager, A. M. Humoral immunity in humanized mice: a work in progress. *J Infect Dis* 208 Suppl 2, S155-159 (2013); Martinez-Torres, F., Nochi, T., Wahl, A., Garcia, J. V. & Denton, P. W. Hypogammaglobulinemia in BLT humanized mice—an animal model of primary antibody deficiency. *PLoS One* 9, e108663 (2014); Karpel, M. E., Boutwell, C. L. & Allen, T. M. BLT humanized mice as a small animal model of HIV infection. *Curr Opin Virol* 13, 75-80 (2015)). However, this stringency proved to be critical for highlighting the insufficient potency of 4-1BB-costimulated CAR T cells and the importance of HIV-resistance, as 4-1BB-costimulated and unprotected CD4-based CAR T cells are capable of suppressing viral replication at favorable effector-to-target ratios in vitro and in less complex humanized mouse models of HIV infection (Leibman, R. S., et al. Supraphysiologic control over HIV-1 replication mediated by CD8 T cells expressing a re-engineered CD4-based chimeric antigen receptor. *PLoS Pathog* 13, e1006613 (2017); Anthony-Gonda, K., et al. Multispecific anti-HIV duoCAR-T cells display broad in vitro antiviral activity and potent in vivo elimination of HIV-infected cells in a humanized mouse model. *Sci Transl Med* 11(2019)).

In summary, the use of BLT mice, which are capable of supporting high-level chronic viremia, CD4+ T cell depletion, and post-ART viral rebound using primary HIV isolates has facilitated the development of a potent HIV-specific CAR T cell therapy capable of reducing HIV replication and preventing HIV-induced CD4+ T cell loss. Further, the in vivo characterization of Dual-CAR T cells convincingly reconciles the functional differences imparted by the CD28 and 4-1BB costimulatory domains, whereby expression of independent CARs accentuates antigen-driven T cell proliferation, survival, and effector function. Importantly, the profound in vivo expansion potential of Dual-CAR T cells, coupled with their susceptibility to HIV-infection, highlights the importance of engineering CD4-based CAR T cells (and likely also scFv-based CAR T cells), with sterilizing resistance to HIV infection that must be present in the vast majority of the infusion product in order to improve their in vivo antiviral activity (Leibman, R. S., et al. Supraphysiologic control over HIV-1 replication mediated by CD8 T cells expressing a re-engineered CD4-based chimeric antigen receptor. *PLoS Pathog* 13, e1006613 (2017)). Collectively, the findings described herein provide extraordinary insight regarding the hurdles facing engineered T cell-based therapy for HIV cure, in a stringent preclinical animal model. Furthermore, in pursuit of overcoming these hurdles a novel Dual-CAR T cell product capable of mitigating HIV-induced disease was created, with broad utility for viral infections and malignancies.

Other Embodiments

The recitation of a listing of elements in any definition of a variable herein includes definitions of that variable as any single element or combination (or subcombination) of listed elements. The recitation of an embodiment herein includes that embodiment as any single embodiment or in combination with any other embodiment or portions thereof.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A fusion protein comprising a peptide fusion inhibitor and a CXCR4 protein, wherein the CXCR4 protein comprises the amino acid sequence of SEQ ID NO: 1 with the proviso that the CXCR4 protein further comprises substitutions D97N, R134H, and L226R which decrease signaling activity of the CXCR4 protein relative to signaling activity of a wildtype CXCR4 protein comprising the amino acid sequence of SEQ ID NO: 1.

2. An isolated nucleic acid comprising a nucleic acid sequence encoding a fusion protein comprising a peptide fusion inhibitor and a CXCR4 protein, wherein the CXCR4 protein comprises the amino acid sequence of SEQ ID NO: 1 with the proviso that the CXCR4 protein further comprises substitutions D97N, R134H, and L226R which decrease signaling activity of the CXCR4 protein relative to signaling activity of a wildtype CXCR4 protein comprising the amino acid sequence of SEQ ID NO: 1.

3. The isolated nucleic acid of claim 2, wherein the nucleic acid sequence encoding the fusion protein is operably linked to a promoter.

4. A vector comprising the isolated nucleic acid of claim 2.

5. A T cell comprising the isolated nucleic acid of claim 2,
wherein the T cell expresses the fusion protein, wherein the fusion protein is membrane bound,
wherein peptide fusion inhibitor is expressed on the surface of the T cell,
wherein the cell further comprises a nucleic acid encoding a chimeric antigen receptor (CAR) comprising an antigen binding domain, a transmembrane domain, and an intracellular signaling domain, wherein the antigen binding domain specifically binds HIV, and wherein the antigen binding domain is CD4 or a fragment thereof.

6. The cell of claim 5, wherein the cell further comprises a knockdown or a knockout of endogenous CCR5 and/or endogenous CXCR4.

7. The T cell of claim 5, wherein the peptide fusion inhibitor is a peptide from the HIV-1 gp41 heptad repeat-2 (HR2) domain.

8. The T cell of claim 7, wherein the peptide fusion inhibitor comprises the amino acid sequence of SEQ ID NO: 3.

9. The T cell of claim 5, wherein the peptide fusion inhibitor is fused in frame to the N-terminal extracellular domain of the CXCR4 protein.

10. A method of suppressing, inhibiting, or treating HIV infection in a subject in need thereof, the method comprising administering to the subject an effective amount of the cell of claim 5.

11. A method of conferring resistance to HIV infection in a subject in need thereof, the method comprising administering to the subject an effective amount of the cell of claim 5.

12. A method for generating a T cell resistant to infection with HIV, the method comprising introducing into a T cell a nucleic acid encoding the fusion protein of claim 2.

* * * * *

SEQUENCE LISTING

<160> NUMBER OF SEQ ID NOS: 11

<210> SEQ ID NO 1
<211> LENGTH: 352
<212> TYPE: PRT
<213> ORGANISM: Homo sapiens

<400> SEQUENCE: 1

```
Met Glu Gly Ile Ser Ile Tyr Thr Ser Asp Asn Tyr Thr Glu Glu Met
1               5                   10                  15

Gly Ser Gly Asp Tyr Asp Ser Met Lys Glu Pro Cys Phe Arg Glu Glu
                20                  25                  30

Asn Ala Asn Phe Asn Lys Ile Phe Leu Pro Thr Ile Tyr Ser Ile Ile
            35                  40                  45

Phe Leu Thr Gly Ile Val Gly Asn Gly Leu Val Ile Leu Val Met Gly
        50                  55                  60

Tyr Gln Lys Lys Leu Arg Ser Met Thr Asp Lys Tyr Arg Leu His Leu
65                  70                  75                  80

Ser Val Ala Asp Leu Leu Phe Val Ile Thr Leu Pro Phe Trp Ala Val
                85                  90                  95

Asp Ala Val Ala Asn Trp Tyr Phe Gly Asn Phe Leu Cys Lys Ala Val
            100                 105                 110

His Val Ile Tyr Thr Val Asn Leu Tyr Ser Ser Val Leu Ile Leu Ala
        115                 120                 125

Phe Ile Ser Leu Asp Arg Tyr Leu Ala Ile Val His Ala Thr Asn Ser
130                 135                 140

Gln Arg Pro Arg Lys Leu Leu Ala Glu Lys Val Val Tyr Val Gly Val
145                 150                 155                 160

Trp Ile Pro Ala Leu Leu Leu Thr Ile Pro Asp Phe Ile Phe Ala Asn
                165                 170                 175

Val Ser Glu Ala Asp Asp Arg Tyr Ile Cys Asp Arg Phe Tyr Pro Asn
            180                 185                 190

Asp Leu Trp Val Val Phe Gln Phe Gln His Ile Met Val Gly Leu
        195                 200                 205

Ile Leu Pro Gly Ile Val Ile Leu Ser Cys Tyr Cys Ile Ile Ile Ser
210                 215                 220

Lys Leu Ser His Ser Lys Gly His Gln Lys Arg Lys Ala Leu Lys Thr
225                 230                 235                 240

Thr Val Ile Leu Ile Leu Ala Phe Phe Ala Cys Trp Leu Pro Tyr Tyr
                245                 250                 255

Ile Gly Ile Ser Ile Asp Ser Phe Ile Leu Leu Glu Ile Ile Lys Gln
            260                 265                 270

Gly Cys Glu Phe Glu Asn Thr Val His Lys Trp Ile Ser Ile Thr Glu
        275                 280                 285

Ala Leu Ala Phe Phe His Cys Cys Leu Asn Pro Ile Leu Tyr Ala Phe
    290                 295                 300

Leu Gly Ala Lys Phe Lys Thr Ser Ala Gln His Ala Leu Thr Ser Val
305                 310                 315                 320
```

```
Ser Arg Gly Ser Ser Leu Lys Ile Leu Ser Lys Gly Lys Arg Gly Gly
            325                 330                 335

His Ser Ser Val Ser Thr Glu Ser Glu Ser Ser Ser Phe His Ser Ser
        340                 345                 350

<210> SEQ ID NO 2
<211> LENGTH: 34
<212> TYPE: PRT
<213> ORGANISM: Artificial Sequence
<220> FEATURE:
<223> OTHER INFORMATION: Synthetic

<400> SEQUENCE: 2

Trp Met Glu Trp Asp Arg Glu Ile Asn Asn Tyr Thr Ser Leu Ile His
1               5                   10                  15

Ser Leu Ile Glu Glu Ser Gln Asn Gln Gln Glu Lys Asn Glu Gln Glu
            20                  25                  30

Leu Leu

<210> SEQ ID NO 3
<211> LENGTH: 41
<212> TYPE: PRT
<213> ORGANISM: Artificial Sequence
<220> FEATURE:
<223> OTHER INFORMATION: Synthetic

<400> SEQUENCE: 3

Met Glu Gly Ile Ser Trp Met Glu Trp Asp Arg Glu Ile Asn Asn Tyr
1               5                   10                  15

Thr Ser Leu Ile His Ser Leu Ile Glu Glu Ser Gln Asn Gln Gln Glu
            20                  25                  30

Lys Asn Glu Gln Glu Leu Leu Leu Lys
        35                  40

<210> SEQ ID NO 4
<211> LENGTH: 26
<212> TYPE: DNA
<213> ORGANISM: Artificial Sequence
<220> FEATURE:
<223> OTHER INFORMATION: Synthetic

<400> SEQUENCE: 4
cacgtcctag gatggcctta ccagtg                                          26

<210> SEQ ID NO 5
<211> LENGTH: 28
<212> TYPE: DNA
<213> ORGANISM: Artificial Sequence
<220> FEATURE:
<223> OTHER INFORMATION: Synthetic

<400> SEQUENCE: 5
gtggtcgact tatgcgctcc tgctgaac                                        28

<210> SEQ ID NO 6
<211> LENGTH: 30
<212> TYPE: DNA
<213> ORGANISM: Artificial Sequence
<220> FEATURE:
<223> OTHER INFORMATION: Synthetic

<400> SEQUENCE: 6
agtgggggga catcaagcag ccatgcaaat                                      30
```

```
<210> SEQ ID NO 7
<211> LENGTH: 27
<212> TYPE: DNA
<213> ORGANISM: Artificial Sequence
<220> FEATURE:
<223> OTHER INFORMATION: Synthetic

<400> SEQUENCE: 7
tgctatgtca gttccccttg gttctct                                        27

<210> SEQ ID NO 8
<211> LENGTH: 28
<212> TYPE: DNA
<213> ORGANISM: Artificial Sequence
<220> FEATURE:
<223> OTHER INFORMATION: Synthetic

<400> SEQUENCE: 8
ccatcaatga ggaagctgca gaatggga                                       28

<210> SEQ ID NO 9
<211> LENGTH: 18
<212> TYPE: DNA
<213> ORGANISM: Artificial Sequence
<220> FEATURE:
<223> OTHER INFORMATION: Synthetic

<400> SEQUENCE: 9
gatttggacc tgcgagcg                                                  18

<210> SEQ ID NO 10
<211> LENGTH: 18
<212> TYPE: DNA
<213> ORGANISM: Artificial Sequence
<220> FEATURE:
<223> OTHER INFORMATION: Synthetic

<400> SEQUENCE: 10
gcggctgtct ccacaagt                                                  18

<210> SEQ ID NO 11
<211> LENGTH: 16
<212> TYPE: DNA
<213> ORGANISM: Artificial Sequence
<220> FEATURE:
<223> OTHER INFORMATION: Synthetic

<400> SEQUENCE: 11
ctgacctgaa ggctct                                                    16
```